(12) United States Patent
Zheng

(10) Patent No.: US 12,449,827 B2
(45) Date of Patent: Oct. 21, 2025

(54) POSITIVE AND NEGATIVE PRESSURE SYSTEM AND OPERATION METHOD THEREFOR, AND POSITIVE AND NEGATIVE PRESSURE ELECTRICAL APPLIANCE USING POSITIVE AND NEGATIVE PRESSURE SYSTEM

(71) Applicant: Boang Zheng, Beijing (CN)

(72) Inventor: Boang Zheng, Beijing (CN)

(73) Assignee: Boang Zheng, Beijing (CN)

( * ) Notice: Subject to any disclaimer, the term of this patent is extended or adjusted under 35 U.S.C. 154(b) by 234 days.

(21) Appl. No.: 17/925,073

(22) PCT Filed: Mar. 9, 2021

(86) PCT No.: PCT/CN2021/079845
§ 371 (c)(1),
(2) Date: Nov. 14, 2022

(87) PCT Pub. No.: WO2021/227625
PCT Pub. Date: Nov. 18, 2021

(65) Prior Publication Data
US 2023/0195146 A1    Jun. 22, 2023

(30) Foreign Application Priority Data
May 15, 2020  (CN) .......................... 202010414268.5

(51) Int. Cl.
*D06F 34/05*      (2020.01)
*A23N 12/02*      (2006.01)
(Continued)

(52) U.S. Cl.
CPC ........... *G05D 16/208* (2013.01); *A23N 12/02* (2013.01); *A47L 15/0063* (2013.01);
(Continued)

(58) Field of Classification Search
CPC ... G05D 16/208; A23N 12/02; A47L 15/0063; A47L 15/4217; A47L 15/4225;
(Continued)

(56) References Cited

U.S. PATENT DOCUMENTS

| | | | |
|---|---|---|---|
| 2021/0023250 A1* | 1/2021 | Golkowski | ............. C01B 15/01 |
| 2024/0168501 A1* | 5/2024 | Zheng | ................. A47L 15/0034 |

FOREIGN PATENT DOCUMENTS

| | | |
|---|---|---|
| CN | 1277278 A | 12/2000 |
| CN | 101254396 A | 9/2008 |

(Continued)

OTHER PUBLICATIONS

International Search Report and Written Opinion mailed May 27, 2021 in International Patent Application No. PCT/CN2021/079845.

*Primary Examiner* — Marc E Norman
(74) *Attorney, Agent, or Firm* — Venable LLP

(57) ABSTRACT

A positive and negative pressure system and an operation method therefor, and a positive and negative pressure electrical appliance using the positive and negative pressure system. The positive and negative pressure electrical appliance comprises: a positive and negative pressure refrigerator, a positive and negative pressure washing machine, a vacuum dishwasher/fruit and vegetable cleaning machine, a super-oxygenated water washing range hood, a positive and negative pressure oven/fryer/microwave oven, a positive and negative pressure fresh-keeping compartment, a positive and negative pressure fresh-keeping warehouse, and a positive and negative pressure modular cabinet. Regulating airflow with positive and negative pressure, or carrying multiple effective loads such as ozone, an air catalyst, a negative ion, modified atmosphere gas and water for orderly (Continued)

getting in and out of or staying in a positive and negative pressure chamber, and exerting the required effects on objects therein.

5 Claims, 12 Drawing Sheets

(51) Int. Cl.
| | |
|---|---|
| *A47L 15/00* | (2006.01) |
| *A47L 15/42* | (2006.01) |
| *A47L 15/46* | (2006.01) |
| *A47L 15/48* | (2006.01) |
| *D06F 25/00* | (2006.01) |
| *D06F 34/32* | (2020.01) |
| *D06F 35/00* | (2006.01) |
| *D06F 39/08* | (2006.01) |
| *D06F 39/14* | (2006.01) |
| *F25D 13/00* | (2006.01) |
| *F25D 17/04* | (2006.01) |
| *F25D 21/14* | (2006.01) |
| *F25D 23/02* | (2006.01) |
| *F25D 29/00* | (2006.01) |
| *G05D 16/20* | (2006.01) |
| *F24C 15/20* | (2006.01) |

(52) U.S. Cl.
CPC ....... *A47L 15/4217* (2013.01); *A47L 15/4225* (2013.01); *A47L 15/424* (2013.01); *A47L 15/4259* (2013.01); *A47L 15/46* (2013.01); *A47L 15/48* (2013.01); *D06F 25/00* (2013.01); *D06F 34/05* (2020.02); *D06F 34/32* (2020.02); *D06F 35/001* (2013.01); *D06F 39/085* (2013.01); *D06F 39/088* (2013.01); *D06F 39/14* (2013.01); *F25D 13/00* (2013.01); *F25D 17/045* (2013.01); *F25D 21/14* (2013.01); *F25D 23/025* (2013.01); *F25D 29/00* (2013.01); *A47L 2401/17* (2013.01); *A47L 2401/18* (2013.01); *F24C 15/20* (2013.01); *F25D 2317/04131* (2013.01); *F25D 2317/0416* (2013.01); *F25D 2317/0417* (2013.01); *F25D 2317/043* (2013.01); *F25D 2700/00* (2013.01)

(58) Field of Classification Search
CPC .... A47L 15/424; A47L 15/4259; A47L 15/46; A47L 15/48; D06F 25/00; D06F 34/05; D06F 34/32; D06F 35/001; D06F 39/085; D06F 39/088; F25D 13/00; F25D 17/045; F25D 21/14; F25D 23/025; F25D 29/00
See application file for complete search history.

(56) References Cited

FOREIGN PATENT DOCUMENTS

| | | | |
|---|---|---|---|
| CN | 101817425 | A | 9/2010 |
| CN | 205106215 | U | 3/2016 |
| CN | 110200515 | A | 9/2019 |
| CN | 111562804 | A | 8/2020 |
| CN | 212484186 | U | 2/2021 |
| CN | 113865192 | A | 12/2021 |
| JP | 2019027722 | A | 2/2019 |
| KR | 20150017853 | A | 2/2015 |
| WO | 2015135263 | A1 | 9/2015 |

* cited by examiner

POSITIVE AND NEGATIVE PRESSURE SYSTEM AND OPERATION METHOD THEREFOR, AND POSITIVE AND NEGATIVE PRESSURE ELECTRICAL APPLIANCE USING POSITIVE AND NEGATIVE PRESSURE SYSTEM

CROSS-REFERENCE TO RELATED APPLICATION

This patent application claims the benefit and priority of Chinese Patent Application No. 202010414268.5, filed with the China National Intellectual Property Administration on May 15, 2020, the disclosure of which is incorporated by reference herein in its entirety as part of the present application.

TECHNICAL FIELD

The embodiments of the present disclosure belong to the field of electrical appliances, and in particular relates to a positive and negative pressure system and an operation method therefor, and a positive and negative pressure electrical appliance using the positive and negative pressure system.

BACKGROUND

The field of household appliances has developed rapidly in recent decades, especially refrigerators and washing machines have become increasingly popular. However, in recent years, the renewal of household appliances is not so desirable, such as the refrigerators. Since the early 1900s, compressed refrigeration type refrigerator was introduced more than a hundred years, although the appearance of refrigerator has been improved to be visually pleasant and various auxiliary functions have been added, there has been no technical breakthrough in the basic storage method of low-temperature bacteriostasis. The characteristics of vacuum and high pressure have long been known by people, as the bacteria and microorganisms cannot survive in vacuum and stored fruits and vegetables are not easy to rot, the people are always attracted to store the food in vacuum. However, the absence of oxygen in the vacuum may also cause the anaerobic respiration of fruits and vegetables, leading to the loss of quality and freshness, and meanwhile, when the vacuum negative pressure is excessively low, the cells and tissue structures of the fruits, vegetables, meat and fish may be damaged to cause rotting, and the internal water of the fruits, vegetables, meat and fish may escape quickly to lead to the quality decline and flavor loss. Because of mixed advantages and disadvantages, the vacuum and high pressure have not been applied to refrigerators and other household appliances. High-pressure technology is used in the fields of freezing and refrigeration. After years of research, it has been proved that by adopting high-pressure bacteriostasis, high-pressure freezing, high-pressure thawing and high-pressure unfreezing refrigeration technologies, the technical problem that the largest ice crystal formation zone causes irreversible quality loss to the food in normal-pressure freezing, thawing and freezing preservation can be solved through the coordinated configuration of pressure and temperature, and the speed of high-pressure freezing and thawing is much faster than that under normal pressure. However, it is very difficult to create a deep vacuum and ultra-high-pressure space in the household appliances with existing materials and technical level, there are many problems, and the cost is too high to be suitable for the home appliance. All these reasons lead to the fact that vacuum and high-pressure technologies have not been actually applied to refrigerators and other household appliances. Numerous advantages of the super oxygen (ozone) for rapidly sterilizing, disinfecting, degrading pesticide residues and organic dirt, inhibiting the activity of enzymes, keeping fruits, vegetables, meat and fish fresh, and cleaning the air have been attracting people to apply it in production and life. However, the contact with super oxygen may harm human health, and there has been no ideal solution for its application in electrical appliances, resulting in that the super oxygen is not actually applied to household appliances such as refrigerators and washing machines. Modified atmosphere fresh-keeping is an advanced fresh-keeping storage method for fruits and vegetables at present, which refers to inhibit the respiration of fruits and vegetables by regulating the concentration ratio of oxygen, nitrogen and carbon dioxide in the storage space, thus the consumption of organic substances is reduced, the original excellent flavor and aromatic flavor are maintained, the metabolism is slowed down, the reproduction of some pathogenic bacteria and the occurrence of physiological diseases are controlled, the fresh-keeping effect is much better than that of general refrigeration, the fresh-keeping period is obviously prolonged, and the power consumption is low. However, the modified atmosphere storage needs an airtight space capable of resisting a certain pressure, which not only needs to produce the gas mixture with the best ratio and concentration and input the gas mixture into the storage space, but also needs to discharge the waste gas at a proper time. Moreover, the renewal of the modified atmosphere gas needs the accurate maintenance of the circulation system, etc., all of which cannot be done by general refrigerators. In fact, the refrigerator in the prior art still has a fatal defect affecting the fresh-keeping that has not been solved or noticed, that is, it has no ventilation function, and the air in the refrigerator is quickly polluted to affect the fresh-keeping effect. Although there is a certain ventilation effect when opening and closing the door of the refrigerator, it is not thorough and reliable. All the above defects are basically solved in the embodiments of the present disclosure. The technologies of household appliances such as washing machines, dishwasher/fruit and vegetable cleaning machines, range hoods and microwave ovens are also facing the problem of updating and upgrading. An objective of the embodiment of the present disclosure is to provide a new technology and a new method to solve the above problems and update and upgrade some existing household appliances, especially household appliances.

SUMMARY

The embodiments of the present disclosure provide a positive and negative pressure system and positive and negative pressure electrical appliances using the same. Multiple technologies such as vacuum, high pressure, super oxygen, catalysts, modified atmosphere fresh-keeping, negative ions, humidification and dehumidification, disinfection, air purification, air water production and low-temperature storage are regulated and integrated by the positive and negative pressure system, and are combined and applied in the positive and negative pressure electrical appliance, so that a respiration function is given to the electrical appliance, existing electrical appliances and traditional technologies are upgraded and updated, and a subdivided field of positive and negative pressure electrical appliances is developed. Electrical equipment, transportation compartments and containers and storage warehouses using the intelligent positive and negative pressure system in the embodiment of the present disclosure are uniformly referred to as: intelligent positive and negative pressure electrical appliances; and the intelligent positive and negative pressure electrical appliances in the embodiments of the present disclosure comprise an intelligent positive and negative pressure refrigerator, an intelligent positive and negative pressure washing machine, an intelligent vacuum dishwasher/fruit and vegetable cleaning machine, an intelligent super-oxygenated water washing range hood, an intelligent positive and negative pressure oven/fryer/microwave oven, an intelligent positive and negative pressure fresh-keeping compartment, an intelligent positive and negative pressure fresh-keeping warehouse, and an intelligent positive and negative pressure modular cabinet. The embodiments of the present disclosure employ the following technical solutions:

The embodiments of the present disclosure provide an intelligent positive and negative pressure system and intelligent positive and negative pressure electrical appliances using the same. The positive and negative pressure refer to a positive atmospheric pressure and a negative atmospheric pressure taking the atmospheric pressure atm or the local instant atmospheric pressure as the zero standard. In the embodiments of the present disclosure, the positive atmospheric pressure is also called positive pressure or high pressure, and the negative atmospheric pressure is also called negative pressure or vacuum; and the positive and negative pressure are also called ZhengFuYa or Zheng negative pressure or +/−atm or +/−at, the above related names have the same meaning and are general in the embodiments of the present disclosure.

In accordance with a first embodiment of the present disclosure, an intelligent positive and negative pressure system is provided. The system comprises a positive and negative pressure chamber 1 (which is also called a vacuum high-pressure chamber), a suction pump 2, an inflation pump 3, a positive and negative pressure intelligent regulation device 5, and positive and negative pressure airflow load generation processors. The positive and negative pressure chamber 1 comprises a chamber body 1.1, a chamber door 1.2, an airtight mechanism 1.3, and an internal and external communicating sealer 1.4. The airtight mechanism 1.3 is arranged between the chamber body 1.1 and the chamber door 1.2; the internal and external communicating sealer 1.4 is fixedly arranged at the rear part of the positive and negative pressure chamber 1, and all pipelines and circuits getting in and out the chamber are connected to and pass through the internal and external communicating sealer 1.4 so as to keep the sealing property of the positive and negative pressure chamber 1. The positive and negative pressure chamber 1 is externally provided with the suction pump 2, the inflation pump 3, the positive and negative pressure intelligent regulation device 5, and a modified atmosphere device 6.1 which is one of the positive and negative pressure airflow load generation processors. An air suction pipeline A1 is installed at an air inlet a of the suction pump 2, a solenoid valve B1 is installed at the middle part of the air suction pipeline A1, and the other end of the air suction pipeline A1 extends into the positive and negative pressure chamber 1 to form an air suction and air return port c. An exhaust pipeline A2 is installed at an air outlet b of the suction pump 2, the other end of the exhaust pipeline A2 is open to the atmosphere. An inflation pipeline A3 is installed at an air outlet d of the inflation pump 3, a solenoid valve B3 is installed at the middle part of the inflation pipeline A3, the other end of the inflation pipeline A3 extends into the positive and negative pressure chamber 1 to form an inflatable air inlet f thereof. An air intake pipeline A4 is installed at an air inlet e of the inflation pump 3, a solenoid valve B4 is installed at the middle part of the air intake pipeline A4, and the other end of the air intake pipeline A4 is open to the atmosphere. A circulating pipeline A5 is further connected to the solenoid valve B4, a solenoid valve B5 is installed at the middle part of the circulating pipeline A5, and the other end of the circulating pipeline A5 is connected to the solenoid valve B3, and extends into the positive and negative pressure chamber 1 through the inflation pipeline A3 to form a circulating air return port j of the positive and negative chamber. A modified atmosphere air intake pipeline A6 is installed at an air inlet t of the modified atmosphere device 6.1, a solenoid valve B6 is installed at the middle part of the modified atmosphere air intake pipeline A6, the other end of the modified atmosphere air intake pipeline A6 is connected to the inflation pipeline A3 and then communicates with an air outlet d of the inflation pump 3. A modified atmosphere air outlet pipeline A7 is installed at an air outlet s of the modified atmosphere device 6.1, a solenoid valve B7 is installed at the middle part of the modified atmosphere air outlet pipeline A7, the other end of the modified atmosphere air outlet pipeline A7 extends into the positive and negative pressure chamber 1 to form a modified atmosphere air inlet i thereof, and when the modified atmosphere gas entering the positive and negative pressure chamber 1 needs to be circulated, the inflatable air inlet f is used as the circulating air return port j of the positive and negative pressure chamber 1. The positive and negative pressure chamber 1 is internally provided with the positive and negative pressure airflow load generation processors, comprising a super oxygen (ozone) generator 6.2, a negative ion generator 6.3, an air catalyst controlled release device 6.4, and a humidifier 6.5; the positive and negative pressure chamber 1 is internally provided with sensors, comprising a pressure sensor C1, a negative pressure sensor C2, a super oxygen sensor C3, a negative oxygen ion sensor C4, a chlorine dioxide sensor C5, a humidity sensor C6, an oxygen sensor C7, and a nitrogen sensor C8; the suction pump 2, the inflation pump 3, the modified atmosphere device 6.1, the super oxygen generator 6.2, the negative ion generator 6.3, the air catalyst controlled release device 6.4, the humidifier 6.5, the sensors C1 to C8 and the solenoid valves B1 to B7 are all connected to the positive and negative pressure intelligent regulation device 5.

In accordance with a second embodiment of the present disclosure, an operation method for the intelligent positive and negative pressure system is provided. The technical principle and a basic operation method for the intelligent positive and negative pressure system are as follows: intelligently regulating air flow with positive and negative pressure, or carrying multiple effective loads such as super oxygen, an air catalyst, a negative ion, modified atmosphere gas and water for orderly getting in and out of or staying in a specific space (the positive and negative pressure chamber), and exerting the required effects on objects therein; the specific operation method for the intelligent positive and negative pressure system is that the positive and negative pressure intelligent regulation device 5, after calculation processing, sends specific on/off instructions to the suction pump 2, the inflation pump 3, the positive and negative pressure airflow load generation processors and solenoid valves in real time according to built-in procedures and prestored data and real-time feedback information of various sensors C1 to C8, such that the open, close and switching of various air suction pipelines, inflation pipelines and circulating pipelines are controlled and adjusted to intelligently regulate the level of positive and negative pressure in the positive and negative pressure chamber 1 and the flowing in, staying and flowing out of the airflow and loads thereof; the specific operation method is as follows: (1) an operation method for regulating the interior of the positive and negative pressure chamber 1 into negative pressure (vacuum) is as follows: sending an instruction by the positive and negative pressure intelligent regulation device 5 to enable the solenoid valve B1 to open the air suction pipelines A1 and A2 (air suction and air return port c of the positive and negative pressure chamber→air suction pipeline A1→the solenoid valve B1→A1→air inlet a of the suction pump-→air outlet b of the suction pump→A2→exhaust to atmosphere) (when any pipeline is opened, other irrelevant solenoid valves are all closed, the following is the same and will not be described again), turning on the suction pump 2 to vacuumize the interior of the positive and negative pressure chamber 1 to a set negative pressure (vacuum); (2) an operation method for regulating the interior of the positive and negative pressure chamber 1 to a positive pressure (high pressure) is as follows: sending an instruction by the positive and negative pressure intelligent regulation device 5 to enable the solenoid valves B3 and B4 to open the inflation pipelines A3 and A4 (intake from atmosphere→A4→B4→A4→air inlet e of the inflation pump→air outlet d of the inflation pump→A3→B3→A3→inflatable air inlet of the positive and negative pressure chamber), and turning on the inflation pump 3 to inflate the interior of the positive and negative pressure chamber 1 to the set positive pressure (high pressure); (3) an operation method for regulating airflow and loads thereof to flow in, stay in or flow out of the positive and negative pressure chamber 1 is as follows: ① outflow, pumping the airflow and loads thereof out of the positive and negative pressure chamber 1 through the air suction pipelines by using the suction pump according to the above specific method (1); ② inflow, inflating the airflow and loads thereof into the positive and negative pressure chamber through the inflation pipelines by using the inflation pump according to the above specific method (2); ③ staying, when the positive and negative pressure airflow and loads thereof need to stay in the positive and negative pressure chamber, sending an instruction by the positive and negative pressure intelligent regulation device 5 to turn on the suction pump 2 and open the air suction pipelines, or turn on the inflation pump 3 and open the inflation pipelines, or turn on the positive and negative pressure airflow load generation processors in the positive and negative pressure chamber and close other irrelevant solenoid valves until the positive and negative pressure in the chamber or the number and staying time of airflow loads in the chamber reach the standards; ④ circulating: when the airflow or loads thereof such as modified atmosphere gas needs to circulate through the positive and negative pressure chamber 1 and the modified atmosphere device 6.1 to enable the gas concentration in the positive and negative pressure chamber to reach the concentration, sending an instruction by the positive and negative pressure intelligent regulation device 5 to enable the solenoid valves B6 and B7 to open modified atmosphere inflation pipelines A6 and A7 (air outlet d of the inflation pump→A3→A6→B6→A6→air inlet t of the modified atmosphere device→air outlet s→A7→B7→A7→modified atmosphere air inlet i of the positive and negative pressure chamber), and enabling the solenoid valves B3, B4 and B5 to open the modified atmosphere circulating pipelines A3, A5 and A4 (circulating air return port j of the positive and negative pressure chamber→A3→B3→A5→B5→A5→B4→A4→air inlet e of the inflation pump), and turning on the inflation pump 3 to enable the modified atmosphere gas to circulate until the concentration of the modified atmosphere gas, the atmospheric pressure and staying time in the positive and negative pressure chamber reach the stander; by using the methods, multiple technologies such as vacuum, high pressure, super oxygen, catalysts, modified atmosphere freshkeeping, negative ions, humidification and dehumidification, disinfection, air purification, air water production, and low-temperature storage are intelligently regulated and integrated by the intelligent positive and negative pressure system, and are combined and applied, or individually applied to, electrical equipment, transportation compartments and containers, storage warehouses, and the like; and due to the arrangement and use of the intelligent positive and negative pressure system, the electrical equipment, transportation compartments and containers, and storage warehouses are uniformly referred to as: intelligent positive and negative pressure electrical appliances; and the intelligent positive and negative pressure electrical appliances in the embodiment of the present disclosure comprise an intelligent positive and negative pressure refrigerator, an intelligent positive and negative pressure washing machine, an intelligent vacuum dishwasher/fruit and vegetable cleaning machine, an intelligent super-oxygenated water washing range hood, an intelligent positive and negative pressure oven/fryer/microwave oven, an intelligent positive and negative pressure fresh-keeping compartment, an intelligent positive and negative pressure fresh-keeping warehouse, and an intelligent a positive and negative pressure modular cabinet.

In accordance with a third embodiment of the present disclosure, an intelligent positive and negative pressure refrigerator is provided. The refrigerator comprises a refrigerator body 7. The refrigerator body 7 is internally provided with an intelligent positive and negative pressure system, a refrigeration system 8, a general refrigerator compartment 9, a general freezer compartment 10, an air water production device 11, and a touch screen and mobile phone monitoring system 12. The intelligent positive and negative pressure system comprises a positive and negative pressure chamber 1, a suction pump 2, an inflation pump 3, a positive and negative pressure intelligent regulation device 5, and positive and negative pressure airflow load generation processors. The positive and negative pressure chamber 1 comprises a chamber body 1.1, a chamber door 1.2, an internal and external communicating sealer 1.4, a pneumatic airtight mechanism 1.5, an electric airtight mechanism 1.6, a pneumatic chamber door switch 1.8, and an electric chamber door switch 1.9. The chamber door 1.2 is a refrigerator door of the positive and negative pressure refrigerator. The positive and negative pressure chamber 1 is designed into a vacuum high pressure refrigerating chamber 1-1 and a vacuum high pressure freezing chamber 1-2 according to particular refrigerating and freezing requirements of the refrigerator. The pneumatic airtight mechanism 1.5 is arranged between the chamber door 1.2 and the chamber body 1.1 of the vacuum high pressure refrigerating chamber 1-1. The pneumatic airtight mechanism 1.5 comprises pneumatic sealing lock bolts 1.51 and sealing lock bolt telescopic airbags 1.52 which are integrally manufactured at the rear parts of the sealing lock bolts 1.51, the number of the sealing lock bolts 1.51 and the sealing lock bolt telescopic airbags 1.52 which are of an integrated structure is four, and the integrated structures are all in the shape of long strips and respectively installed in four chamber airtight grooves 1.11 arranged in four borders of the door frame of the chamber body 1.1, the outer layer of the door section of the lock bolt is sealing rubber, and the inside of the lock bolt is a bend-resistant metal core. The sealing lock bolt foldable telescopic airbag 1.52 is a foldable rubber airbag which can be inflated to elongate; an inflation socket 1.53 is arranged at the rear part of each airbag, and an inflation plug 1.54 is plugged into the inflation socket 1.53; and four inflation plugs 1.54 are respectively installed at respective midpoints of four side pipelines connected to the four edges of a square annular airtight mechanism inflatable branch pipeline A8.1. The pipeline at the bottom side of the square annular airtight mechanism inflatable branch pipeline A8.1 is perpendicularly connected to an airtight mechanism inflation pipeline A8 and communicates with an air outlet d of the inflation pump 3 by a solenoid valve B8 and a pipeline A3 as well as a solenoid valve B3. When closed, the chamber door 1.2 makes contact with the pneumatic chamber door switch 1.8, and the inflation pump 3 is immediately started to inflate and elongate the sealing lock bolt foldable telescopic airbag 1.52 and push the sealing lock bolt 1.51 to extend outwards from the chamber airtight groove 1.11 and extend into the chamber door airtight groove 1.21 arranged at the opposite position, thereby locking and sealing the chamber door. When a user opens the chamber door, the sealing lock bolt foldable telescopic airbag 1.52 is deflated by the pneumatic chamber door switch 1.8, such that the sealing lock bolt 1.51 retracts to open the chamber door. The electric airtight mechanism 1.6 is arranged between a chamber door 1.2 and a chamber body 1.1 of the vacuum high pressure freezing chamber 1-2. The electric airtight mechanism 1.6 comprises electric sealing lock bolts 1.61, electromagnets 1.62, and tension springs 1.63; a total of four sealing lock bolts 1.61 is provided, the sealing lock bolts are all in the shape of long strips and movably installed in four chamber airtight grooves 1.11 arranged in the periphery of the door frame of the chamber body and hung onto the tension springs 1.63, respectively, and the other ends of the tension springs are fixedly hung at the bottom in the chamber airtight grooves 1.11; the outer layer of the section of the bolt body of each of the sealing lock bolts 1.61 is a sealing rubber layer, and the inside of the bolt body is a bend-resistant and magnetic-attractive metal core. The sealing rubber layer, facing the electromagnet 1.62, on one side of the sealing lock bolt is open to partially expose the inner metal core so as to be attracted by the electromagnet 1.62. The electromagnet 1.62 is also in the shape of long strip corresponding to the shape of the sealing lock bolt 1.61 and is fixedly installed in the groove bottom of the chamber door airtight groove 1.21 corresponding to the chamber airtight groove 1.11. When the sealing is required after the door is closed, the electromagnet 1.62 is powered by the electric chamber door switch 1.9 to generate magnetic force to attract the sealing lock bolt 1.61 installed in the opposite chamber airtight groove 1.11 into the chamber door airtight groove 1.21. During door opening, the electromagnet 1.62 is powered off by the electric chamber door switch 1.9, the magnetic force disappears, the sealing lock bolt 1.61 is pulled back into the chamber airtight groove 1.11 by the tension spring 1.63 so as to open the chamber door. The internal and external communicating sealer 1.4 is fixedly arranged at the rear part of the positive and negative pressure chamber 1, all pipelines and circuits getting in and out the chamber are connected to and pass through the internal and external communicating sealer 1.4 so as to keep the sealing property of the positive and negative pressure chamber 1. The positive and negative pressure chamber 1 is externally provided with the suction pump 2, the inflation pump 3, the positive and negative pressure intelligent regulation device 5, a modified atmosphere device 6.1, a super oxygen decomposer 6.7, an air filter 6.8, a refrigeration system 8, an air water production device 11, a filtering water tank 11.1, and the touch screen and mobile phone monitoring system 12. An air suction pipeline A1 is installed at an air inlet a of the suction pump 2, air suction branch pipelines A1.1 and A1.2 are respectively connected to the air suction pipeline A1, solenoid valves B1.1 and B1.2 are respectively installed at the respective middle parts of the air suction branch pipelines A1.1 and A1.2, and the other ends of the air suction branch pipelines A1.1 and A1.2 respectively extend into the vacuum high pressure refrigerating chamber 1-1 and the vacuum high pressure freezing chamber 1-2 to form air suction and air return ports c1 and c2 thereof. An exhaust pipeline A2 is installed at an air outlet b of the suction pump 2, the super oxygen decomposer 6.7 and a solenoid valve B2 are installed at the middle part of the exhaust pipeline A2, the other end of the exhaust pipeline A2 communicates with an air inlet h of the air water production device 11, passes through the air water production device 11 and then is open to the atmosphere through an air outlet n of the air water production device 11. An inflation pipeline A3 is installed at an air outlet d of the inflation pump 3, a solenoid valve B3 is installed at the middle part of the inflation pipeline A3, inflation branch pipelines A3.1, A3.2, A3.3 and A3.4 are respectively connected to the other end of the inflation pipeline A3, solenoid valves B3.1, B3.2, B3.3 and B3.4 are installed at the respective middle parts of the inflation branch pipelines A3.1, A3.2, A3.3 and A3.4, respectively, and the other ends of inflation branch pipelines A3.1, A3.2, A3.3 and A3.4 respectively extend into the vacuum high pressure refrigerating chamber 1-1 and the vacuum high pressure freezing chamber 1-2. An inflatable air inlet f1 of the vacuum high pressure refrigerating chamber 1-1 is formed in the port of the other end of the A3.1, an inflatable air inlet f2 of the vacuum high pressure freezing chamber 1-2 is formed in the port of the other end of the A3.2, the other end of the A3.3 is connected to an air inlet G of an ultra-high pressure thawing chamber 1-3, and the other end of the A3.4 is connected to an air inlet Q of an ultra-high pressure deep-freezing chamber 1-4. An air intake pipeline A4 is installed at an air inlet e of the inflation pump 3, the air filter 6.8 and a solenoid valve B4 are installed at the middle part of the air intake pipeline A4, and the other end of the air intake pipeline A4 is open to atmosphere. A circulating pipeline A5 is further connected to the solenoid valve B4, circulating branch pipelines A5.1 and A5.2 are connected to the circulating pipeline A5, solenoid valves B5.1 and B5.2 are installed at the respective middle parts of the circulating branch pipelines A5.1 and A5.2, and the other ends of the circulating branch pipelines A5.1 and A5.2 respectively extend into the vacuum high pressure refrigerating chamber 1-1 and the vacuum high pressure freezing chamber 1-2 to form circulating air return ports j1 and j2 thereof. An air water production inflation pipeline A9 is further connected to the circulating pipeline A5, and the air water production inflation pipeline A9 is connected to the solenoid valve B2 to communicate with an air inlet h of the air water production device 11 through the exhaust pipeline A2. The air water production inflation pipeline A9 is connected to the circulating pipeline A5 and communicates with the solenoid valve B3, and then communicates with the air outlet d of the inflation pump 3 through the inflation pipeline A3. A modified atmosphere air intake pipeline A6 is installed at an air inlet t of the modified atmosphere device 6.1, a solenoid valve B6 is installed the middle part of the modified atmosphere air intake pipeline A6, and the other end of the modified atmosphere air intake pipeline is connected to the inflation pipeline A3 and then communicates with the air outlet d of the inflation pump 3 by the solenoid valve B3. Modified atmosphere air outlet pipelines A7.1 and A7.2 are respectively installed at air outlets s1 and s2 of the modified atmosphere device 6.1, solenoid valves B7.1 and B7.2 are respectively installed at the middle parts of the modified atmosphere air outlet pipelines A7.1 and A7.2, the other ends of the modified atmosphere air outlet pipelines A7.1 and A7.2 respectively extend into the vacuum high pressure refrigerating chamber 1-1 and the vacuum high pressure freezing chamber 1-2 to form respective modified atmosphere air inlets i1 and i2 thereof. The inflation pipeline A3 is further connected to an airtight mechanism inflation pipeline A8, a solenoid valve B8 is installed at the middle part of the airtight mechanism inflation pipeline A8, and the other end of the airtight mechanism inflation pipeline A8 is perpendicularly connected to the pipeline at the bottom side of the square annular airtight mechanism inflation branch pipeline A8.1. Four side pipelines of the square annular airtight mechanism inflation branch pipeline A8.1 communicate with one another, inflation plugs 1.54 are installed at respective middle parts of the four side pipelines, and the four inflation plugs 1.54 are all plugged into the inflation sockets 1.53. An air water production pipeline A10 is installed at a water outlet x of the air water production device 11, and the air water production pipeline A10 communicates with a water inlet y of the filtering water tank 11.1. Condensate water generated in the vacuum high pressure refrigerating chamber 1-1 flows into a water inlet Y of a condensate water collecting box installed at the bottom in the vacuum high pressure refrigerating chamber, a condensate water pipeline A11 is installed at a water outlet M of the condensate water collecting box 11.2, after the condensate water pipeline A11 extends out of the vacuum high pressure refrigerating chamber 1-1, a solenoid valve B11 is installed at the middle part of the condensate water pipeline A11, the other end of condensate water pipeline A11 communicates with a water inlet v of the filtering water tank 11.1. A humidification water pipeline A12 is installed at a water outlet o of the filtering water tank 11.1, a solenoid valve B12 is installed at the middle part of the humidification water pipeline A12, and the other end of the humidification water pipeline A12 extends into the vacuum high pressure refrigerating chamber 1-1 and communicates with a water inlet R of the humidifier 6.5. A refrigerating circulating pipeline A13 is installed on the refrigeration system 8, and respectively extends into the vacuum high pressure refrigerating chamber 1-1, the vacuum high pressure freezing chamber 1-2, the general refrigerator compartment 9 and the general freezer compartment 10 to communicate with an evaporator air-cooling assembly 8.1 and an evaporator direct-cooling assembly 8.2 respectively installed therein; the touch screen and mobile phone monitoring system 12 comprises a refrigerator door touch screen 12.1, a mobile phone APP 12.2, and a high-definition anti-fog camera device 12.3; the high-definition anti-fog camera device 12.3 is installed at the position needing to be monitored inside and outside the refrigerator body 7. The positive and negative pressure chamber 1 is internally provided with positive and negative pressure airflow load generation processors and sensors, comprising: a super oxygen generator 6.2, a negative ion generator 6.3, an air catalyst controlled release device 6.4, a humidifier 6.5, a condensate water collecting box 11.2, a pressure sensor C1, a negative pressure sensor C2, a super oxygen sensor C3, a negative oxygen ion sensor C4, a chlorine dioxide sensor C5, a humidity sensor C6, an oxygen sensor C7, a nitrogen sensor C8 and a temperature sensor C9 which are arranged in the vacuum high pressure refrigerating chamber 1-1; and an air catalyst controlled release device 6.4, a pressure sensor C1, a negative pressure sensor C2, a chlorine dioxide sensor C5, an oxygen sensor C7, a nitrogen sensor C8 and a temperature sensor C9 which are arranged in the vacuum high pressure freezing chamber 1-2. All airflow load generation processors, sensors, solenoid valves and devices installed inside and outside the positive and negative pressure chamber 1 comprise the suction pump 2, the inflation pump 3, the modified atmosphere device 6.1, the super oxygen generator 6.2, the negative ion generator 6.3, the air catalyst controlled release device 6.4, the humidifier 6.5, the super oxygen decomposer 6.7, the refrigeration system 8, an air water production device 11, the filtering water tank 11,1 the ultra-high-pressure unfreezing chamber 1-3, the ultra-high-pressure deep-freezing chamber 1-4, the touch screen and mobile phone monitoring system 12, the refrigerator door touch screen 12.1 the high-definition anti-fog camera device 12.3 the pressure sensor C1, the negative pressure sensor C2, the super oxygen sensor C3, the negative oxygen ion sensor C4, the chlorine dioxide sensor C5, the humidity sensor C6, the oxygen sensor C7, an nitrogen sensor C8, the temperature sensing controller C9, the water level sensor controller C10, and the solenoid valves B1 to B12 which are all connected to the positive and negative pressure intelligent regulation device 5.

In accordance with a fourth embodiment of the present disclosure, an operation method for the intelligent positive and negative pressure refrigerator is provided. The method comprises: (1) vacuum abatement heat-removal cleaning procedure: closing the vacuum high pressure refrigerating chamber door 1.2 of the positive and negative pressure refrigerator to touch the chamber door switch 1.8, sending an instruction by the positive and negative pressure intelligent regulation device 5 to enable the solenoid valves B3 and B8 to open the airtight mechanism inflation pipelines A8, A8 and A8.1 (air outlet d of inflation pump→A3→B3→A3→A8→B8→A8→A8.1→inflation plug 1.54→inflation socket 1.53→sealing lock bolt telescopic airbag 1.52), and turning on the inflation pump 3 to inflate the pneumatic airtight mechanism 1.5 so as to lock the chamber door 1.2; and meanwhile, enabling the solenoid valves B1.1 and B2 to open the air suction pipelines A1, A1.1 and A2 (air suction and air return port c1 of the vacuum high pressure refrigerating chamber 1-1→A1.1→B1.1→A1.1→A1→air inlet a of suction pump-→air outlet b→A2→air inlet g of super oxygen decomposer→air outlet m→A2→B2→A2→air inlet h of air water production device→air outlet n→A2→exhaust to atmosphere), and turning on the suction pump 2 to pump the vacuum high pressure refrigerating chamber 1-1 to a moderate vacuum (−0.01 KPa to −0.1 MPa) (taking the local instant atmospheric pressure as the zero standard, which is the same in the text, and improving the vacuum degree according to the specific demands and refrigerator configuration), pumping away the self-contained heat of fruits, vegetables, meat and fish, part of bacteria and microorganisms and polluted air in the chamber, vacuumizing to make volatile metabolites ethylene acetaldehyde ethanol and other harmful gases in the fruit and vegetable tissues to escape and be pumped away, while inhibiting the reproduction of residual bacteria with the negative pressure to reduce the potential risks of disease aging of fruits and vegetables; (2) depressurized and humidified storage procedure: according to the pressure standard of the preset procedure and the real-time feedback of the negative pressure sensor C2, turning the suction pump 2 on or off by the positive and negative pressure intelligent regulation device 5 to a maintain an appropriate negative-pressure, low-oxygen and low-temperature environment within the vacuum high pressure refrigerating chamber 1-1, thus reducing respiration intensity of fruits and vegetables, inhibiting the biosynthesis of ethylene, delaying decomposition of chlorophyll, inhibiting the synthesis of carotenoids and lycopene, and slowing down the processes such as hydrolysis of starch, increase of sugar and consumption of acid to delay mature senescence of the fruits and vegetables, and meanwhile, turning on the humidifier 6.5 to increase humidity in the chamber and prevent the water contained in the fruits and vegetables from escaping, thus maintaining the fresh state of the fruits and vegetables for a longer time; (3) super-oxygen pressurized sterilization and degradation procedure: according to the procedure setting and feedback of the sensors C3, C4 and C6, sending, by the positive and negative pressure intelligent regulation device 5, an instruction at a proper time to turn on the super oxygen generator 6.2, the negative oxygen ion generator 6.3 and the humidifier 6.5, thus enabling the super oxygen, humidity and negative oxygen ions in the vacuum high pressure refrigerating chamber 1-1 to reach the required standards; meanwhile, enabling the solenoid valves B3, B3.1 and B4 to open the inflation pipelines A3, A3.1 and A4 (intake from atmosphere→A4→B4→A4→air filter→A4→air inlet e of inflation pump→air outlet d→A3→B3→A3→A3.1→B3.1→A3.1→inflatable air inlet f1 of vacuum high pressure refrigerating chamber 1-1), and turning on the inflation pump 3 to properly pressurize the vacuum high pressure refrigerating chamber 1-1 to 0.01 KPa to 10 MPa (taking the local instant atmospheric pressure as the zero standard, and improving the pressure value according to the specific demands and refrigerator configuration), wherein the super oxygen at the appropriate positive pressure is able to perform sterilization, disinfection and mildew resistance on the fruits, vegetables, meat and fish in the vacuum high pressure refrigerating chamber 1-1 and degrade pesticide residues and ethylene and other gases exhaled by the metabolism of the fruits and vegetables, thus affecting enzyme activity in the fruits and vegetables, preventing the fruits and vegetables from browning and softening, and delaying the aging of the fruits and vegetables; and the appropriate high pressure further prevents the water contained in the fruits, vegetables, meat and fish from escaping, moreover, the moisture at the positive pressure is easier to permeate into the fruits, vegetables, meat and fish to supplement the water loss thereof caused by refrigeration and negative pressure, while the negative oxygen ions make the water cluster of moisture smaller so as to be absorbed by the fruits, vegetables, meat and fish easier and have the functions of inhibiting biological tissue metabolism, reducing respiration intensity, slowing down enzyme activity, and sterilizing and purifying to a certain extent; the super oxygen at the positive pressure is able to permeate into the deeper interior of the fruits, vegetables, meat and fish to play a better role in sterilization and disinfection (the super oxygen is automatically decomposed and reduced into oxygen in air and water for about 30 minutes, but is very stable in ice and has a very long half-life, so the vacuum high pressure freezing chamber 1-2 is not equipped with a super oxygen generator and does not use super oxygen); (4) modified atmosphere pressurized storage procedure: opening the air suction pipeline and turning on the suction pump 2 and the super oxygen decomposer 6.7 at a proper time by the positive and negative pressure intelligent regulation device 5 according to the procedure setting or the feedback of the sensors, pumping the decomposed, sterilized, disinfected and degraded polluted air out of the chamber, and then enabling the solenoid valves B3, B6 and B7.1 to open the modified atmosphere inflation pipelines A3, A6 and A7.1 (air outlet d of inflation pump→A3→B3→A3→A6→B6→A6→air inlet t of modified atmosphere device→air outlet s1→A7.1→B7.1→A7.1→modified atmosphere air inlet i1 of vacuum high pressure refrigerating chamber 1-1), and turning on the inflation pump 3 to drive the airflow to pass through a hollow fiber membrane of the modified atmosphere device 6.1 to separate the oxygen out, and enabling high-nitrogen low-oxygen gas to enter the vacuum high pressure refrigerating chamber 1-1; meanwhile, enabling the solenoid valves B5.1, B3 and B4 to open the modified atmosphere circulating pipelines (circulating air return port j1 of vacuum high pressure refrigerating chamber 1-1→A5.1→B5.1→A5.1→A5→B3→A5→B4→A4→air filter→A4→air inlet e of inflation pump→air outlet d of inflation pump); turning on the humidifier 6.5 until the modified atmosphere gas concentration, air humidify and positive atmospheric pressure in the chamber all reach the modified atmosphere pressurized storage standards; forming a nitrogen-rich and oxygen-poor environment with an appropriate proportion in the vacuum high-pressure chamber and maintaining the appropriate positive pressure and appropriate humidity to effectively control the respiration rate of the stored fruits and vegetables, thus preventing anaerobic respiration and carbon dioxide poisoning, slowing down the aging process, preventing the quality decrease and flavor loss of the stored fruits and vegetables, and maintaining the moisture and supplementing the water of the fruits and vegetables with the positive pressure so as to maintain the freshness of the fruits and vegetables to the maximum extent; (5) leftover food pressurized preservation procedure: placing the leftovers into the vacuum high pressure refrigerating chamber 1-1, turning on the suction pump 2 and the air suction pipelines by the regulation device 5 until the odor already released by the leftovers and the polluted air inside the chamber are pumped out of the chamber; turning on the inflation pump 3 and the inflation pipelines for properly pressurized preservation, which not only prevents the odor and water from excessively scattering and losing, but also inhibits the food spoilage; meanwhile, according to feedback information of the humidity sensor, turning on the humidifier 6.5 at a proper time to supplement the water in the air, or turning on the super oxygen generator 6.2 at a proper time to kill the bacteria in the air to prevent food spoilage; (6) low-temperature assisted fresh-keeping procedure: after the refrigerator is turned on, turning on the refrigeration system 8 instantly by the positive and negative pressure intelligent regulation device 5, communicating the refrigeration system 8 with the evaporator air-cooling assembly 8.1 and the evaporator direct cooling assembly 8.2 by a refrigerating pipeline A13, and providing corresponding low temperature for various chambers according to the feedback and control of the temperature sensing controller C9, thus assisting the positive and negative pressure system to keep the freshness of the stored objects; (7) high-pressure rapid freezing and thawing and high-pressure unfreezing storage procedure: providing an ultra-high-pressure deep-freezing chamber 1-3 in the freeze area of the positive and negative pressure refrigerator, and providing an ultra-high-pressure unfreezing chamber 1-4 in the refrigeration area special for high-quality freezing fresh-keeping, thawing fresh-keeping and high-pressure unfreezing storage of the meat, fish and seafoods; and pressurizing the ultra-high-pressure unfreezing chamber 1-4 by the inflation pump 3, wherein a certain ultra-high pressure may affect the freezing point, crystallization process and the size and shape of ice crystals of water in the tissues and cells of the meat and fish, and in the range of 0 MPa to 209.9 MPa, the freezing point of water decreases with the increase of the pressure, and the water can only be frozen at the lowest freezing point of −21.99° C. when the pressure is 209.9 MPa; by using the principle, the maximum formation zone of ice crystals in the normal temperature freezing can be avoided, and the problem that the tissues and cells of the fish and meat are damaged due to the long staying time at the maximum ice crystal zone during the traditional freezing and thawing at normal pressure is solved to a certain extent, so the quality, flavor and freshness of the stored high-water food such as meat, fish and seafood can be perfectly maintained; although the ultra-high-pressure chamber in the present disclosure cannot be arranged in the refrigerator at a proper low cost in accordance with the prior art and the existing materials, the providing of the ultra-high-pressure chamber in the refrigerator can be gradually achieved rapidly with the development of science and technology; (8) open-to-exhaust protection function: if the refrigerator door is opened during super-oxygen sterilization and disinfection or modified atmosphere storage, providing feedback immediately by the chamber door switch, and stopping the super oxygen or modified atmosphere procedure immediately through the operation of the positive and negative pressure intelligent regulation device 5; and meanwhile, opening the air suction pipelines and turning on the suction pump 2 to rapidly pump the super oxygen or high-nitrogen low-oxygen gas to the super oxygen decomposer 6.7 at the rear part of the refrigerator to be exhausted after being decomposed, wherein, as the air flows from the human side to the vacuum high pressure refrigerating chamber for supplementing air suction negative pressure, the user is not exposed to and is protected from the super oxygen and high-nitrogen low-oxygen gas; (9) air water production procedure: enabling moist waste gas extracted from the vacuum high-pressure chamber by the suction pump 2 to enter the super oxygen decomposer 6.7, and enabling the moist waste gas to enter the air water production device 11 after the super oxygen is decomposed, condensing water vapor and filtering the condensed water vapor into purified water conforming to drinking water standard, thus providing uninterrupted source of water for the humidifier 6.5; when the inflation pump 3 is idle, turning on the inflation pump 3 by the intelligent regulation device 5, and enabling the solenoid valves B3 and B2 to open the air water production inflation pipelines (air outlet d of inflation pump→A3→B3→A5→A9→B2→A2→air inlet h of air water production device), driving the indoor air to enter the air water production device 11 for water production; (10) remote and short-range control monitoring function: controlling and monitoring, by the touch screen and mobile phone monitoring system 12, the refrigerator and other positive and negative pressure electrical appliances and a positive and negative pressure modular cabinet in real time by the WIFI and mobile phone APP at remote and short-range, thus making the refrigerator and other all positive and negative pressure electrical appliances and modular cabinets to intelligently achieve various functions at high efficiency and low consumption according to the set procedures and instant instructions; shooting, by the high-definition anti-fog camera device 12.3, the statuses of objects in the refrigerator in real time; displaying and reminding, by a refrigerator door touch screen 12.1 or a mobile phone APP 12.2, commodity information such as production date, price, expiration date and manufacturers and the information of purchase shopping malls and online stores, automatically recording, analyzing and handling the big data such as the time, quantity, frequency and preference of storing the objects in, and taking the objects out, the refrigerator, and performing intelligent analysis; timely reminding on the mobile phone APP 12.2 or directly pushing the suggested goods to the mobile phone APP 12.2 or the refrigerator door touch screen 12.1 for easy selection of purchase by the user, wherein, in addition to real-time monitoring and recording, the high-definition anti-fog camera device 12.3 is especially required to automatically and continuously shoot several panoramic photos of the objects in the refrigerator with the closing movement of the refrigerator door 1.2 by starting from the position remote away from the refrigerator box in the process of closing the refrigerator door, or automatically record small videos at the same time for the users to view in the mobile phone APP, or view the panoramic photos or videos of the objects in the refrigerator with good light and wide field of vision before and during the last closing of the door in the refrigerator door touch screen at any time without opening the refrigerator door, releasing the vacuum and lowering the temperature during short range; and (11) positive and negative pressure module combined intelligent smart home mode: designing and manufacturing the intelligent positive and negative pressure refrigerator according to the module functions, wherein the intelligent positive and negative pressure refrigerator not only can be independently produced and used as a separated invention, or but also can be organically combined with other positive and negative pressure electrical appliances and the modular cabinets under the control of the touch screen and mobile phone APP monitoring system 12 to form a fully functional intelligent positive and negative pressure module combined home; the fully functional intelligent positive and negative pressure module combined home not only can share the positive and negative pressure system, the refrigeration system and the air water production device, but also has basically uniform, neat and harmonious appearance, shape and color which are in line with the popular trend; in conclusion, in accordance with the specific operation method for the intelligent positive and negative pressure refrigerator, multiple technologies such as vacuum, high pressure, super oxygen, modified atmosphere freshkeeping, low-temperature storage, negative oxygen ions, air catalysts, humidification and air water production can be intelligently regulated and integrated, and can be alternately or circularly used in different combinations of single, double or multiple items; moreover, different types of vacuum high-pressure chambers can be arranged in one refrigerator, the fruits, vegetables, meat and fish stored in the refrigerator can be kept at a moisture and fresh quality flavor for a long time according to individualized policy and classified regulation, and meanwhile, the refrigerator is more energy efficient, low-consumption and suitable for use.

In accordance with a fifth embodiment of the present disclosure, an intelligent positive and negative pressure washing machine is provided. The intelligent positive and negative pressure washing machine comprises a machine body 7. The machine body 7 is internally provided with an intelligent positive and negative pressure system, a washing-dehydrating-drying system 15, and a touch screen and mobile phone monitoring system 12. The intelligent positive and negative pressure system comprises a positive and negative pressure chamber 1, a suction pump 2, an inflation pump 3, a positive and negative pressure intelligent regulation device 5, and positive and negative pressure airflow load generation processors. The positive and negative pressure chamber 1 is designed as a vacuum high pressure drum outer chamber 1-5 according to particular requirements for washing and drying. The vacuum high pressure drum outer chamber 1-5 comprises a chamber body 1.1, a chamber door 1.2, a mechanical airtight mechanism 1.3, and an internal and external communicating sealer 1.4. The chamber door 1.2 is a machine door of the positive and negative pressure washing machine; the mechanical airtight mechanism 1.3 is arranged between the chamber door 1.2 and the chamber body 1.1 of the vacuum high pressure drum outer chamber 1-5. The mechanical airtight mechanism 1.3 comprises a lock ring 1.31, a lock bolt 1.32, an airtight gasket 1.33, and a door rim sealing gasket 1.34; the lock ring 1.31 is in movable fit with the lock bolt 1.32, the lock bolt 1.32 extends into the lock ring 1.31 to lock the chamber door during the closing of the chamber door. When the positive and negative atmospheric pressure is formed inside the vacuum high pressure drum outer chamber 1-5, the airtight gasket 1.33 is used for keeping sealing. The internal and external communicating sealer 1.4 is fixedly arranged at the rear part of the vacuum high pressure drum outer chamber 1-5, and all pipes and circuits getting in and out the chamber are connected to and pass through the internal and external communicating sealer 1.4 so as to keep the sealing property of the vacuum high pressure drum outer chamber 1-5. The vacuum high pressure drum outer chamber 1-5 is internally provided with a drum mechanism 15.1, an anti-shower air suction port 2.1, a drum sealing bearing block 15.3, a pressure sensor C1 and a negative pressure sensor C2. The vacuum high pressure drum outer chamber 1-5 is externally provided with the suction pump 2, the inflation pump 3, the positive and negative pressure intelligent regulation device 5, a washing-dehydrating-drying control mechanism 15.2, a drum big belt pulley 15.4, a motor assembly 15.5, a drainage pump 16, a water intake pump 17, a super oxygen generation water mixer 6.6, a super oxygen decomposer 6.7, a touch screen and mobile phone APP monitoring system 12, and a detergent pull box 18. An air suction pipeline A1 is installed at an air inlet a of the suction pump 2, a solenoid valve B1 is installed at the middle part of the air suction pipeline A1, and the other end of the air suction pipeline A1 extends into the vacuum high pressure drum outer chamber 1-5 and then is connected with the anti-shower air suction port 2 to form an air suction and air return port c, and an air outlet b of the suction pump 2 is open to the atmosphere. An inflation pipeline A3 is installed at an air outlet d of the inflation pump 3, a solenoid valve B3 is installed at the middle part of the inflation pipeline A3, the other end of the inflation pipeline A3 extends into the vacuum high pressure drum outer chamber 1-5 and extends below the drum mechanism 15.1 to form an inflatable air inlet f, and an air inlet e of the inflation pump 3 is open to the atmosphere. A water inlet pipeline A14 is installed at a water inlet r of the water intake pump 17, a solenoid valve B14 is installed at the middle part of the water inlet pipeline A14, and the other end of the water inlet pipeline A14 communicates with a tap water source. A washing machine water inlet pipeline A15 is installed at a water outlet u of the water intake pump 17, a solenoid valve B15 is installed at the middle part of the water inlet pipeline A15, and the other end of the water inlet pipeline A15 communicates with a water inlet k of the super oxygen generation water mixer 6.6. A washing machine water inlet pipeline A16 is installed at a water outlet q of the super oxygen generation water mixer 6.6, a solenoid valve B16 is installed at the middle part of the water inlet pipeline A16, and the other end of the water inlet pipeline A16 communicates with a water inlet z of the detergent pull box 18. A washing machine water inlet pipeline A17 is installed at a water outlet 1 of the detergent pull box 18, a solenoid valve B17 is installed at the middle part of the water inlet pipeline A17, and the other end of the water inlet pipeline A17 extends into the vacuum high pressure drum outer chamber 1-5 to form a water inlet T thereof. A water inlet pipeline A18 is installed on the solenoid valve B14, and the solenoid valve B14 communicates with the solenoid valve B16 so as to directly feed water when super-oxygenated water is not needed and the tap water pressure reaches the standard. A water inlet pipeline A19 is further installed on the solenoid valve B15, and the solenoid valve B15 is connected to the water inlet pipeline A18 to communicate with the solenoid valve B16, such that the water is directly fed by the water intake pump 17 when the super-oxygenated water is not needed; a drainage pipeline A20 is installed at a water inlet w of the drainage pump 16, a solenoid valve B20 is installed at the middle part of the drainage pipeline A20, and the other end of the drainage pipeline A20 extends into the vacuum high pressure drum outer chamber 1-5 to form a drainage port L thereof. A drainage pipeline A21 is installed at a water outlet p of the drainage pump 16, a solenoid valve B21 is installed at the middle part of the drainage pipeline A21, and the other end of the drainage pipeline A21 communicates with a water inlet g of the super oxygen decomposer 6.7. A drainage pipeline A22 is installed at a water outlet m of the super oxygen decomposer 6.7, a solenoid valve B22 is installed at the middle part of the drainage pipeline A22, and the other end of the drainage pipeline A22 communicates with a sewer. A drainage pipeline A23 is further installed on the solenoid valve B20, and the solenoid valve B20 communicates with the solenoid valve B22, such that the water is directly drained when the super oxygen does not need to be decomposed and free drainage can be achieved. A drainage pipeline A24 is further installed on the solenoid valve B21, and the solenoid valve B21 is connected to the drainage pipeline A23 and then communicates with the solenoid valve B22, such that the water is directly drained by the drainage pump 16 when super oxygen does not need to be decomposed. The big belt pulley 15.4 is driven by the motor assembly 15.5, and the big belt pulley 15.4 drives the drum mechanism 15.1 connected thereto to operate; the suction pump 2, the inflation pump 3, the drainage pump 16, the water intake pump 17, the super oxygen generation water mixer 6.6, the super oxygen decomposer 6.7, the washing-dehydrating-drying control mechanism 15.2, the touch screen and mobile phone APP monitoring system 12, the pressure sensor C1, the negative pressure sensor C2 and the solenoid valves B1 to B22 are all connected to the positive and negative pressure intelligent regulation device 5.

In accordance with a sixth embodiment of the present disclosure, an operation method for the intelligent positive and negative pressure washing machine is provided. The method comprises the following steps: (1) water inlet procedure: placing clothing into the drum 15.1, closing the machine door, i.e., the vacuum high-pressure chamber door 1.2 to seal and lock the vacuum high pressure drum outer chamber 1-5 after the washing machine is turned on; sending an instruction by the positive and negative pressure intelligent regulation device 5 to enable the solenoid valves B14, B15, B16 and B17 to open the corresponding water inlet pipelines ① direct tap water inlet line is:

A14→B14→A18→B16→A16→water inlet z of detergent pull box→water outlet 1→A17→B17→A17→water inlet T of drum outer chamber; ② when super-oxygenated water is required for washing, a water inlet line for water intake pump is: A14→B14→A14→water inlet r of water intake pump→water outlet u→A15→B15→A15→water inlet k of super oxygen generation water mixer→water outlet q→A16→B16→A16→detergent pull box z→water outlet 1→A17→B17→A17→water inlet T of drum outer chamber; and ③ when super-oxygenated water is not required for washing, water inlet line for water intake pump is: A14→B14→A14→water inlet r of water intake pump→water outlet u→A15→B15→A19→A18→B16→A16→water inlet z of detergent pull box→water outlet 1→A17→B17→A17→water inlet T of drum outer chamber), and turning on the water intake pump 17, directly feeding the tap water accordingly, or by the super oxygen generation water mixer 6.6, rapidly mixing the tap water with the super oxygen generated by the super oxygen generation water mixer 6.6 into super-oxygenated water with an appropriate concentration, and feeding the super-oxygenated water into the vacuum high pressure drum outer chamber 1-5 to accelerate the decomposition of organic fouling on the clothing, thus facilitating the rapid cleaning; after the water intake is started, enabling, by the positive and negative pressure intelligent regulation device 5, the solenoid valve B1 to open the air suction pipeline A1 (air inlet a of suction pump→A1→B1→A1→air suction and air return port c of drum outer chamber 1-5), and turning on the suction pump 2 to make the vacuum high pressure drum outer chamber 1-5 in a moderate negative pressure, thus accelerating the water intake and shortening the time for water intake; (2) vacuum washing procedure: after the water intake is finished, turning on, by the positive and negative pressure intelligent regulation device 5, the motor assembly 15.5 to drive the drum mechanism 15.1 to rotate for washing, and meanwhile, enabling the solenoid valve B1 to open the air suction pipeline A1 (air inlet a of suction pump→A1→B1→A1→air suction and air return port c of drum outer chamber 1-5), and turning on the suction pump 2 to pump the vacuum high pressure drum outer chamber 1-5 to a moderate vacuum, wherein both the clothing fibers and stains expand in the moderate vacuum and the air therein escapes, such that the adhesive force of the stains is weaken or the stains fall off, the cleaning efficiency is improved, and the washing time is shortened, and during the laundry process, the super-oxygenated water directly kills bacteria and viral microorganisms on clothing, the organic matters in the dust and fouling on the clothing are decomposed and then dissolved into the water, the dirt removability of the detergent is enhanced, the degree of cleaning is improved, the cleaning process is accelerated, and the function of sterilization and deodorization is achieved at the same time; (3) high-pressure washing procedure: after washing at vacuum for a proper time, closing the solenoid valve B1 and turning off the suction pump 2 by the positive and negative pressure intelligent regulation device 5, enabling the solenoid valve B3 to open the inflation pipeline A3 (air outlet d of inflation pump 3→A3→B3→A3→inflatable air inlet f of drum outer chamber 1-5), and turning on the inflation pump 3 to feed the high-pressure airflow into the vacuum high pressure drum outer chamber 1-5 through the inflation pipeline A3, and forming a strong bubble torrent at the lower part of the drum mechanism 15.1 to participate into washing, wherein the high pressure formed inside the vacuum high pressure drum outer chamber 1-5 is beneficial for the detergent to permeate into the clothing for cleaning; circulating the air suction and inflation repeatedly for the alternation of fiber expansion and torrent kneading, thus improving the degree of cleaning and the washing efficiency greatly, and accelerating the washing and rinsing processes; (4) drainage-dehydrating procedure: sending an instruction by the positive and negative pressure intelligent regulation device 5 when the drainage is required, enabling the solenoid valves B20, B21 and B22 to open the corresponding drainage pipelines (① when both the drainage pump and the decomposition of super oxygen are not required, the direct drainage line is: drainage port L of drum outer chamber→A20→B20→A23→B22→A22→sewer; ② when both the drainage pump for drainage and the decomposition of super oxygen are required, the drainage line is: drainage port L of drum outer chamber→A20→B20→A20→water inlet w of drainage pump-water outlet p→A21→B21→A21→water inlet g of super oxygen decomposer→water outlet m→A22→B22→A22→sewer; and ③ when the drainage pump is required for drainage and the decomposition of super oxygen is not required, the drainage line is: drainage port L of drum outer chamber→A20→B20→A20→water inlet w of drainage pump→water outlet p→A21→B21→A24→A23→B22→A22→sewer), turning on the drainage pump 16 for drainage, during drainage, turning on the inflation pump 3 to inflate and pressurize the vacuum high pressure drum outer chamber 1-5, thus accelerating the drainage speed; after the drainage is finished, sending an instruction by the positive and negative pressure intelligent regulation device 5 to start dehydration; during dehydration, inflating and pressurizing to force the water to rapidly separate from the clothing; turning on the suction pump 2 alternately to pump negative pressure to make the clothing fibers in the vacuum high pressure drum outer chamber 1-5 expand, wherein the water in the clothing escapes to the negative pressure space and is pumped out of the chamber, such that the clothing hardened on the inner wall of the drum during dehydrating and high pressure is loosened to prevent wrinkles, and by circulating the air suction and inflation repeatedly, squeezing out water and pumping the water out the chamber are carried out alternately, the efficiency of dehydrating the clothing is greatly improved, and time for drainage and dehydration is shortened; (5) vacuum high pressure drying procedure: when the drying procedure is started, turning on the inflation pump 3 according to the instruction sent by the positive and negative pressure intelligent regulation device 5, and opening the inflation pipeline to inflate and pressurize the vacuum high pressure drum outer chamber 1-5, thus facilitating hot air to enter the clothing fibers to gasify the water, and then turning on the suction pump 2 and opening the air suction pipeline for air suction according to the instruction, pumping out the water and making the clothing fibers expand with the negative pressure to facilitate the water emission and quick drying, such that, by circulating the air suction and inflation repeatedly, heating gasification and water pump-out are alternately carried out, the drying progress is greatly accelerated, the fluffy clothing improves the drying quality, and the drying time is effectively shortened; (6) vacuum self-cleaning sterile placement procedure: closing the machine door 1.2 after the laundry is finished, controlling, by the positive and negative pressure intelligent regulation device 5, the washing-dehydrating-drying control mechanism to start drying hot air to blow-dry the inside of the washing machine, especially the drum mechanism 15.1, and then turning on the suction pump 2 and open the air suction pipeline for air suction, pumping out the residual super oxygen in the vacuum high pressure drum outer chamber 1-5, and enabling the drum mechanism 15.1 and the equipment in the chamber to be in a moderate vacuum, such that the drum mechanism and the equipment in the chamber are sterile, dust-free and pollution-free for keeping clean, and are oxidation-free, rust-free and undamaged for vacancy, and the service life of the washing machine is prolonged; in conclusion, the positive and negative pressure washing machine greatly accelerates the multiple processes of washing, dehydrating and drying, shortens the operation duration of the multiple procedures, and improves the degree of cleaning of laundry and drying quality, moreover, the super oxygen also provides a thorough sterilization, disinfection and odor removal for the washed clothing; and meanwhile, the super oxygen concentration and the operation duration are intelligently controlled at the moderate region for sterilization, degradation and washing assistance, not reach, or as little as possible to reach, a critical point of possible oxidation fading of dark clothing; (7) positive and negative pressure module combined intelligent smart home mode: designing and manufacturing the intelligent positive and negative pressure washing machine according to the module functions, wherein the intelligent positive and negative pressure washing machine not only can be independently produced and used as a separated invention, but also can be organically combined with other positive and negative pressure electrical appliances and the modular cabinets under the control of the touch screen and mobile phone APP monitoring system 12 to form a fully functional intelligent positive and negative pressure module combined home, which not only can share the positive and negative pressure system, the refrigeration system and the air water production device, but also has basically uniform, neat and harmonious appearance, shape and color which are in line with the popular trend; in conclusion, in accordance with the intelligent positive and negative pressure system, the washing, dehydrating and drying of clothing are faster, more efficient and low-consumption, and the washed clothing is less in consumption, cleaner, fluffier, and more sanitary.

In accordance with a seventh embodiment of the present disclosure, an intelligent vacuum dishwasher/fruit and vegetable cleaning machine is provided. The intelligent vacuum dishwasher/fruit and vegetable cleaning machine comprises a machine body 7. The machine body 7 is internally provided with an intelligent positive and negative pressure system, a dish washing-drying system 19, a fruit and vegetable cleaning system 20, and a touch screen and mobile phone APP monitoring system 12. The intelligent positive and negative pressure system comprises a positive and negative pressure chamber 1, a suction pump 2, a positive and negative pressure intelligent regulation device 5, and positive and negative pressure airflow load generation processors. The positive and negative pressure chamber 1 is designed as a vacuum super oxygen chamber 1-6 according to particular requirements for intelligent dish washing and drying and fruit and vegetable cleaning. The vacuum super oxygen chamber 1-6 comprises a chamber body 1.1, a chamber door 1.2, a mechanical airtight mechanism 1.3, and an internal and external communicating sealer 1.4. The chamber door 1.2 is a machine door of the vacuum dishwasher/fruit and vegetable cleaning machine. The mechanical airtight mechanism 1.3 is arranged between the chamber door 1.2 and the chamber body 1.1 of the vacuum super oxygen chamber 1-6. The mechanical airtight mechanism 1.3 comprises a lock ring 1.31, a lock bolt 1.32, and an airtight gasket 1.33; the lock ring 1.31 is in movable fit with the lock bolt 1.32, the lock bolt 1.32 extends into the lock ring 1.31 to lock the chamber door during the closing of the chamber door. When the positive and negative atmospheric pressure is formed inside the vacuum super oxygen chamber 1-6, the airtight gasket 1.33 is used for keeping sealing. The internal and external communicating sealer 1.4 is fixedly arranged at the rear part of the vacuum super oxygen chamber 1-6, and all pipes and circuits getting in and out the chamber are connected to and pass through the internal and external communicating sealer 1.4 so as to keep the sealing property of the vacuum super oxygen chamber 1-6. The vacuum super oxygen chamber 1-6 is internally provided with a dish washing-drying system 19, a fruit and vegetable cleaning system 20, an anti-shower air suction port 2.1, a negative pressure sensor C2, a super oxygen sensor C3, and a temperature sensor C9. The vacuum super oxygen chamber 1-6 is externally provided with the suction pump 2, the positive and negative pressure intelligent regulation device 5, a drainage pump 16, a water intake pump 17, a super oxygen generation water mixer 6.6, a super oxygen decomposer 6.7, and the touch screen and mobile phone APP monitoring system 12. An air suction pipeline A1 is installed at an air inlet a of the suction pump 2, a solenoid valve B1 is installed at the middle part of the air suction pipeline A1, the other end of the air suction pipeline A1 extends into the vacuum super oxygen chamber 1-6 and then is connected with the anti-shower air suction port 2.1 so as to form an air suction and air return port c, and an air outlet b of the suction pump 2 is open to the atmosphere. A water inlet pipeline A14 is installed at a water inlet r of the water intake pump 17, a solenoid valve B14 is installed at the middle part of the water inlet pipeline A14, and the other end of the water inlet pipeline A14 communicates with a tap water source. A water inlet pipeline A15 is installed at a water outlet u of the water intake pump 17, a solenoid valve B15 is installed at the middle part of the water inlet pipeline A15, and the other end of the water inlet pipeline A15 communicates with a water inlet k of the super oxygen generation water mixer 6.6. A water inlet pipeline A16 is installed at a water outlet q of the super oxygen generation water mixer 6.6, a solenoid valve B16 is installed at the middle part of the water inlet pipeline A16, and the other end of the water inlet pipeline A16 extends into the vacuum super oxygen chamber 1-6 to be connected to the solenoid valve B25. The solenoid valve B25 is respectively connected to a fruit and vegetable cleaning water inlet pipeline A25 and a dish washing-drying water inlet pipeline A27, and the water inlet pipeline A25 is connected to a water inlet E of the fruit and vegetable cleaning system 20. A water inlet pipeline A27 is connected to a water inlet G of the dish washing-drying system 19; a water inlet pipeline A19 is further installed at the solenoid valve B15, and the solenoid valve B15 is connected to the solenoid valve B16, such that the water is directly fed by the water intake pump 17 when super-oxygenated water is not required. A drainage pipeline A20 is installed at a water inlet w of the drainage pump 16, a solenoid valve B20 is installed at the middle part of the drainage pipeline A20, and the other end of the drainage pipeline A20 extends into the vacuum super oxygen chamber 1-6 and is respectively connected to a fruit and vegetable cleaning drainage pipeline A26 and a dish washing-drying drainage pipeline A28, and the drainage pipeline A26 is connected to a water outlet F of the fruit and vegetable cleaning system 20. The drainage pipeline A28 is connected to a drainage port H of the dish washing-drying system 19. A drainage pipeline A21 is installed at a water outlet p of the drainage pump 16, a solenoid valve B21 is installed at the middle part of the drainage pipeline A21, and the other end of the drainage pipeline A21 communicates with a water inlet g of the super oxygen decomposer 6.7. A drainage pipeline A22 is installed at a water outlet m of the super oxygen decomposer 6.7, a solenoid valve B22 is installed at the middle part of the drainage pipeline A22, and the other end of the drainage pipeline A22 communicates with a sewer. A drainage pipeline A24 is further installed at the solenoid valve B21, and the solenoid valve B21 is connected to A23 and then communicates with the solenoid valve B22, such that the water is directly drained by the drainage pump when the super oxygen does not need to be decomposed. The suction pump 2, the drainage pump 16, the water intake pump 17, the super oxygen generation water mixer 6.6, the super oxygen decomposer 6.7, the dish washing-drying system 19, the fruit and vegetable cleaning system 20, the touch screen and mobile phone APP monitoring system 12, the negative pressure sensor C2, the super oxygen sensor C3, the temperature sensor C9 and the solenoid valves B1 to B25 are all connected to the positive and negative pressure intelligent regulation device 5.

In accordance with an eighth embodiment of the present disclosure, an operation method for the intelligent vacuum dishwasher/fruit and vegetable cleaning machine is provided. The method comprises the following steps: (1) dishwashing water inlet and cleaning procedure: sending an instruction by the positive and negative pressure intelligent regulation device 5 after the machine door is closed, enabling the solenoid valves B14, B15, B16 and B25 to open corresponding water inlet pipelines (①), when the super-oxygenated water is required for dishwashing, a water inlet line for the water intake pump is: A14→B14→A14→water inlet r of water intake pump→water outlet u→A15→B15→A15→water inlet k of super oxygen generation water mixer→water outlet q→A16→B16→A16→B25→A27→water inlet G of dish washing-drying system; ② when the super-oxygenated water is not required for dishwashing, the water inlet line for the water intake pump is: A14→B14→A14→water inlet r of water intake pump→water outlet u→A15→B15→A19→B16→A16→B25→A27→water inlet G of dish washing-drying system), turning on the water intake pump 17, rapidly mixing, by the super oxygen generation water mixer 6.6, the tap water with the super oxygen generated by the super oxygen generation water mixer 6.6 into super-oxygenated water with an appropriate concentration, and feeding the super-oxygenated water into the vacuum super oxygen chamber 1-6 to accelerate the decomposition of organic fouling on the tableware, thus facilitating the rapid cleaning; after the water inlet is finished, turning on the dish washing-drying system 19 by the positive and negative pressure intelligent regulation device 5 to spray water for dishwashing, and enabling the solenoid valve B1 to open the air suction pipeline A1 (air inlet a of suction pump→A1→B1→A1→air suction and air return port c of vacuum super oxygen chamber), and turning on the suction pump 2 for vacuumizing, wherein, during the vacuumizing, the dirt stained on the tableware expands in the negative vacuum pressure to make air escape from the dirt, thus the adhesive force of the dirt is weakened, or the dirt fall off from the tableware, the cleaning efficiency is improved, and the washing process is shortened, moreover, the super-oxygenated water directly kills the bacteria and viral microorganism on the tableware, the organic matters in the dirt on the tableware are decomposed and then dissolved into the water, the dirt removability of the detergent is enhanced, the degree of cleaning is improved, the cleaning process is accelerated, and the function of sterilization and deodorization is achieved at the same time; (2) dishwashing drainage and drying disinfection procedure: when the drainage is required at a proper time of cleaning, sending an instruction by the positive and negative pressure intelligent regulation device 5, enabling the solenoid valves B20, B21 and B22 to open the corresponding drainage pipelines (① when both the drainage pump and the decomposition of super oxygen are not required, the direct drainage line is: water outlet H of dish washing-drying system→A28→A20→B20→A23→B22→A22→sewer; ② when both the drainage pump for drainage and the decomposition of super oxygen are required, the drainage line is: water outlet H of dish washing drying system→A28→A20→B20→A20→water inlet w of drainage pump→water outlet p→A21→B21→A21→water inlet g of super oxygen decomposer→water outlet m→A22→B22→A22→sewer; and ③ when the drainage pump is required for drainage and the super oxygen does not need to be decomposed, the drainage line is: water outlet H dish washing and drying of system→A28→A20→B20→A23→B22→A22→sewer), draining water directly or turning on the drainage pump 16, or turning on the super oxygen decomposer 6.7 to decompose waste water and then drain the decomposed waste water into the sewer; meanwhile, spraying the tableware with the clear water for cleaning completely; during the drying procedure, turning on, by the positive and negative pressure regulation device 5, the suction pump 2 again to rapidly pump out the water vapor so as to accelerate the drying progress, wherein the vacuum and super oxygen greatly accelerate the full dishwashing process, and the super oxygen also provide thorough sterilization, disinfection and odor removal for the washed tableware; (3) fruit and vegetable cleaning water inlet and cleaning procedure: sending an instruction by the positive and negative pressure intelligent regulation device 5 after the machine door is closed, enabling the solenoid valves B14, B15, B16 and B25 to open corresponding water inlet pipelines (① when the super-oxygenated water is required for fruit and vegetable cleaning, a water inlet line for the water intake pump is: A14→B14→A14→water inlet r of water intake pump→water outlet u→A15→B15→A15→water inlet k of super oxygen generation water mixer→water outlet q→A16→B16→A16→B25→A25→water inlet E of fruit and vegetable cleaning system; ② when the super-oxygenated water is not required for fruit and vegetable cleaning, a water inlet line for the water intake pump is: A14→B14→A14→water inlet r of water intake pump→water outlet u→A15→B15→A19→B16→A16→B25→A25→water inlet E of fruit and vegetable cleaning system), and turning on the water intake pump 17, rapidly mixing, by the super oxygen generation water mixer 6.6, the tap water with the super oxygen generated by the super oxygen generation water mixer 6.6 into super-oxygenated water with an appropriate concentration, and feeding the super-oxygenated water into the vacuum super oxygen chamber 1-6 to accelerate the decomposition of organic fouling on the tableware, thus facilitating the rapid cleaning; after the water inlet is finished, turning on the fruit and vegetable cleaning system by the positive and negative pressure intelligent regulation device 5 to clean the fruit and vegetables by spraying, and enabling the solenoid valves B1 to open the air suction pipeline A1 (air inlet a of suction pump→A1→B1→A1→air suction and air return port c of vacuum super oxygen chamber), and meanwhile, turning on the suction pump 2 to start vacuumizing to the moderate negative pressure, wherein the dirt stained on the fruits and vegetables is able to expand in the negative pressure to make the air escape from the dirt, thus the adhesive force of the dirt is weakened, or the dirt fall off from the fruits and vegetables, the cleaning efficiency is improved, the washing process is shortened, moreover, the super-oxygenated water directly kills the bacteria and viral microorganism on the skin of the fruits and vegetables, the organic matters in dirt on skin of the fruits and vegetables are decomposed and then dissolved into the water, the degree of cleaning is improved, and the cleaning process is accelerated; and meanwhile, the negative pressure promotes the escape of pesticide and heavy metal residues in the tissues of the fruits and vegetables and the harmful gases such as the volatile metabolites ethylene acetaldehyde ethanol, thus a favorable environment is created for the super-oxygenated water to rapidly clean and deeply degrade the pesticide residues and decompose the harmful gases such as ethylene; and after cleaning with the super-oxygenated water for a proper time, sending an instruction by the positive and negative pressure intelligent regulation device 5 to clean the fruit and vegetables with the spraying of clear water; (4) drainage procedure after fruit and vegetable cleaning: when the drainage is required after cleaning for a proper time, sending an instruction by the positive and negative pressure intelligent regulation device 5, enabling the solenoid valves B20, B21 and B22 to open corresponding drainage pipelines (①) when both the drainage pump and the decomposition of super oxygen are not required, a direct drainage line is: water outlet F of fruit and vegetable cleaning system→A26→A20→B20→A23→B22→A22→sewer; ② when both the drainage pump for drainage and the decomposition of super oxygen are required, a drainage line is: water outlet F of fruit and vegetable cleaning system→A26→A20→B20→A20→water inlet w of drainage pump→water outlet p→A21→B21→A21→water outlet g of super oxygen decomposer→water outlet m→A22→B22→A22→sewer; (3) when the drainage pump is required for drainage and the super oxygen does not need to be decomposed, the drainage line is: water outlet F of fruit and vegetable cleaning system→A26→A20→B20→A23→B22→A22→sewer), directly draining water or turning on the drainage pump 16 or turning on the super oxygen decomposer 6.7 again to decompose waste water, and then draining the decomposed waste water into the sewer; (5) vacuum self-cleaning sterile placement sterile: closing the machine door 1.2 after use, starting drying hot air by the positive and negative pressure intelligent regulation device 5 to blow-dry the inside of the vacuum super oxygen chamber 1-6, especially the dish washing-drying system 19 and the fruit and vegetable cleaning system 20, and then turning on the suction pump 2 and open the air suction pipeline for air suction, pumping out the residual super oxygen in the vacuum super oxygen chamber 1-6, and enabling the dish washing-drying system 19, the fruit and vegetable cleaning system 20 and the equipment in the chamber to be in a moderate vacuum, such that the dish washing-drying system 19 and the fruit and vegetable cleaning system 20 and the equipment in the chamber are sterile, dust-free, pollution-free, and kept clean for health, and are oxidation-free, rust-free and undamaged for vacancy, and the service life of the washing machine is prolonged; (6) positive and negative pressure module combined intelligent smart home mode: designing and manufacturing the intelligent positive and negative pressure dishwasher/fruit and vegetable cleaning machine according to the module functions, wherein the intelligent positive and negative pressure dishwasher/fruit and vegetable cleaning machine not only can be independently produced and used as a separated invention, but also can be organically combined with other positive and negative pressure electrical appliances and the modular cabinets under the control of the touch screen and mobile phone APP monitoring system 12 to form a fully functional intelligent positive and negative pressure module combined home, which not only can share the water intake pump 17, the drainage pump 16, the super oxygen generation water mixer 6.6 and the super oxygen decomposer 6.7, but also has basically uniform, neat and harmonious appearance, shape and color which are in line with the popular trend, such that the dishwasher/fruit and vegetable cleaning machine is more efficient, low-consumption, and suitable for use.

In accordance with a ninth embodiment of the present disclosure, an intelligent super-oxygenated water washing range hood is provided. The intelligent super-oxygenated water washing range hood comprises a machine body 7. The lower half part of the machine body 7 is a sealed waterproof super oxygen chamber 1-7, and the upper half part of the machine body 7 is an equipment fume tube chamber 21. The sealed waterproof super oxygen chamber 1-7 comprises a triangular chamber body 1.1, and a sealed waterproof chamber door 1.2. The sealed waterproof chamber door 1.2 is a machine door of the super-oxygenated water washing range hood, and a sealing waterproof mechanism 1.7 is arranged between the chamber door 1.2 and the chamber body 1.1. The sealing waterproof mechanism 1.7 comprises a lock ring 1.71, a lock bolt 1.72, an airtight gasket 1.73, and a chamber door hinge 1.74; the lock ring 1.71 is in movable fit with the lock bolt 1.72, the lock bolt 1.72 extends into the lock ring 1.71 to lock the chamber door 1.2 during the closing of the chamber door. When the positive and negative pressure is formed inside the sealed waterproof super oxygen chamber 1-7, the airtight gasket 1.73 is used for keeping sealing. The sealed waterproof super oxygen chamber 1-7 is internally provided with a motor-turbine assembly 22, an automatic rotary spraying ball 23, and an oil collecting and drainage groove 24; the front of the sealed waterproof super oxygen chamber 1-7 is further provided with a touch screen and mobile phone APP monitoring system 12. The equipment fume tube chamber 21 is internally provided with a super oxygen intelligent cleaning system, and a fume extraction control mechanism 26. The intelligent super oxygen cleaning system comprises a super oxygen intelligent regulation device 5.1, a water intake pump 17, a drainage pump 16, a super oxygen generation water mixer 6.6, a super oxygen decomposer 6.7, a water heating device 27, and degreaser adder 28. A water inlet pipeline A14 is installed at a water inlet r of the water intake pump 17, the water inlet r communicates with a tap water source, a water inlet pipeline A15 is installed at a water outlet u of the water intake pump 17, a water heating device 27 and a solenoid valve B15 are installed at the middle part of the water inlet pipeline A15, and the other end of the water inlet pipeline A15 is divided into three paths by the solenoid valve B15 to respectively communicate with a water inlet k of the super oxygen generation water mixer 6.6, a water inlet z of the degreaser adder 28 and a solenoid valve B16. A water inlet pipeline A16 is installed at a water outlet q of the super oxygen generation water mixer 6.6, the solenoid valve B16 is installed at the middle part of the water inlet pipeline A16, and the other end of the water inlet pipeline A16 extends into the sealed waterproof super oxygen chamber 1-7 to be connected to a spraying pipeline A30. At least one automatic rotary spraying ball 23 is installed on the spraying pipeline A30, and an included angle between the axis of the spraying ball and the axis of a circle of spraying holes in the middle is 45 degrees, and the spraying ball 23 rotates automatically when water flow is sprayed. A water inlet pipeline A17 is installed at a water outlet 1 of the degreaser adder 28, a solenoid valve B17 is installed at the middle part of the water inlet pipeline A17, and the other end of the water inlet pipeline A17 communicates with the water inlet pipeline A15 and then communicates with the solenoid valve B16. A water inlet pipeline A20 is installed at a water inlet w of the drainage pump 16, a solenoid valve B20 is installed at the middle part of a drainage pipeline A20, and the other end of the drainage pipeline A20 extends into the oil collecting and drainage groove 24 at the bottom of vacuum super oxygen chamber 1-7 to form a drainage port L. A drainage pipeline A21 is installed at a water outlet p of the drainage pump 16, a solenoid valve B21 is installed at the middle part of the drainage pipeline A21, and the other end of the drainage pipeline A21 communicates with the super oxygen decomposer 6.7. A drainage pipeline A22 is installed at a water outlet m of the super oxygen decomposer 6.7, a solenoid valve B22 is installed at the middle part of the drainage pipeline A22, and the other end of the drainage pipeline A22 communicates with a sewer. A drainage pipeline A24 is further installed on the solenoid valve B21, and the solenoid valve B21 is connected to the solenoid valve B22, such that the water is directly drained by the drainage pump 16 when the super oxygen does not need to be decomposed. The water intake pump 17, the drainage pump 16, the super oxygen generation water mixer 6.6, the super oxygen decomposer 6.7, the water heating device 27, the degreaser adder 28, the fume extraction control mechanism 26, the touch screen and mobile phone APP monitoring system 12 and the solenoid valves B1 to B22 are all connected to the super oxygen intelligent regulation device 5.1.

In accordance with a tenth embodiment of the present disclosure, an operation method for the intelligent super-oxygenated water washing range hood is provided. The method comprises the following steps: (1) fume extraction procedure: when the range hood is started, opening the sealed waterproof chamber door 1.2 for air inlet and fume extraction, and closing the sealed chamber door 1.2 after the range hood stops operating; (2) self-cleaning procedure: sending an instruction by the super oxygen intelligent regulation device 5.1, enabling the solenoid valves B15, B16 and B17 to open corresponding water inlet pipelines (①), when the super-oxygenated water is required for cleaning, a water inlet line is: A14→water inlet r of water intake pump→water outlet u→A15→water heating device→A15→B15→A15→water inlet k of super oxygen generation water mixer→water outlet q→A16→B16→A16→A30→automatic rotary spraying ball 23; ② when the degreaser is required for cleaning, the water inlet line is: A14→water inlet r of water intake pump→water outlet u→A15→water heating device→A15→B15→A15→water inlet z of degreaser adder→water outlet 1→A17→B17→A17→A15→B16→A16→A30→automatic rotary spraying ball 23; ③ when both super-oxygenated water and degreaser are not required for cleaning, the water inlet line is: A14→water inlet r of water intake pump→water outlet u→A15→water heating device→A15→B15→A15→B16→A16→A30→automatic rotary spraying ball 23), and turning on the water intake pump 17, rapidly mixing, by the water heating device 27 and the super oxygen generation water mixer 6.6, the tap water with the super oxygen generated by the super oxygen generation water mixer 6.6 into super-oxygenated water with an appropriate concentration, and feeding the super-oxygenated water into the sealed waterproof super oxygen chamber 1-7, and comprehensively spraying and cleaning various parts, including the motor turbine assembly 22, in a machine case by using the automatic rotary spraying ball 23; firstly spraying the supe-oxygenated hot water at the proper temperature to efficiently decompose and remove the oil fouling, and then spraying with the mixture of the degreaser and the hot water, and finally spraying with clean hot water until the oil fouling is completely cleaned; enabling the sewage obtained after cleaning to flow downwards to be collected into the oil collecting and drainage groove 24 at the lowest part of the machine case; when the drainage is needed, sending an instruction by the super oxygen intelligent regulation device 5.1, enabling the solenoid valves B20, B21 and B22 to open corresponding drainage pipelines (①) when the super oxygen needs to be decomposed, the drainage line is: drainage port L of oil collecting and drainage groove→A20→B20→A20→water inlet w of drainage pump→water outlet p→A21→B21→A21→water inlet g of super oxygen decomposer→water outlet m→A22→B22→A22→sewer; ② when the super oxygen does not to be decomposed, the drainage line is: drainage port L of oil collecting and drainage groove→A20→B20→A20→water inlet W of drainage pump→water outlet p→A21→B21→A24→B22→A22→sewer), and turning on the drainage pump 16 to drain the water to the sewer; (3) drying placement procedure: after cleaning, turning on the range hood according to an instruction sent by the super oxygen intelligent regulation device 5.1 to completely blow-dry the inside of the machine case, and then turning off the range hood to prevent corrosion; (4) turn-on protection function: when a user turns on the range hood, enabling the air to immediately flow into the vacuum super oxygen chamber from the human side and to be exhaust from an exhaust pipe 29, such that the vacuum super oxygen chamber is not exposed to any super oxygen; and (5) module combined intelligent smart home mode: designing and manufacturing the intelligent super-oxygenated water washing range hood according to the module functions, wherein the intelligent super-oxygenated water washing range hood not only can be independently produced and used as a separated invention, but also can be organically combined with other positive and negative pressure electrical appliances and the modular cabinet under the control of the touch screen and mobile phone APP monitoring system 12 to form a fully functional intelligent positive and negative pressure module combined home; the fully functional intelligent positive and negative pressure module combined home not only can share the water intake pump 17, the drainage pump 16, the super oxygen generation water mixer 6.6 and the super oxygen decomposer 6.7 with the dishwasher/fruit and vegetable cleaning machine, but also has basically uniform, neat and harmonious appearance, shape and color which are in line with the popular trend, such that the intelligent range hood is more efficient, low-consumption, and suitable for use.

In accordance with an eleventh embodiment of the present disclosure, an intelligent positive and negative pressure oven/air fryer/microwave oven is provided. The intelligent positive and negative pressure oven/air fryer/microwave oven comprises a machine body 7. The machine body 7 is internally provided with an intelligent positive and negative pressure system, a grilling system 30, an air fryer system 31, a microwave system 32, and a touch screen and mobile phone APP monitoring system 12. The intelligent positive and negative pressure system comprises a positive and negative pressure chamber 1, a suction pump 2, an inflation pump 3, and a positive and negative pressure intelligent regulation device 5. The positive and negative pressure chamber 1 is designed as a microwave vacuum high-pressure chamber 1-8 according to particular requirements of the oven/air fryer and microwave oven. The microwave vacuum high-pressure chamber 1-8 comprises a chamber body 1.1, a chamber door 1.2, a mechanical airtight mechanism 1.3, and an internal and external communicating sealer 1.4. The chamber door 1.2 is a machine door of the positive and negative pressure oven/air fryer/microwave oven; the mechanical airtight mechanism 1.3 is arranged between the chamber door 1.2 and the chamber body 1.1 of the microwave vacuum high-pressure chamber 1-8. The mechanical airtight mechanism 1.3 comprises a lock ring 1.31, a lock bolt 1.32, and an airtight gasket 1.33; the lock ring 1.31 is in movable fit with the lock bolt 1.32, the lock bolt 1.32 extends into the lock ring 1.31 to lock the chamber door during the closing of the chamber door. When the positive and negative pressure is formed inside the microwave vacuum high-pressure chamber 1-8, the airtight gasket 1.33 is used for keeping sealing. The internal and external communicating sealer 1.4 is fixedly arranged at the rear part of the microwave vacuum high-pressure chamber 1-8, and all pipes and circuits getting in and out the chamber are connected to and pass through the internal and external communicating sealer 1.4 so as to keep the sealing property of the microwave vacuum high-pressure chamber 1-8. The microwave vacuum high-pressure chamber 1-8 is internally provided with the grilling system 30, the air fry system 31, the microwave system 32, a pressure sensor C1, and a negative pressure sensor C2. The microwave vacuum high-pressure chamber 1-8 is externally provided with the suction pump 2, the inflation pump 3, the positive and negative pressure intelligent regulation device 5, and the touch screen and mobile phone APP monitoring system 12. An air suction pipeline A1 is installed at an air inlet a of the suction pump 2, a solenoid valve B1 is installed at the middle part of the air suction pipeline A1, the other end of the air suction pipeline A1 extends into the microwave vacuum high-pressure chamber 1-8 to form an air suction and air return port c thereof. An air outlet pipeline A2 is installed at an air outlet b of the suction pump 2, and is open to the atmosphere. An inflation pipeline A3 is installed at an air outlet d of the inflation pump 3, a solenoid valve B3 is installed at the middle part of the inflation pipeline A3, and the other end of the inflation pipeline A3 extends into the microwave vacuum high-pressure chamber 1-8 to form an inflatable air inlet f. An air intake pipeline A4 is installed at an air inlet e of the inflation pump 3 and is open to the atmosphere. The suction pump 2, the inflation pump 3, the pressure sensor C1, the negative pressure sensor C2, the grilling system 3, the air fryer system 31, the microwave system 21 and the touch screen and mobile phone APP monitoring system 12 are all connected to the positive and negative pressure intelligent regulation device 5.

In accordance with a twelfth embodiment of the present disclosure, an operation method for the intelligent positive and negative pressure oven/fryer/microwave oven is provided. The method comprises the following steps: (1) vacuum cooking procedure: opening the solenoid valve B1 and turning on the suction pump 2 by the positive and negative pressure intelligent regulation device 5, pumping the microwave vacuum high-pressure chamber 1-8 to a moderate vacuum by the air suction pipeline A1, and cooking the food in the vacuum to make the food have different flavors due to the expansion of the food materials, for example, turning on the air fryer system to back French fries, cakes and like more fluffy and palatable in appropriate vacuum; (2) high-pressure cooking procedure: opening the solenoid valve B3 and turning on the inflation pump 3 by the positive and negative pressure intelligent regulation device 5, enabling high-pressure airflow to enter the microwave vacuum high-pressure chamber 1-8 through the inflation pipeline A3, wherein the food cooked in high pressure is more tasty and has a distinct flavor as the seasonings are easy to permeate into the food materials, and the energy is saved as the food is easy to be cooked; (3) vacuum placement procedure: pumping the microwave vacuum high-pressure chamber 1-8 to the moderate vacuum when not in use, such that the oven/microwave system and circuit parts are in a vacuum state, are sterile, dust-free and pollution-free, and kept clean for health, and are oxidation-free, rust-free and non-loss for storage, and the service life of the electrical appliance is prolonged; (4) positive and negative pressure module combined intelligent smart home mode: designing and manufacturing the positive and negative pressure intelligent oven/air fryer/microwave oven according to the module functions, wherein the positive and negative pressure intelligent oven/air fryer/microwave oven not only can be independently produced and used as a separated invention, but also can be organically combined with other positive and negative pressure electrical appliances and the modular cabinets under the control of the touch screen and mobile phone APP monitoring system 12 to form a fully functional intelligent positive and negative pressure module combined home, and the fully functional intelligent positive and negative pressure module combined home not only can share the intelligent positive and negative pressure system, but also has basically uniform, neat and harmonious appearance, shape and color which are in line with the popular trend, such that the intelligent oven/air fryer/microwave oven is more efficient, low-consumption, and suitable for use.

In accordance with a thirteenth embodiment of the present disclosure, an intelligent positive and negative pressure fresh-keeping compartment (container) is provided. The intelligent positive and negative pressure fresh-keeping compartment (container) comprises a compartment (container) body 7. The compartment (container) body 7 is internally provided with an intelligent positive and negative pressure system, a refrigeration system 8, and a touch screen and mobile phone monitoring system 12. The intelligent positive and negative pressure system comprises a positive and negative pressure chamber 1, a suction pump 2, an inflation pump 3, a positive and negative pressure intelligent regulation device 5, and positive and negative pressure airflow load generation processors. The positive and negative pressure chamber 1 is designed as a compartment (container) type vacuum high-pressure chamber 1-9 according to particular requirements of the positive and negative pressure fresh-keeping compartment (container). The compartment (container) type vacuum high-pressure chamber 1-9 comprises a chamber body 1.1, a chamber door 1.2, a mechanical airtight mechanism 1.3, and an internal and external communicating sealer 1.4. The chamber door 1.2 is a compartment door of the positive and negative pressure fresh-keeping compartment. The mechanical airtight mechanism 1.3 is arranged between the chamber door 1.2 and the chamber body 1.1 of the compartment (container) type vacuum high-pressure chamber 1-9. The mechanical airtight mechanism 1.3 comprises a lock ring 1.31, a lock bolt 1.32, and an airtight gasket 1.33; the lock ring 1.31 is in movable fit with the lock bolt 1.32, the lock bolt 1.32 extends into the lock ring 1.31 to lock the chamber door during the closing of the chamber door. When the positive and negative pressure is formed inside the compartment (container) type vacuum high-pressure chamber 1-9, the airtight gasket 1.33 is used for keeping sealing. The internal and external communicating sealer 1.4 is fixedly arranged at the rear part of the compartment (container) type vacuum high-pressure chamber 1-9, and all pipes and circuits getting in and out the chamber are connected to and pass through the internal and external communicating sealer 1.4 so as to keep the sealing property of the compartment (container) type vacuum high-pressure chamber 1-9. The compartment (container) type vacuum high-pressure chamber 1-9 is externally provided with the suction pump 2, the inflation pump 3, the positive and negative pressure intelligent regulation device 5, a modified atmosphere device 6.1, a super oxygen decomposer 6.7, an air filter 6.8, the refrigeration system 8, an air water production device 11, a filtering water tank 11.1, and the touch screen and mobile phone monitoring system 12. An air suction pipeline A1 is installed at an air inlet a of the suction pump 2, a solenoid valve B1 is installed at the middle part of the air suction pipeline A1, and the other end of the air suction pipeline extends into the compartment (container) type vacuum high-pressure chamber 1-9 to form an air suction and air return port c thereof. An exhaust pipeline A2 is installed at an air outlet b of the suction pump 2, the super oxygen decomposer 6.7 and a solenoid valve B2 are installed at the middle part of the exhaust pipeline A2, the other end of the exhaust pipeline A2 communicates with an air inlet h of the air water production device 11, and passes through the air water production device 11 and then is open to the atmosphere through an air outlet n of the air water production device 11. An inflation pipeline A3 is installed at an air outlet d of the inflation pump 3, a solenoid valve B3 is installed at the middle part of the inflation pipeline A3, and the other end of the inflation pipeline A3 extends into the compartment (container) type vacuum high-pressure chamber 1-9 to form an inflatable air inlet f thereof. An air intake pipeline A4 is installed at an air inlet e of the inflation pump 3, a solenoid valve B4 and the air filter 6.8 are installed at the middle part of the air intake pipeline A4, and the other end of the air intake pipeline A4 is open to atmosphere. A circulating pipeline A5 is further connected to the solenoid valve B4, a solenoid valve B5 is installed at the middle part of the circulating pipeline A5, and the other end of the circulating pipeline A5 communicates with the solenoid valve B3, and extends into the compartment (container) type vacuum high-pressure chamber 1-9 through the inflation pipeline A3 to form a circulating air return port j of the compartment (container) type vacuum high-pressure chamber 1-9. An air water production inflation pipeline A9 is further connected to the inflation pipeline A3, the air water production inflation pipeline A9 is connected to the solenoid valve B2 and then communicates with an air inlet h of the air water production device 11 through the exhaust pipeline A2. A modified atmosphere air intake pipeline A6 is installed at an air inlet t of the modified atmosphere device 6.1, a solenoid valve B6 is installed at the middle part of the modified atmosphere air intake pipeline A6, the other end of the modified atmosphere air intake pipeline A6 is connected to the inflation pipeline A3, and then communicates with the air outlet d of the inflation pump 3. A modified atmosphere air outlet pipeline A7 is installed at an air outlet s of the modified atmosphere device 6.1, a solenoid valve B7 is installed at the middle part of the modified atmosphere air outlet pipeline A7, and the other end of the modified atmosphere air outlet pipeline A7 extends into the compartment (container) type vacuum high-pressure chamber 1-9 to form a modified atmosphere air inlet i. An air water production pipeline A10 is installed at a water outlet x of the air water production device 11, and the air water production pipeline A10 communicates with a water inlet y of the filtering water tank 11.1; and condensate water generated in the compartment (container) type vacuum high-pressure chamber 1-9 flows into a water inlet Y of a condensate water collecting box 11.2 at the bottom in the chamber. A condensate water pipeline A11 is installed at a water outlet M of the condensate water collecting box 11.2, the condensate water pipeline A11 is provided with a solenoid valve B11 at the rear middle part after extending out the compartment (container) type vacuum high-pressure chamber 1-9, and the other end of the condensate water pipeline A11 communicates with a water inlet v of the filtering water tank 11.1. A humidifying water pipeline A12 is installed at a water outlet o of the filtering water tank 11.1, a solenoid valve B12 is installed at the middle part of the humidifying water pipeline A12, the other end of the humidifying water pipeline A12 extends into the compartment (container) type vacuum high-pressure chamber 1-9 to communicate with a water inlet R of the humidifier 6.5. A refrigeration circulating pipeline A13 is installed on the refrigeration system 8, the refrigeration circulating pipeline A13 extends into the compartment (container) type vacuum high-pressure chamber 1-9 to communicate with an evaporator air-cooling assembly 8.1. The touch screen and mobile phone monitoring system 12 comprises a touch screen 12.1, a mobile phone APP 12.2, and a wireless anti-fog camera device 12.4. The wireless anti-fog camera device 12.4 is installed at the position inside/outside the compartment (container) body 7 needing to be monitored. The compartment (container) type vacuum high-pressure chamber 1-9 is internally provided with positive and negative pressure airflow load generation processors and sensors, comprising: the humidifier 6.5, a super oxygen generator 6.2, a negative ion generator 6.3, an air catalyst controlled release device 6.4, a condensate water collecting box 11.2, a pressure sensor C1, a negative pressure sensor C2, a super oxygen sensor C3, a negative oxygen ion sensor C4, a chlorine dioxide sensor C5, a humidity sensor C6, an oxygen sensor C7, a nitrogen sensor C8, and a temperature sensor C9. All airflow load generation processors, sensors, solenoid valves and equipment devices arranged inside and outside the compartment (container) type vacuum high-pressure chamber 1-9 comprise the suction pump 2, the inflation pump 3, the modified atmosphere device 6.1, the super oxygen generator 6.2, the negative ion generator 6.3, the air catalyst controlled release device 6.4, the humidifier 6.5, the super oxygen decomposer 6.7, the refrigeration system 8, the air water production device 11, the filtering water tank 11.1, the touch screen and mobile phone monitoring system 12, the touch screen 12.1, the wireless anti-fog camera device 12.4, the pressure sensor C1, the negative pressure sensor C2, the super oxygen sensor C3, the negative oxygen ion sensor C4, the chlorine dioxide sensor C5, the humidity sensor C6, an oxygen sensor C7, the nitrogen sensor C8, the temperature sensor C9, a water level sensor C10 and the solenoid valves B1 to B12 are all connected to the positive and negative pressure intelligent regulation device 5.

In accordance with a fourteenth embodiment of the present disclosure, an operation method for the intelligent positive and negative pressure fresh-keeping compartment (container) is provided. The method comprises the following steps: (1) vacuum abatement heat-removal cleaning procedure: closing the chamber door 1.2 after fresh goods needing to be transported in fresh are loaded into the compartment (container) type vacuum high-pressure chamber 1-9; touching the chamber door switch 1.8 or manually turning on the chamber door switch by a driver, sending an instruction by the positive and negative pressure intelligent regulation device 5, and enabling the solenoid valves B1 and B2 to open the air suction pipelines A1 and A2 (air suction and air return port c of compartment type vacuum high-pressure chamber→A1→B1→A1→air inlet a of suction pump 5→air outlet b→A2→air inlet g of super oxygen decomposer→air outlet m→A2→B2→A2→air inlet h of air water production device→air outlet n→A2→exhaust to atmosphere), and turning on the suction pump 2 to pump the compartment (container) type vacuum high-pressure chamber 1-9 to a moderate vacuum (−0.01 KPa to −0.1 MPa), pumping away the self-contained heat of fruits, vegetables, meat and fish, part of bacteria and microorganisms and polluted air in the chamber, vacuumizing to make volatile metabolites ethylene acetaldehyde ethanol and other harmful gases in the fruit and vegetable tissues to escape and be pumped away, while inhibiting the reproduction of residual bacteria with the negative pressure to reduce the potential risks of disease aging of fruits and vegetables; (2) depressurized and humidified storage procedure: according to the pressure standard of the preset procedure and the real-time feedback of the negative pressure sensor C2, turning the suction pump 2 on or off by the positive and negative pressure intelligent regulation device 5 to a maintain an appropriate negative-pressure, low-oxygen and low-temperature environment within the compartment (container) type vacuum high-pressure chamber 1-9, thus reducing respiration intensity of fruits and vegetables, inhibiting the biosynthesis of ethylene, delaying decomposition of chlorophyll, inhibiting the synthesis of carotenoids and lycopene, and slowing down the processes such as hydrolysis of starch, increase of sugar and consumption of acid to delay mature senescence of the fruits and vegetables, and meanwhile, turning on the humidifier 6.5 to increase humidity in the chamber and prevent the water contained in the fruits and vegetables from escaping, thus maintaining the fresh state of the fruits and vegetables for a longer time; (3) super-oxygen pressurized sterilization and degradation procedure: according to the procedure setting and feedback of the sensors C3, C4 and C6, sending, by the positive and negative pressure intelligent regulation device 5, an instruction at a proper time to turn on the super oxygen generator 6.2, the negative oxygen ion generator 6.3 and the humidifier 6.5, thus enabling the super oxygen, humidity and negative oxygen ions in the compartment (container) type vacuum high-pressure chamber 1-9 to reach the required standards; meanwhile, enabling the solenoid valves B3 and B4 to open the inflation pipelines A3 and A4 (intake from atmosphere→A4→air filter→A4→B4→A4→air inlet e of inflation pump→air outlet d→A3→B3→A3→inflatable air inlet f1 of vacuum high-pressure chamber), and turning on the inflation pump 3 to properly pressurize the compartment (container) type vacuum high-pressure chamber 1-9 to 0.01 KPa to 10 MPa, wherein the super oxygen at the appropriate positive pressure is able to perform sterilization, disinfection and mildew resistance on the fruits, vegetables, meat and fish in the compartment (container) type vacuum high-pressure chamber 1-9 and degrade pesticide residues and ethylene and other gases exhaled by the metabolism of the fruits and vegetables, thus affecting enzyme activity in the fruits and vegetables, preventing the fruits and vegetables from browning and softening, and delaying the aging of the fruits and vegetables; and the appropriate high pressure further prevents the water contained in the fruits, vegetables, meat and fish from escaping, moreover, the moisture at the positive pressure is easier to permeate into the fruits, vegetables, meat and fish to supplement the water loss thereof caused by refrigeration and negative pressure, while the negative oxygen ions make the water cluster of moisture smaller so as to be absorbed by the fruits, vegetables, meat and fish easier and have the functions of inhibiting biological tissue metabolism, reducing respiration intensity, slowing down enzyme activity, and sterilizing and purifying to a certain extent; the super oxygen at the positive pressure is able to permeate into the deeper interior of the fruits, vegetables, meat and fish to play a better role in sterilization and disinfection; (4) modified atmosphere pressurized storage procedure: opening the air suction pipeline and turning on the suction pump 2 and the super oxygen decomposer 6.7 at a proper time by the positive and negative pressure intelligent regulation device 5 according to the procedure setting or the feedback of the sensors, pumping the decomposed, sterilized, disinfected and degraded polluted air out of the chamber, and then enabling the solenoid valves B3, B6, B7 and B2 to open the modified atmosphere inflation pipelines A3, A9, A6 and A7 (air outlet d of inflation pump→A3→A9→A6→B6→A6→air inlet t of modified atmosphere device→air outlet s→A7→B7→A7→modified atmosphere air inlet i of vacuum high-pressure chamber), and turning on the inflation pump 3 to drive the airflow to pass through a hollow fiber membrane of the modified atmosphere device 6.1 to separate the oxygen out, and enabling high-nitrogen low-oxygen gas to enter the vacuum high-pressure chamber 1-9; meanwhile, enabling the solenoid valves B3, B5 and B4 to open the modified atmosphere circulating pipelines (circulating air return port j of vacuum high-pressure chamber 1-9→A3→B3→A5→B5→A5→B4→A4→air inlet e of inflation pump→air outlet d of inflation pump); turning on the humidifier 6.5 until the modified atmosphere gas concentration, air humidify and positive atmospheric pressure in the chamber all reach the modified atmosphere pressurized storage standards; forming a nitrogen-rich and oxygen-poor environment with an appropriate proportion in the compartment (container) type vacuum high-pressure chamber 1-9 and keeping at the appropriate positive pressure and appropriate humidity to effectively control the respiration rate of the stored fruits and vegetables, thus preventing anaerobic respiration and carbon dioxide poisoning, slowing down the aging process, preventing the quality decrease and flavor loss of the stored fruits and vegetables, and maintaining the moisture and supplementing the water of the fruits and vegetables with the positive pressure so as to maintain the freshness of the fruits and vegetables to the maximum extent; (5) open-to-exhaust protection function: if the compartment door is opened during super-oxygen sterilization and disinfection or modified atmosphere storage, providing feedback immediately by the chamber door switch, and stopping the super oxygen or modified atmosphere procedure immediately through the operation of the positive and negative pressure intelligent regulation device 5; and meanwhile, opening the air suction pipelines and turning on the suction pump 2 to rapidly pump the super oxygen or high-nitrogen low-oxygen gas to the super oxygen decomposer 6.7 to be exhausted after being decomposed, wherein, as the air flows from the human side to the compartment (container) type vacuum high-pressure chamber 1-9 for supplementing air suction negative pressure, the user is not exposed to and is protected from the super oxygen and high-nitrogen low-oxygen gas; (6) air water production procedure: enabling moist waste gas extracted from the compartment (container) type vacuum high-pressure chamber 1-9 by the suction pump 2 to enter the super oxygen decomposer 6.7, and enabling the moist waste gas to enter the air water production device 11 after the super oxygen is decomposed, condensing water vapor and filtering the condensed water vapor into purified water conforming to drinking water standard, thus providing uninterrupted source of water for the humidifier 6.5; when the inflation pump 3 is idle, turning on the inflation pump 3 by the intelligent regulation device 5, and enabling the solenoid valves B3 and B2 to open the air water production inflation pipelines (air outlet d of inflation pump→A3→A9→B2→A2→air inlet h of air water p production device→air outlet n→A2-exhaust to atmosphere), driving the air outside the compartment to enter the air water production device 11 for water production; (7) low-temperature assisted fresh-keeping procedure: after the fresh-keeping compartment (container) is turned on, turning on the refrigeration system 8 instantly by the positive and negative pressure intelligent regulation device 5, communicating the refrigeration system 8 with an evaporator air-cooling assembly 8.1 by the refrigeration pipeline A13, thus providing corresponding low temperature for the compartment (container) type vacuum high-pressure chamber 1-9 according to the feedback and control of the temperature sensing controller C9, and assisting the positive and negative pressure system to preserve the freshness of the stored objects; and (8) remote and short-range control monitoring function: controlling and monitoring, by the touch screen and mobile phone monitoring system 12, the real-time state of the positive and negative pressure fresh-keeping compartment (container) in real time through the touch screen 12.1 and mobile phone APP 12.2, thus making the fresh-keeping compartment (container) intelligently achieve various functions at high efficiency and low consumption according to the set procedures and instant instructions; displaying and reminding, by the touch screen 12.1 or the mobile phone APP 12.2, information such as temperature, humidity and gas concentration in the compartment, loading time and the expiration date of the stored objects, thus facilitating the user to remotely monitor and control the compartment in the driving cab or out of the compartment conveniently; and automatically controlling above procedures by the positive and negative pressure system, and setting the above procedures as shortcut key modes on the touch screen and mobile phone monitoring system 12 for remote and short-range control.

In accordance with a fifteenth embodiment of the present disclosure, an intelligent positive and negative pressure fresh-keeping warehouse is provided. The intelligent positive and negative pressure fresh-keeping warehouse comprises a warehouse body 7. The warehouse body 7 is internally provided with an intelligent positive and negative pressure system, a refrigeration system 8, and a touch screen and mobile phone monitoring system 12. The intelligent positive and negative pressure system comprises a positive and negative pressure chamber 1, a suction pump 2, an inflation pump 3, a positive and negative pressure intelligent regulation device 5, and positive and negative pressure airflow load generation processors. The positive and negative pressure chamber 1 is designed as a warehouse type vacuum high-pressure chamber 1-10 according to particular requirements of the positive and negative pressure fresh-keeping warehouse. The warehouse type vacuum high-pressure chamber 1-10 comprises a chamber body 1.1, a chamber door 1.2, a mechanical airtight mechanism 1.3, and an internal and external communicating sealer 1.4. The chamber door 1.2 is a warehouse door of the positive and negative pressure fresh-keeping warehouse. The mechanical airtight mechanism 1.3 is arranged between the chamber door 1.2 and the chamber body 1.1 of the warehouse type vacuum high-pressure chamber 1-10. The mechanical airtight mechanism 1.3 comprises a lock ring 1.31, a lock bolt 1.32, and an airtight gasket 1.33; the lock ring 1.31 is in movable fit with the lock bolt 1.32, the lock bolt 1.32 extends into the lock ring 1.31 to lock the chamber door during the closing of the chamber door. When the positive and negative pressure is formed inside the warehouse type vacuum high-pressure chamber 1-10, the airtight gasket 1.33 is used for keeping sealing. The internal and external communicating sealer 1.4 is fixedly arranged at the rear part of the warehouse type vacuum high-pressure chamber 1-10, and all pipes and circuits getting in and out the chamber are connected to and pass through the internal and external communicating sealer 1.4 so as to keep the sealing property of the compartment warehouse type vacuum high-pressure chamber 1-10. The warehouse type vacuum high-pressure chamber 1-10 is externally provided with the suction pump 2, the inflation pump 3, the positive and negative pressure intelligent regulation device 5, a modified atmosphere device 6.1, a super oxygen decomposer 6.7, an air filter 6.8, a refrigeration system 8, an air water production device 11, a filtering water tank 11.1, and the touch screen and mobile phone monitoring system 12. An air suction pipeline A1 is installed at an air inlet a of the suction pump 2, a solenoid valve B1 is installed at the middle part of the air suction pipeline A1, and the other end of the air suction pipeline extends into the warehouse type vacuum high-pressure chamber 1-10 to form an air suction and air return port c thereof. An exhaust pipeline A2 is installed at an air outlet b of the suction pump 2, the super oxygen decomposer 6.7 and a solenoid valve B2 are installed at the middle part of the exhaust pipeline A2, the other end of the exhaust pipeline A2 communicates with an air inlet h of the air water production device 11, and passes through the air water production device 11 and then is open to atmosphere from an air outlet n of the air water production device 11. An inflation pipeline A3 is installed at an air outlet d of the inflation pump 3, a solenoid valve B3 is installed at the middle part of the inflation pipeline A3, and the other end of the inflation pipeline A3 extends into the warehouse type vacuum high-pressure chamber 1-10 to form an inflatable air inlet f thereof. An air intake pipeline A4 is installed at an air inlet e of the inflation pump 3, a solenoid valve B4 and the air filter 6.8 are installed at the middle part of the air intake pipeline A4, and the other end of the air intake pipeline A4 is open to the atmosphere. A circulating pipeline A5 is further connected to the solenoid valve B4, a solenoid valve B5 is installed at the middle part of the circulating pipeline A5, and the other end of the circulating pipeline A5 communicates with the solenoid valve B3, and extends into the warehouse type vacuum high-pressure chamber 1-10 through the inflation pipeline A3 to form a circulating air return port j thereof. An air water production inflation pipeline A9 is further connected to the inflation pipeline A3, the air water production inflation pipeline A9 is connected to the solenoid valve B2 and then communicates with an air inlet h of the air water production device 11 through the exhaust pipeline A2. A modified atmosphere air intake pipeline A6 is installed at an air inlet t of the modified atmosphere device 6.1, a solenoid valve B6 is installed at the middle part of the modified atmosphere air intake pipeline A6, the other end of the modified atmosphere air intake pipeline A6 is connected to the inflation pipeline A3, and then communicates with the air outlet d of the inflation pump 3. A modified atmosphere air outlet pipeline A7 is installed at an air outlet s of the modified atmosphere device 6.1, a solenoid valve B7 is installed at the middle part of the modified atmosphere air outlet pipeline A7, and the other end of the modified atmosphere air outlet pipeline A7 extends into the warehouse type vacuum high-pressure chamber 1-10 to form a modified atmosphere air outlet I thereof. An air water production pipeline A10 is installed at a water outlet x of the air water production device 11, and the air water production pipeline A10 communicates with a water inlet y of the filtering water tank 11.1; and condensate water generated in the warehouse type vacuum high-pressure chamber 1-10 flows into a water inlet Y of a condensate water collecting box 11.2 at the bottom in the chamber. A condensate water pipeline A11 is installed at a water outlet M of the condensate water collecting box 11.2, the condensate water pipeline A11 is provided with a solenoid valve B11 at the rear middle part after extending out the warehouse type vacuum high-pressure chamber 1-10, and the other end of the condensate water pipeline A11 communicates with a water inlet v of the filtering water tank 11.1. A humidifying water pipeline A12 is installed at a water outlet o of the filtering water tank 11.1, a solenoid valve B12 is installed at the middle part of the humidifying water pipeline A12, the other end of the humidifying water pipeline A12 extends into the warehouse type vacuum high-pressure chamber 1-10 to communicate with a water inlet R of the humidifier 6.5. A refrigeration circulating pipeline A13 is installed on the refrigeration system 8, the refrigeration circulating pipeline A13 extends into the warehouse type vacuum high-pressure chamber 1-10 to communicate with an evaporator air-cooling assembly 8.1. The touch screen and mobile phone monitoring system 12 comprises a touch screen 12.1, a mobile phone APP 12.2, and an anti-fog camera device 12.3. The anti-fog camera device 12.3 is installed at the position inside/outside the warehouse body 7 needing to be monitored. The warehouse type vacuum high-pressure chamber 1-10 is internally provided with positive and negative pressure airflow load generation processors and sensors, comprising: the humidifier 6.5, a super oxygen generator 6.2, a negative ion generator 6.3, an air catalyst controlled release device 6.4, the condensate water collecting box 11.2, a pressure sensor C1, a negative pressure sensor C2, a super oxygen sensor C3, a negative oxygen ion sensor C4, a chlorine dioxide sensor C5, a humidity sensor C6, an oxygen sensor C7, a nitrogen sensor C8, and a temperature sensor C9. All airflow load generation processors, sensors, solenoid valves and equipment devices arranged inside and outside the warehouse type vacuum high-pressure chamber 1-10 comprise the suction pump 2, the inflation pump 3, the modified atmosphere device 6.1, the super oxygen generator 6.2, the negative ion generator 6.3, the air catalyst controlled release device 6.4, the humidifier 6.5, the super oxygen decomposer 6.7, the refrigeration system 8, the air water production device 11, the filtering water tank 11.1, the touch screen and mobile phone monitoring system 12, the touch screen 12.1, the anti-fog camera device 12.3, the pressure sensor C1, the negative pressure sensor C2, the super oxygen sensor C3, the negative oxygen ion sensor C4, the chlorine dioxide sensor C5, the humidity sensor C6, the oxygen sensor C7, the nitrogen sensor C8, the temperature sensor C9, a water level sensor C10 and the solenoid valves B1 to B12 are all connected to the positive and negative pressure intelligent regulation device 5.

In accordance with a sixteenth embodiment of the present disclosure, an operation method for the intelligent positive and negative pressure fresh-keeping warehouse is provided. The method comprises the following steps: closing the chamber door 1.2 after fresh goods needing to be transported in fresh are loaded into the warehouse type vacuum high-pressure chamber 1-10; touching the chamber door switch 1.8 or manually turning on the chamber door switch by a warehouse keeper, sending an instruction by the positive and negative pressure intelligent regulation device 5, and enabling the solenoid valves B1 and B2 to open the air suction pipelines A1 and A2 (air suction and air return port c of vacuum high-pressure chamber→A1→B1→A1→air inlet a of suction pump 2→air outlet b→A2→air inlet g of super oxygen decomposer→air outlet m→A2→B2→A2→air inlet h of air water production device→air outlet n→A2→exhaust to atmosphere), and turning on the suction pump 2 to pump the warehouse type vacuum high-pressure chamber 1-10 to a moderate vacuum (−0.01 KPa to −0.1 MPa), pumping away the self-contained heat of fruits, vegetables, meat and fish, part of bacteria and microorganisms and polluted air in the chamber, vacuumizing to make volatile metabolites ethylene acetaldehyde ethanol and other harmful gases in the fruit and vegetable tissues to escape and be pumped away, while inhibiting the reproduction of residual bacteria with the negative pressure to reduce the potential risks of disease aging of fruits and vegetables; (2) depressurized and humidified storage procedure: according to the pressure standard of the preset procedure and the real-time feedback of the negative pressure sensor C2, turning the suction pump 2 on or off by the positive and negative pressure intelligent regulation device 5 to a maintain an appropriate negative-pressure, low-oxygen and low-temperature environment within the warehouse type vacuum high-pressure chamber 1-10, thus reducing respiration intensity of fruits and vegetables, inhibiting the biosynthesis of ethylene, delaying decomposition of chlorophyll, inhibiting the synthesis of carotenoids and lycopene, and slowing down the processes such as hydrolysis of starch, increase of sugar and consumption of acid to delay mature senescence of the fruits and vegetables, and meanwhile, turning on the humidifier 6.5 to increase humidity in the chamber and prevent the water contained in the fruits and vegetables from escaping, thus maintaining the fresh state of the fruits and vegetables for a longer time; (3) super-oxygen pressurized sterilization and degradation procedure: according to the procedure setting and feedback of the sensors C3, C4 and C6, sending, by the positive and negative pressure intelligent regulation device 5, an instruction at a proper time to turn on the super oxygen generator 6.2, the negative oxygen ion generator 6.3 and the humidifier 6.5, thus enabling the super oxygen, humidity and negative oxygen ions in the warehouse type vacuum high-pressure chamber 1-10 to reach the required standards; meanwhile, enabling the solenoid valves B3 and B4 to open the inflation pipelines A3 and A4 (intake from atmosphere→A4→air filter→A4→B4→A4→air inlet e of inflation pump→air outlet d→A3→B3→A3→inflatable air inlet f1 of vacuum high-pressure chamber), and turning on the inflation pump 3 to properly pressurize the vacuum high-pressure chamber 1-10 to 0.01 KPa to 10 MPa, wherein the super oxygen at the appropriate positive pressure is able to perform sterilization, disinfection and mildew resistance on the fruits, vegetables, meat and fish in the warehouse type vacuum high-pressure chamber 1-9 and degrade pesticide residues and ethylene and other gases exhaled by the metabolism of the fruits and vegetables, thus affecting enzyme activity in the fruits and vegetables, preventing the fruits and vegetables from browning and softening, and delaying the aging of the fruits and vegetables; and the appropriate high pressure further prevents the water contained in the fruits, vegetables, meat and fish from escaping, moreover, the moisture at the positive pressure is easier to permeate into the fruits, vegetables, meat and fish to supplement the water loss thereof caused by refrigeration and negative pressure, while the negative oxygen ions make the water cluster of moisture smaller so as to be absorbed by the fruits, vegetables, meat and fish easier and have the functions of inhibiting biological tissue metabolism, reducing respiration intensity, slowing down enzyme activity, and sterilizing and purifying to a certain extent; the super oxygen at the positive pressure is able to permeate into the deeper interior of the fruits, vegetables, meat and fish to play a better role in sterilization and disinfection; (4) modified atmosphere pressurized storage procedure: opening the air suction pipeline and turning on the suction pump 2 and the super oxygen decomposer 6.7 at a proper time by the positive and negative pressure intelligent regulation device 5 according to the procedure setting or the feedback of the sensors, pumping the decomposed, sterilized, disinfected and degraded polluted air out of the chamber, and then enabling the solenoid valves B3, B6, B7 and B2 to open the modified atmosphere inflation pipelines A3, A9, A6 and A7 (air outlet d of inflation pump→A3→A9→A6→B6→A6→air inlet t of modified atmosphere device→air outlet s→A7→B7→A7→modified atmosphere air inlet i of vacuum high-pressure chamber), and turning on the inflation pump 3 to drive the airflow to pass through a hollow fiber membrane of the modified atmosphere device 6.1 to separate the oxygen out, and enabling high-nitrogen low-oxygen gas to enter the vacuum high-pressure chamber 1-10; meanwhile, enabling the solenoid valves B3, B5 and B4 to open the modified atmosphere circulating pipelines (circulating air return port j of vacuum high-pressure chamber→A3→B3→A5→B5→A5→B4→A4→air inlet e of inflation pump→air outlet d of inflation pump); turning on the humidifier 6.5 until the modified atmosphere gas concentration, air humidify and positive atmospheric pressure in the chamber all reach the modified atmosphere pressurized storage standards; forming a nitrogen-rich and oxygen-poor environment with an appropriate proportion in the warehouse type vacuum high-pressure chamber 1-10 and keeping at the appropriate positive pressure and appropriate humidity to effectively control the respiration rate of the stored fruits and vegetables, thus preventing anaerobic respiration and carbon dioxide poisoning, slowing down the aging process, preventing the quality decrease and flavor loss of the stored fruits and vegetables, and maintaining the moisture and supplementing the water of the fruits and vegetables with the positive pressure so as to maintain the freshness of the fruits and vegetables to the maximum extent; (5) open-to-exhaust protection function: if the warehouse door is opened during super-oxygen sterilization and disinfection or modified atmosphere storage, providing feedback immediately by the chamber door switch, and stopping the super oxygen or modified atmosphere procedure immediately through the operation of the positive and negative pressure intelligent regulation device 5; and meanwhile, opening the air suction pipelines and turning on the suction pump 2 to rapidly pump the super oxygen or high-nitrogen low-oxygen gas to the super oxygen decomposer 6.7 to be exhausted after being decomposed, wherein, as the air flows from the human side to the warehouse type vacuum high-pressure chamber 1-10 for supplementing air suction negative pressure, the user is not exposed to and is protected from the super oxygen and high-nitrogen low-oxygen gas; (6) air water production procedure: enabling moist waste gas extracted from the warehouse type vacuum high-pressure chamber 1-10 by the suction pump 2 to enter the super oxygen decomposer 6.7, and enabling the moist waste gas to enter the air water production device 11 after the super oxygen is decomposed, condensing water vapor and filtering the condensed water vapor into purified water conforming to drinking water standard, thus providing uninterrupted source of water for the humidifier 6.5; when the inflation pump 3 is idle, turning on the inflation pump 3 by the intelligent regulation device 5, and enabling the solenoid valves B3 and B2 to open the air water production inflation pipelines (air outlet d of inflation pump→A3→A9→B2→A2→air inlet h of air water production device→air outlet n→A2-exhaust to atmosphere), driving the air outside the warehouse to enter the air water production device 11 for water production; (7) low-temperature assisted fresh-keeping procedure: after the fresh-keeping warehouse is turned on, turning on the refrigeration system 8 instantly by the positive and negative pressure intelligent regulation device 5, communicating the refrigeration system 8 with an evaporator air-cooling assembly 8.1 by the refrigeration pipeline A13, thus providing corresponding low temperature for the warehouse type vacuum high-pressure chamber 1-10 according to the feedback and control of the temperature sensing controller C9, and assisting the positive and negative pressure system to preserve the freshness of the stored objects; and (8) remote and short-range control monitoring function: controlling and monitoring, by the touch screen and mobile phone monitoring system 12, the real-time state of the positive and negative pressure fresh-keeping warehouse in real time through the touch screen and mobile phone monitoring system 12.2, thus making the fresh-keeping warehouse intelligently achieve various functions at high efficiency and low consumption according to the set procedures and instant instructions; displaying and reminding, by the touch screen 12.1 or the mobile phone APP 12.2, information such as temperature, humidity and gas concentration in the warehouse, loading time and the expiration date of the stored objects, thus facilitating the user to monitor and control the warehouse remotely and in short range; and automatically controlling above procedures by the positive and negative pressure system, and setting the above procedures as shortcut key modes on the touch screen and mobile phone monitoring system 12 for remote and short-range control.

In accordance with a seventeenth embodiment of the present disclosure, an intelligent positive and negative pressure modular cabinet is provided. The intelligent positive and negative pressure modular cabinet comprises a cabinet body 7. The cabinet body 7 is internally provided with an intelligent positive and negative pressure system, a refrigerating and heating system 8.3, and a touch screen and mobile phone monitoring system 12. The intelligent positive and negative pressure comprises a positive and negative pressure chamber 1, a suction pump 2, an inflation pump 3, a positive and negative pressure intelligent regulation device 5, and positive and negative pressure airflow load generation processors. The positive and negative pressure chamber 1 is designed as a modular vacuum high-pressure chamber 1-11 according to particular requirements of the intelligent positive and negative pressure modular cabinet. The modular vacuum high-pressure chamber 1-11 comprises a chamber body 1.1, a chamber door 1.2, a pneumatic airtight mechanism 1.5, an internal and external communicating sealer 1.4, and a pneumatic chamber door switch 1.8. The chamber door 1.2 is a cabinet door of the positive and negative pressure modular cabinet. The pneumatic airtight mechanism 1.5 is arranged between the chamber door 1.2 and the chamber body 1.1 of the modular vacuum high-pressure chamber 1-11. The pneumatic airtight mechanism 1.5 comprises pneumatic sealing lock bolts 1.51 and sealing lock bolt telescopic airbags 1.52 which are integrally manufactured at the rear parts of the sealing lock bolts 1.51, the number of the sealing lock bolts 1.51 and the sealing lock bolt telescopic airbags 1.52 which are of an integrated structure is four, and the integrated structures are all in the shape of long strips and respectively installed in four chamber airtight grooves 1.11 arranged in four borders of the door frame of the chamber body 1.1, the outer layer of the section of the lock bolt is sealing rubber, and the inside of the lock bolt is a bend-resistant metal core. The sealing lock bolt foldable telescopic airbag 1.52 is a foldable rubber airbag which can be inflated to elongate; an inflation socket 1.53 is arranged at the rear part of each airbag, and an inflation plug 1.54 is plugged into the inflation socket 1.53. Tour inflation plugs 1.54 are respectively installed at respective midpoints of four side pipelines connected to the four edges of a square annular airtight mechanism inflatable branch pipeline A8.1. The pipeline at the top side of the square annular airtight mechanism inflatable branch pipeline A8.1 is perpendicularly connected to an inflation pipeline A8 and communicates with an air outlet d of the inflation pump 3 by a solenoid valve B5 and the pipeline A3 as well as a solenoid valve B3. When closed, the chamber door 1.2 makes contact with the pneumatic chamber door switch 1.8, and the inflation pump 3 is immediately started to inflate and elongate the sealing lock bolt foldable telescopic airbag 1.52 and push the sealing lock bolt 1.51 to extend outwards from the chamber airtight groove 1.11 and extend into the chamber door airtight groove 1.21 arranged at the opposite position, thereby locking and sealing the chamber door. When a user opens the chamber door, the sealing lock bolt foldable telescopic airbag 1.52 is deflated by the pneumatic chamber door switch 1.8, such that the sealing lock bolt 1.51 retracts to open the chamber door. The internal and external communicating sealer 1.4 is fixedly arranged at the rear part of the modular vacuum high-pressure chamber 1-11, all pipelines and circuits getting in and out the chamber are connected to and pass through the internal and external communicating sealer 1.4 so as to keep the sealing property of the modular vacuum high-pressure chamber 1-11. The modular vacuum high-pressure chamber 1-11 is externally provided with the suction pump 2, the inflation pump 3, the positive and negative pressure intelligent regulation device 5, a modified atmosphere device 6.1, a super oxygen decomposer 6.7, an air filter 6.8, the refrigerating and heating system 8.3, an air water production device 11, a filtering water tank 11.1, the pneumatic chamber door switch 1.8, and the touch screen and mobile phone monitoring system 12. An air suction pipeline A1 is installed at an air inlet a of the suction pump 2, a solenoid valve B1 is installed at the middle part of the air suction pipeline A1, and the other end of the air suction pipeline A1 extends into the modular vacuum high-pressure chamber 1-11 to form an air suction and air return port c thereof. An exhaust pipeline A2 is installed at an air outlet b of the suction pump 2, the super oxygen decomposer 6.7 and a solenoid valve B2 are installed at the middle part of the exhaust pipeline A2, the other end of the exhaust pipeline A2 communicates with an air inlet h of the air water production device 11, and passes through the air water production device 11 and then is open to the atmosphere through the air outlet n of the air water production device 11. An inflation pipeline A3 is installed at an air outlet d of the inflation pump 3, a solenoid valve B3 is installed at the middle part of the inflation pipeline A3, and the other end of the inflation pipeline A3 extends into the modular vacuum high-pressure chamber 1-11 to form an inflatable air inlet f. An air intake pipeline A4 is installed at an air inlet e of the inflation pump 3, a solenoid valve B4 and the air filter 6.8 are installed at the middle part of the air intake pipeline A4, and the other end of the air intake pipeline A4 is open to the atmosphere. A circulating pipeline A5 is further connected to the solenoid valve B4, a solenoid valve B5 is installed at the middle part of the circulating pipeline A5, and the other end of the circulating pipeline A5 communicates with the solenoid valve B3, and extends into the modular vacuum high-pressure chamber 1-11 through the inflation pipeline A3 to form a circulating air return port j thereof. An airtight mechanism inflation pipeline A8 is further connected to the solenoid valve B5, and the airtight mechanism inflation pipeline A8 communicates with the air outlet d of the inflation pump 3 after passing through the solenoid valve B5 and the inflation pipeline A3, and the other end of the inflation pipeline A8 is connected to the pipeline at the top side of the square annular inflation pipeline A8.1. The pipelines at four sides of the square annular inflation pipeline A8.1 communicate with one another, the inflation plugs 1.54 are connected to the middle points of the pipelines at four sides, and the inflation plugs 1.54 are plugged into the corresponding inflation sockets 1.53. An air water production inflation pipeline A9 is further connected to the inflation pipeline A3, the air water production inflation pipeline A9 is connected to the solenoid valve B2 and communicates with an air inlet h of the air water production device 11 through the exhaust pipeline A2. A modified atmosphere air intake pipeline A6 is installed at an air inlet t of the modified atmosphere device 6.1, a solenoid valve B6 is installed at the middle part of the modified atmosphere air intake pipeline A6, and the other end of the modified atmosphere air intake pipeline A6 is connected to the inflation pipeline A3 and then communicates with the air outlet d of the inflation pump 3. A modified atmosphere air outlet pipeline A7 is installed at an air outlet s of the modified atmosphere device 6.1, a solenoid valve B7 is installed at the middle part of the modified atmosphere air outlet pipeline A7, and the other end of the modified atmosphere air outlet pipeline A7 extends into the modular vacuum high-pressure chamber 1-11 to form a modified atmosphere air outlet i thereof. An air water production pipeline A10 is installed at a water outlet x of the air water production device 11, and the air water production pipeline A10 communicates with a water inlet y of the filtering water tank 11.1; AND condensate water generated in the modular vacuum high-pressure chamber 1-11 flows into a water inlet Y of a condensate water collecting box 11.2 at the bottom in the chamber. A dehumidification condensate water pipeline A31 is installed at another water inlet N of the condensate water collecting box 11.2, and the other end of the dehumidification condensate water pipeline A31 is connected to a condensate water drainage port H of the dehumidifying device. A condensate water pipeline A11 is installed at a water outlet M of the condensate water collecting box 11.2, the condensate water pipeline A11 is provided with a solenoid valve B11 at the rear middle part after extending out the modular vacuum high-pressure chamber 1-11, and the other end of the condensate water pipeline A11 communicates with a water inlet v of the filtering water tank 11.1. A humidifying water pipeline A12 is installed at a water outlet o of the filtering water tank 11.1, a solenoid valve B12 is installed at the middle part of the humidifying water pipeline A12, the other end of the humidifying water pipeline A12 extends into the modular vacuum high-pressure chamber 1-11 to communicate with a water inlet R of a humidifier 8.5. A refrigeration circulating pipeline A13 is installed at the refrigerating and heating system 8.3, the refrigeration circulating pipeline A13 extends into the modular vacuum high-pressure chamber 1-11 to communicate with an a heat exchanger 8.4. The touch screen and mobile phone monitoring system 12 comprises a cabinet door touch screen 12.1, a mobile phone APP 12.2, and a high-definition anti-fog camera device 12.3. The high-definition anti-fog camera device 12.3 is installed at the position inside/outside the cabinet body 7 needing to be monitored. The modular vacuum high-pressure chamber 1-11 is internally provided with positive and negative pressure airflow load generation processors and sensors, comprising: the humidifier 6.5, an air disinfection and sterilization device 6.9, an air filter and purifier 6.10, a dehumidifying device 6.11, the condensate water collecting box 11.2, a pressure sensor C1, a negative pressure sensor C2, a super oxygen sensor C3, a negative oxygen ion sensor C4, a chlorine dioxide sensor C5, a humidity sensor C6, an oxygen sensor C7, a nitrogen sensor C8, a temperature sensing controller C9, a water level sensing controller C10, and an air particulate matter sensor C11. All airflow load generation processors, sensors, solenoid valves and equipment devices arranged inside and outside the modular vacuum high-pressure chamber 1-11 comprise the suction pump 2, the inflation pump 3, the modified atmosphere device 6.1, the humidifier 6.5, the super oxygen decomposer 6.7, the refrigerating and heating system 8.3, the heat exchanger 8.4, the air water production device 11, the filtering water tank 11.1, the touch screen and mobile phone monitoring system 12, the cabinet door touch screen 12.1, the high-definition anti-fog camera device 12.3, the pressure sensor C1, the negative pressure sensor C2, the super oxygen sensor C3, the negative oxygen ion sensor C4, the chlorine dioxide sensor C5, the humidity sensor C6, the oxygen sensor C7, the nitrogen sensor C8, the temperature sensing controller C9, the water level sensing controller C10, the air particulate matter sensor C11 and the solenoid valves B1 to B12 are all connected to the positive and negative pressure intelligent regulation device 5.

In accordance with an eighteenth embodiment of the present disclosure, an operation method for the intelligent positive and negative pressure modular cabinet is provided. As the intelligent positive and negative pressure modular cabinet has a vacuum, high-pressure, constant-temperature, constant-humidity, constant-pressure, sterile and dust-free environment, various objects and equipment, such as tableware, kitchenware and electrical appliances, can be placed and installed therein, the operation method comprises: (1) vacuum abatement cleaning procedure: after placing the tableware, kitchenware, small electrical appliances and small objects into the modular vacuum high-pressure chamber 1-11, touching the chamber door switch 1.8 while closing the chamber door 1.2, and then sending an instruction by the positive and negative pressure intelligent regulation device 5: enabling the solenoid valves B1 and B2 to open the air suction pipelines A1 and A2 (air suction and air return port c of vacuum high-pressure chamber→A1→B1→A1→air inlet a of suction pump 2→air outlet b→A2→air inlet g of super oxygen decomposer→air outlet m→A2→B2→A2→air inlet h of air water production device→air outlet n→A2→exhaust to atmosphere), and turning on the suction pump 2 to vacuumize the modular vacuum high-pressure chamber 1-11 to a moderate vacuum (−0.01 KPa to −0.1 MPa), pumping out part of bacteria and microorganisms and polluted air in the chamber to clean the air and space; (2) disinfection and sterilization procedure: sending an instruction by the positive and negative pressure intelligent regulation device 5 to turn on the air disinfection and sterilization device 6.9, wherein the air disinfection and sterilization device 6.9 comprises a super oxygen generator, an ultraviolet disinfection lamp, and the like, which can be selected according to different disinfection requirements to disinfect and sterilize the environment and objects in the chamber; (3) sterile and undamaged storage procedure under particular conditions: providing vacuum, high-pressure, constant-temperature, constant-humidity, constant-pressure, sterile, dust-free and other particular storage environments by different types and configurations of modular cabinets, thus satisfying various different storage demands, for example, the tableware, kitchenware, small electrical appliances and small objects can be stored in vacuum after being disinfected by super oxygen, paintings, documents, antiques and high-end clothing may be stored in vacuum, low oxygen and dust prevention, or stored by using a particular modified atmosphere gas, or stored at constant temperature, constant humidity and constant pressure; (4) multi-purpose display refrigeration of water and wine bar: refrigerating and storing the packaged food, beverages, alcoholic beverages, fruits and dried fruits, candy and cakes and other food and objects with transparent cabinet doors in a display manner; (5) remote and short-range control monitoring function: controlling and monitoring, by the touch screen and mobile phone monitoring system 12, the positive and negative pressure modular cabinet in real time by the WIFI and mobile phone APP at remote and short-range, thus making the modular cabinet to intelligently achieve various functions at high efficiency and low consumption according to the set procedures and instant instructions; shooting, by the high-definition anti-fog camera device 12.3, the statuses of objects in the modular cabinet in real time; displaying and reminding, by a cabinet door touch screen 12.1 or a mobile phone APP 12.2, commodity information such as production date, price, expiration date and manufacturers and the information of purchase shopping malls and online stores, automatically recording, analyzing and handling the big data such as the time, quantity, frequency and preference of storing the objects in, and taking the objects out, the modular cabinet, and performing intelligent analysis; timely reminding on the mobile phone APP 12.2 or directly pushing the suggested goods to the mobile phone APP 12.2 or the cabinet door touch screen 12.1 for easy selection of purchase by the user, wherein, in addition to real-time monitoring and recording, the high-definition anti-fog camera device 12.3 is especially required to automatically and continuously shoot several panoramic photos of the objects in the modular cabinet with the closing movement of the cabinet door 1.2 by starting from the position remote away from the modular cabinet in the process of closing the cabinet door, or automatically record small videos at the same time for the users to view in the mobile phone APP, or view the panoramic photos or videos of the objects in the modular cabinet with good light and wide field of vision before and during the last closing of the door in the cabinet door touch screen at any time without opening the cabinet door, releasing the vacuum and lowering the temperature during short range; (6) positive and negative pressure module combined intelligent smart home mode: designing and manufacturing the intelligent positive and negative pressure modular cabinet according to the module functions, wherein the intelligent positive and negative pressure modular cabinet can be independently produced and used as a separated invention, or can be organically combined with other positive and negative pressure electrical appliances and the modular cabinets under the control of the touch screen and mobile phone APP monitoring system 12 to form a fully functional intelligent positive and negative pressure module combined home; and the modular cabinet not only has high energy efficiency and low consumption, but also can share the intelligent positive and negative pressure system, the refrigeration system and the air water production device of other positive and negative pressure electrical appliances and modular cabinets, and the fully functional intelligent positive and negative pressure module combined home is basically uniform, neat and harmonious in appearance, shape and color which are in line with the popular trend.

It must be emphasized that: the above described positive and negative pressure system and the operation method therefor and a plurality of intelligent positive and negative pressure electrical appliances using the same are several preferred embodiments of the solutions of the embodiments of the present disclosure, and are not intended to limit the embodiments of the present disclosure. Any modification, equivalent replacement, improvement and the like made within the spirit and principles of the embodiments of the present disclosure shall be included in the scope of protection of the embodiments of the present disclosure.

Compared with the prior art, the positive and negative pressure system and the operation method therefor and the intelligent positive and negative pressure electrical appliances using positive and negative pressure system have the advantages that:

Firstly, there has no technical breakthrough in the method that the existing refrigerator only relies on low-temperature bacteriostatic storage. The intelligent positive and negative pressure system and the operation method therefor, the intelligent regulation and integration of multiple technologies such as vacuum, high pressure, super oxygen, catalysts, modified atmosphere fresh-keeping, negative ions, humidification and dehumidification, disinfection, air purification, air water production, and low-temperature storage by applying the intelligent positive and negative pressure technology and the operation method therefor are invented in the scientific research process of exploring and solving the current technical problems in the better use of vacuum, high pressure, super oxygen, modified atmosphere fresh-keeping and other technologies to the refrigerator. The characteristics of vacuum and high pressure have long been known by people, as the bacteria and microorganisms cannot survive in vacuum and stored fruits and vegetables are not easy to rot, the people are always attracted to store the food in vacuum. However, the absence of oxygen in the vacuum may also cause the anaerobic respiration of fruits and vegetables, leading to the loss of quality and freshness, and meanwhile, when the vacuum negative pressure is excessively low, the cells and tissue structures of the fruits, vegetables, meat and fish may be damaged to cause rotting, and the internal water of the fruits, vegetables, meat and fish may escape quickly to lead to the quality decline and flavor loss. Because of mixed advantages and disadvantages, the vacuum and high pressure have not been applied to refrigerators and other household appliances. High-pressure technology is used in the fields of freezing and refrigeration. After years of research, it has been proved that by adopting high-pressure bacteriostasis, high-pressure freezing, high-pressure thawing and high-pressure unfreezing refrigeration technologies, the technical problem that the largest ice crystal formation zone causes irreversible quality loss to the food in normal-pressure freezing, thawing and freezing preservation can be solved through the coordinated configuration of pressure and temperature, and the speed of high-pressure freezing and thawing is much faster than that under normal pressure. However, it is very difficult to create a deep vacuum and ultra-high-pressure space in the household appliances with existing materials and technical level, there are many problems, and the cost is too high to be suitable for the home appliance. All these reasons lead to the fact that vacuum and high-pressure technologies have not been actually applied to refrigerators and other household appliances. In accordance with the positive and negative pressure technology, the positive and negative pressure system and an operation method therefor in the embodiment of the present disclosure, the atmospheric pressure or the local instant air pressure is used as the zero standard starting point, the vacuum at the appropriate pressure and the high pressure are applied to the household electrical appliances on the existing materials and technical level, and with the development of scientific technology, the existing technology is gradually developed to deep vacuum and ultra-high pressure. Numerous advantages of the super oxygen (ozone) for rapidly sterilizing, disinfecting, degrading pesticide residues and organic dirt, inhibiting the activity of enzymes, keeping fruits, vegetables, meat and fish fresh, and cleaning the air have been attracting people to apply it in production and life. However, the contact with super oxygen may harm human health, and there has been no ideal solution for its application in electrical appliances, resulting in that the super oxygen is not actually applied to household appliances such as refrigerators and washing machines. Modified atmosphere fresh-keeping is an advanced fresh-keeping storage method for fruits and vegetables at present, which refers to inhibit the respiration of fruits and vegetables by regulating the concentration ratio of oxygen, nitrogen and carbon dioxide in the storage space, thus the consumption of organic substances is reduced, the original excellent flavor and aromatic flavor are maintained, the metabolism is slowed down, the reproduction of some pathogenic bacteria and the occurrence of physiological diseases are controlled, the fresh-keeping effect is much better than that of general refrigeration, the fresh-keeping period is obviously prolonged, and the power consumption is low. However, the modified atmosphere storage needs an airtight space capable of resisting a certain pressure, which not only needs to produce the gas mixture with the best ratio and concentration and input the gas mixture into the storage space, but also needs to discharge the waste gas at a proper time. Moreover, the renewal of the modified atmosphere gas needs the accurate maintenance of the circulation system, etc., all of which cannot be done by general refrigerators. In fact, the refrigerator in the prior art still has a fatal defect affecting the fresh-keeping that has not been solved or noticed, that is, it has no ventilation function, and the air in the refrigerator is quickly polluted to affect the fresh-keeping effect. Although there is a certain ventilation effect when opening and closing the door of the refrigerator, it is not thorough and reliable All the above defects are basically solved in the embodiment of the present disclosure. The positive and negative pressure system in accordance with the embodiment of the present disclosure can intelligently regulate the airflow, or carry multiple effective loads such as ozone, an air catalyst, a negative ion, modified atmosphere gas, and water for orderly getting in and out of or staying in a positive and negative pressure chamber, just like people's breath, their vitality may be maintained only by exhaling waste turbid gas and inhaling fresh air. The precise regulation of the intelligent positive and negative pressure system makes the fresh goods stored in the positive and negative pressure chambers in the most suitable atmospheric pressure range, the optimal gas composition, the best humidity and temperature, and the excellent storage environment so as to keep them fresh as long as possible. Accordingly, in accordance with the intelligent positive and negative pressure system disclosed by the embodiment of the present disclosure, multiple technologies such as vacuum, high pressure, super oxygen, catalysts, modified atmosphere fresh-keeping, negative ions, humidification and dehumidification, disinfection, air purification, air water production and low-temperature storage are regulated and integrated, and are combined and applied in the positive and negative pressure electrical appliance, so that a respiration function is given to the electrical appliance, existing electrical appliances and traditional technologies are upgraded and updated, and a subdivided field of positive and negative pressure electrical appliances is developed. With the rapid development of the scientific technology, the positive and negative pressure involved in the embodiments of the present disclosure may be gradually developed to the deeper vacuum and ultra-high pressure, the electrical appliances including the positive and negative pressure chambers and suction and inflation pumps and other hardware equipment may be more economic and suitable for use, chip processors including the positive and negative pressure intelligent regulation device and other software and hardware are gradually upgraded and updated, the positive and negative pressure technology will be perfected day by day, and the positive and negative pressure electrical appliances will bring people a better life (the intelligent positive and negative pressure fresh-keeping compartment and intelligent positive and negative pressure warehouse have the basically same technical principle as that of the intelligent positive and negative pressure refrigerator, the advantages of which will not be described again).

Secondly, the existing washing machine is configured to wash clothes by the mechanical movement of pulsator or drum assisted with detergent, which is large in abrasion and low in laundry efficiency. In accordance with the embodiment of the present disclosure, the technologies such as high pressure, vacuum and super oxygen are intelligently regulated and integrated by the intelligent positive and negative pressure washing machine and are combined and used in the laundry, dehydrating and drying processes, thus the abrasion of the clothing is reduced, the degree of cleaning and bulkiness of the clothing are improved, the super oxygen disinfection procedure is increased, and the laundry time is effectively reduced.

Thirdly, there has been no ideal solution to the problem of kitchen stuff cleaning of existing range hoods. In accordance with the embodiment of the present disclosure, the entire machine body of the range hood is designed as a fully sealed super oxygen cabin except for the upper oil fume exhaust port, and a cover plate of the fume extraction port is designed as a sealed cabin door at the same time. When the automatic cleaning is started, the chamber door is tightly locked and sealed, and a plurality of automatic rotary spraying heads are arranged at the top part of the cabinet and volute impellers, etc., firstly, super-oxygenated water is sprayed to efficiently decompose and remove kitchen stuff, then all parts in the machine case are sprayed with degreaser and clean hot water until they are completely cleaned, and finally, the interior of the machine case is automatically dried by hot air and the waste gas is exhausted to the gas duct. When the range hood is turned on the user, the negative pressure is formed inside the machine case, the air flows into the case of the range hood from the human side, such that the human body is free of contact with any super oxygen. The sewage after cleaning the whole range hood flows downwards to be collected into the oil collecting groove at the lowest part of the triangular machine case and then is drained to the sewer through the oil and water drainage port, and the automatic cleaning problem is thoroughly solved.

Fourthly, in accordance with the intelligent positive and negative pressure oven/air fryer/microwave oven provided by the embodiment of the present disclosure, the oven/air fryer/microwave system is arranged in the vacuum high-pressure chamber to actually achieve vacuum cooking and high-pressure cooking. Food cooked with vacuum has special flavor because of the expansion of ingredients, especially the French fries and cakes baked by the air fryer in a moderate vacuum are fluffy and tasty, and food cooked with high pressure is particularly tasty because seasonings are prone to penetrating into ingredients. When not in use, the positive and negative pressure chamber is pumped to a moderate vacuum, the oven microwave system and the circuit system are in a vacuum state, which are sterile, dust-free and pollution-free so as to keep clean for health, and are oxidation-free, rusting-free and lossless for preservation, and thus the service life of the electrical appliance is prolonged.

Fifthly, the intelligent positive and negative pressure modular cabinet has a vacuum, high-pressure, constant-temperature, constant-humidity, constant-pressure, sterile and dust-free environment due to the providing of the positive and negative pressure system, the functional system of various electrical appliances and equipment can be designed and arranged in the positive and negative pressure modular cabinet or directly placed therein, including a positive and negative pressure disinfection cabinet, a positive and negative pressure kitchenware/tableware cabinet, a positive and negative pressure wine/water/fruits display refrigerator cabinet, a positive and negative pressure air conditioner indoor unit, a positive and negative pressure humidifier, a positive and negative pressure dehumidifier, a positive and negative pressure air purifier, a positive and negative pressure coffee/juice small electrical appliance cabinet, a positive and negative pressure closet/bookcase, a positive and negative painting/antique cabinet, a positive and negative pressure safe box, and a positive and negative pressure display cabinet with various functions. In addition, the intelligent positive and negative pressure system and an operation method therefor can be applied to the functional use, disinfection, storage and placement of various electrical equipment and objects and utensils, as well as the lossless storage during the suspension of operation.

Sixthly, the existing electrical appliances are basically designed independently, used independently, and placed independently. The positive and negative pressure intelligent electrical appliances and positive and negative pressure modular cabinets are designed according to modules, which are basically uniform, neat and harmonious in appearance, shape and color which are in line with the popular trend. The positive and negative pressure electrical appliance not only can be independently used, but also can be organically combined with other positive and negative pressure electrical appliances and the modular cabinets under the control of the touch screen and mobile phone APP monitoring system 12 to form a fully functional intelligent positive and negative pressure module combination home. In accordance with the various positive and negative pressure modular cabinets, various related electrical equipment and objects as well as utensils are organically combined in different categories, centrally placed neatly and visual-pleasantly, and can share resources such as a set of intelligent positive and negative pressure system and an inflation pump and a suction pump, save energy consumption and reduce noise, and integrate various related electrical equipment and articles and utensils into the same intelligent home system conveniently and naturally.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
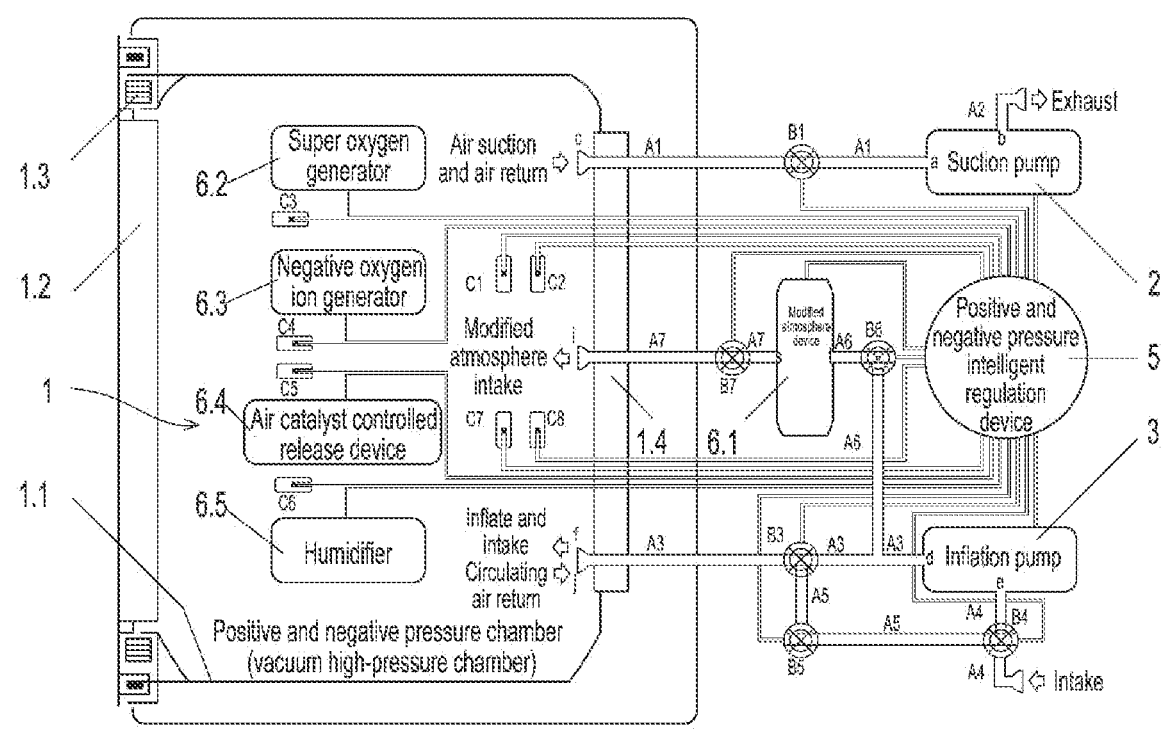
FIG. 1 is a schematic diagram of the technical principle of an intelligent positive and negative pressure system in accordance with an embodiment of the present disclosure.
Figure 2:
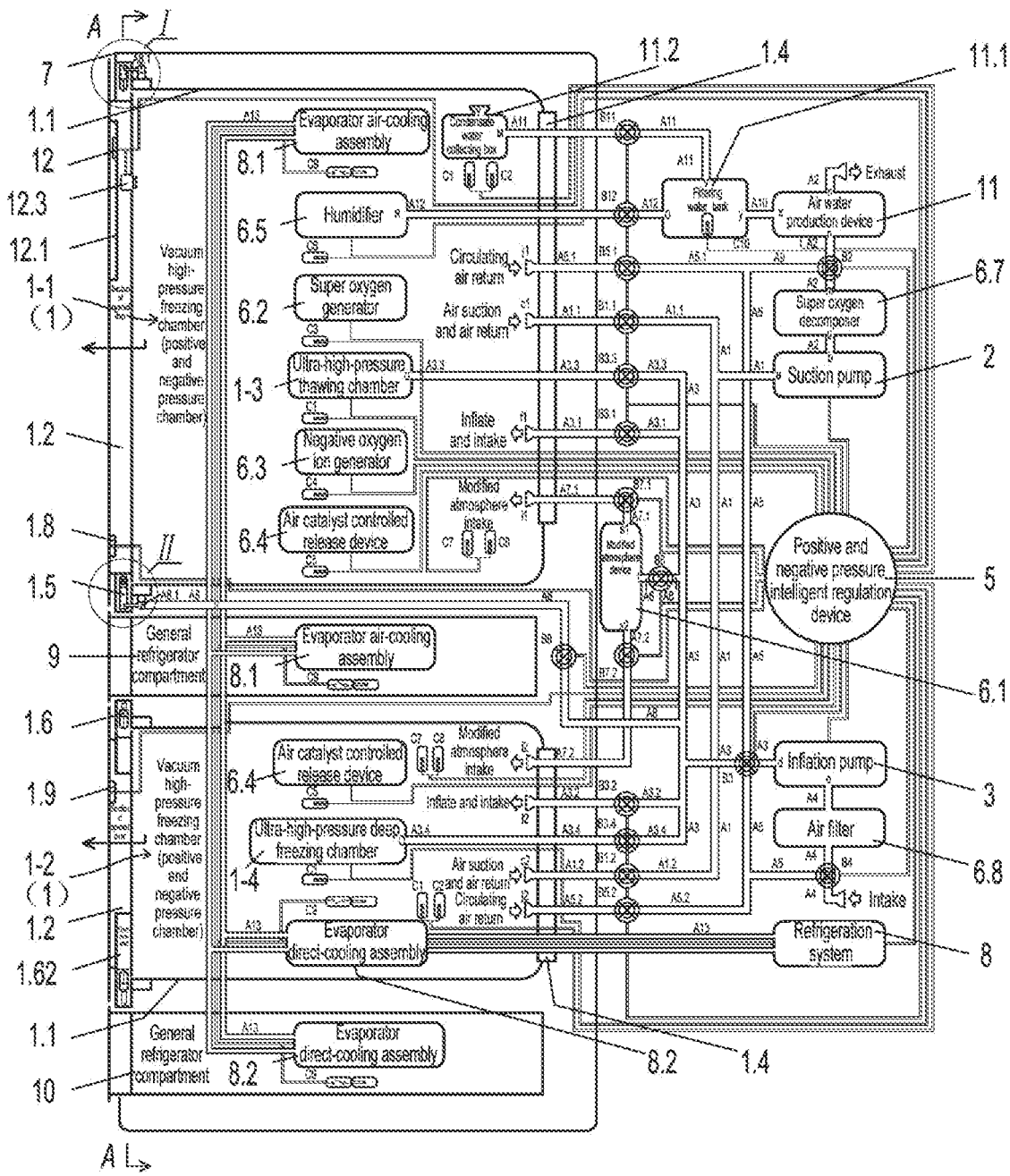
FIG. 2 is a side view of the technical principle of an intelligent positive and negative pressure refrigerator in accordance with an embodiment of the present disclosure.
Figure 3:
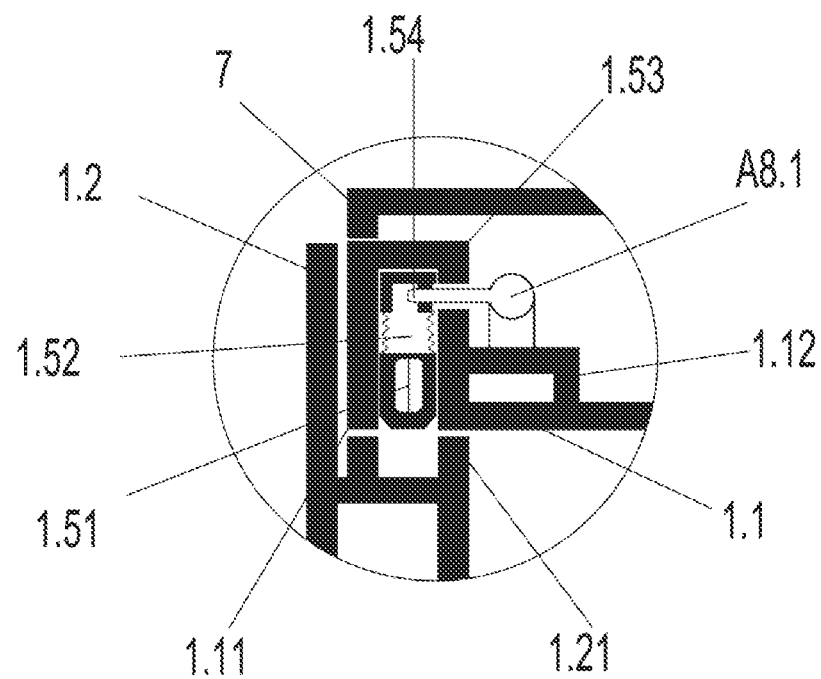
FIG. 3 is an enlarged view of a pneumatic airtight mechanism of an intelligent positive and negative pressure refrigerator in accordance with an embodiment of the present disclosure.
Figure 3:
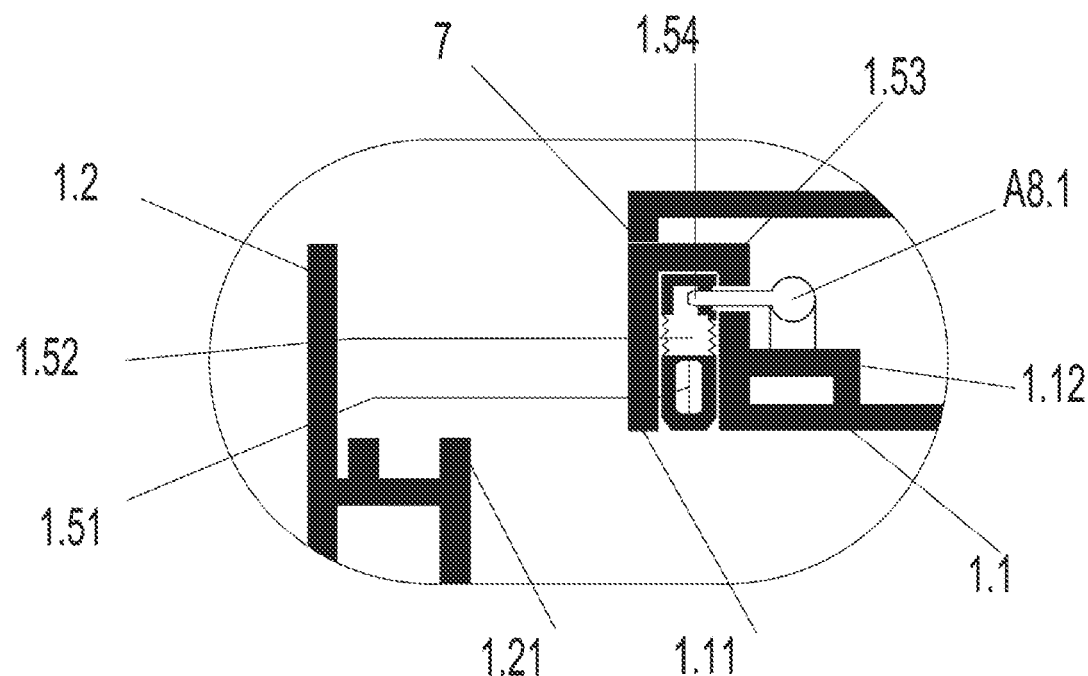
Figure 4:
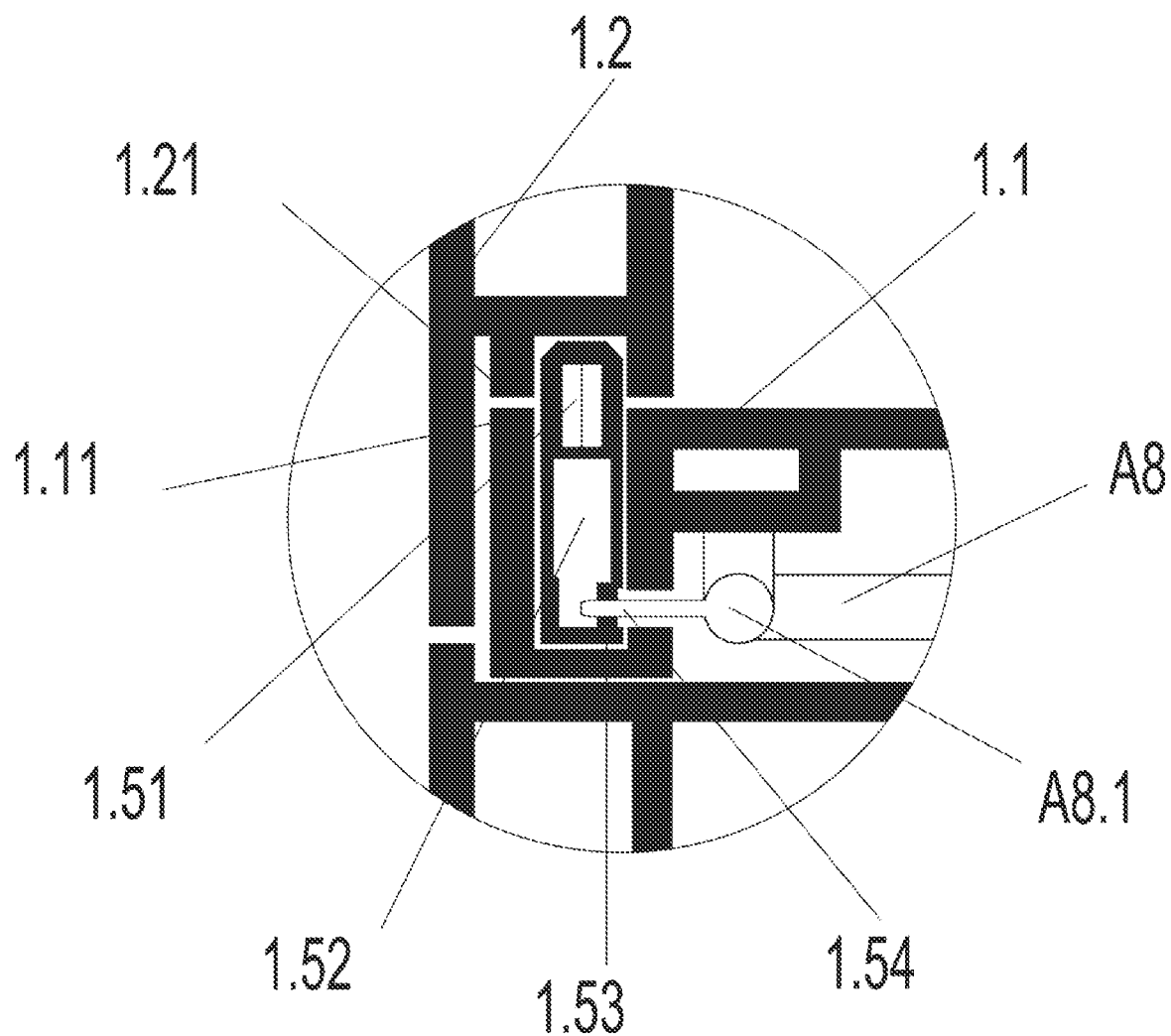
FIG. 4 is an enlarged view of a pneumatic airtight mechanism of an intelligent positive and negative pressure refrigerator in accordance with an embodiment of the present disclosure.
Figure 5:
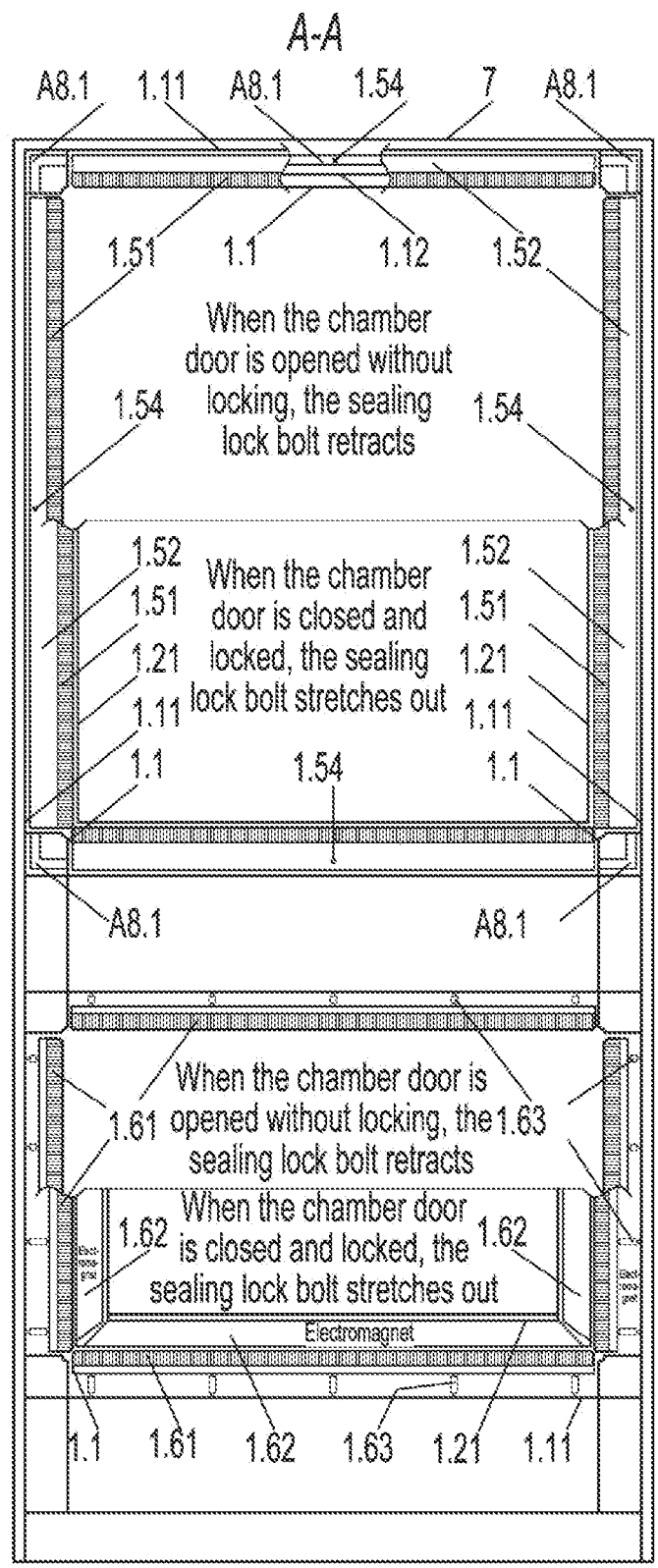
FIG. 5 is a front view of the technical principle of an intelligent positive and negative pressure refrigerator in accordance with an embodiment of the present disclosure.
Figure 6:
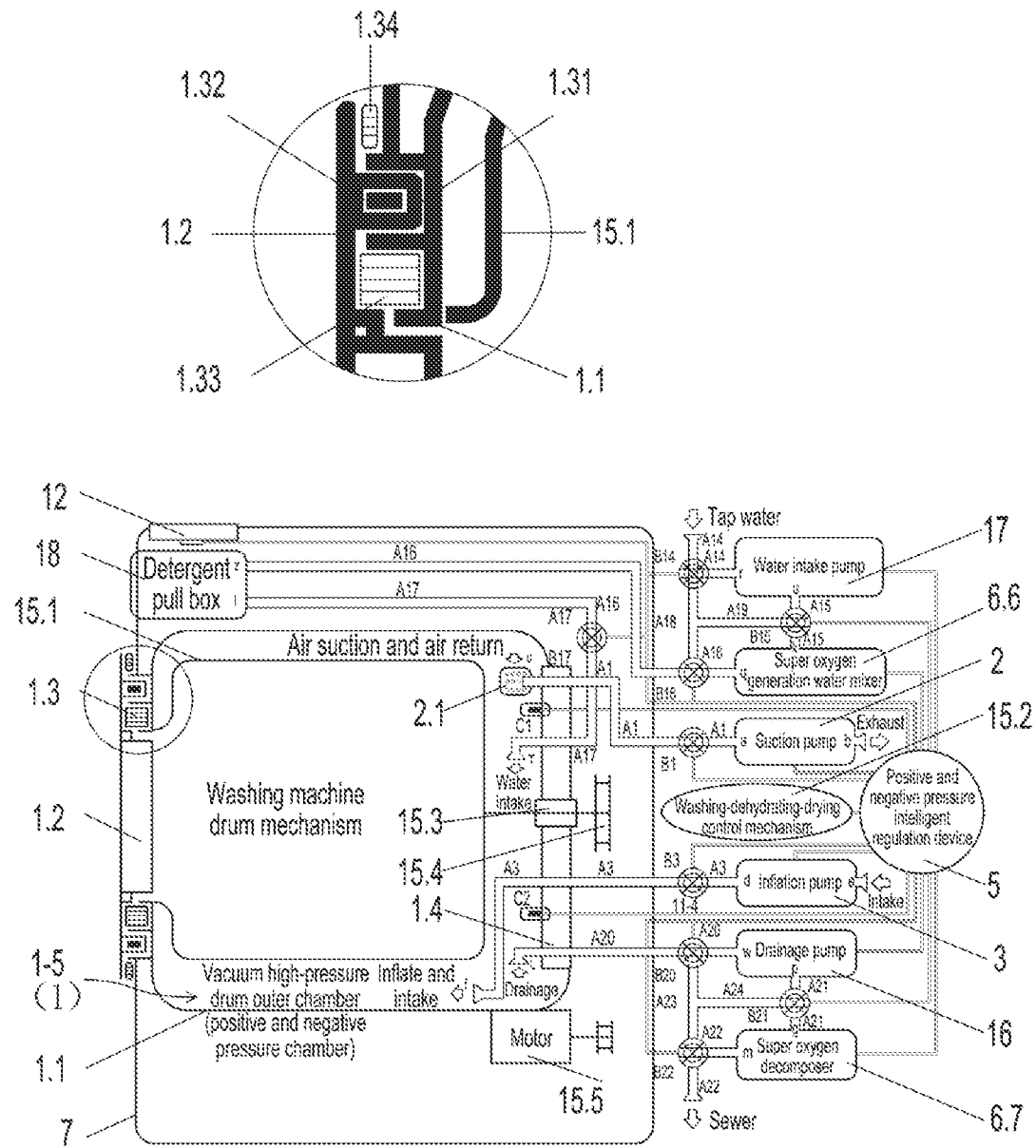
FIG. 6 is a schematic diagram of the technical principle of an intelligent positive and negative pressure washing machine and an enlarged view of a mechanical airtight mechanism in accordance with an embodiment of the present disclosure.
Figure 7:
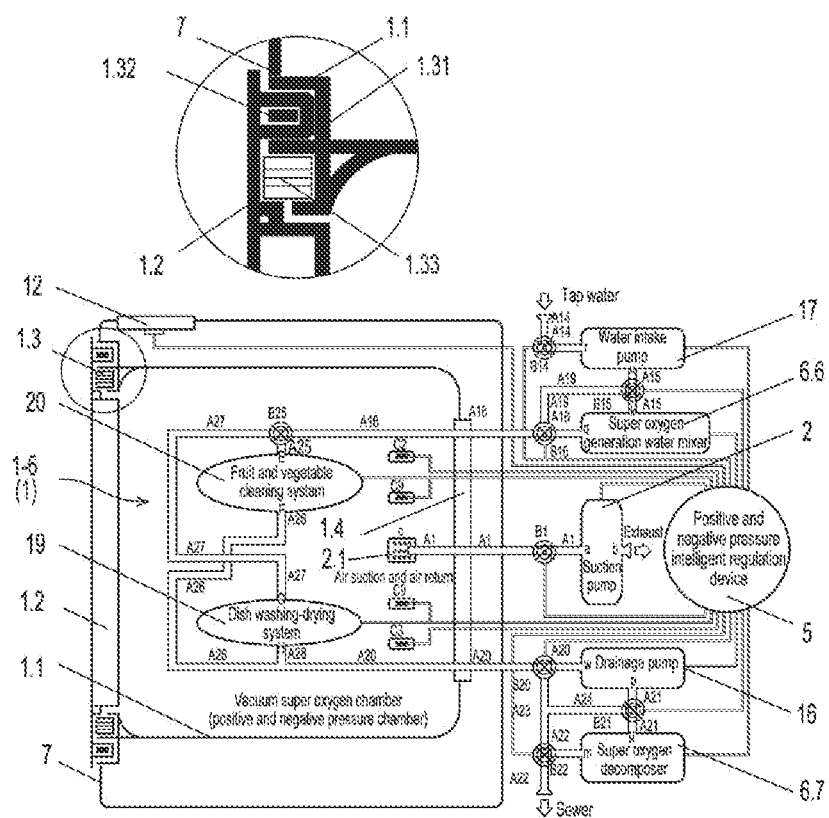
FIG. 7 is a schematic diagram of technical principle of an intelligent positive and negative pressure dishwasher/fruit and vegetable cleaning machine and an enlarged view of a mechanical airtight mechanism in accordance with an embodiment of the present disclosure.
Figure 8:
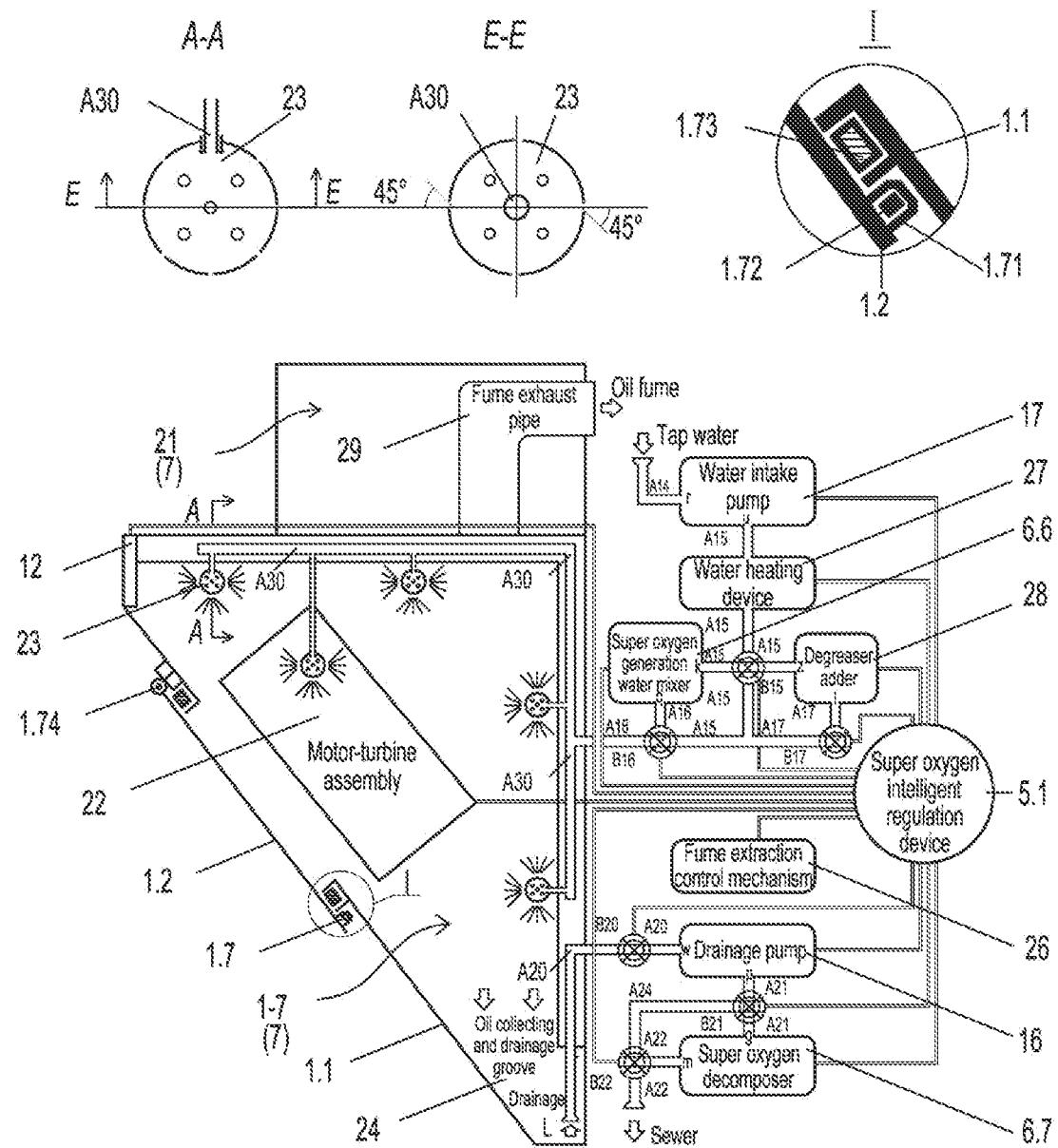
FIG. 8 is a schematic diagram of technical principle of an intelligent super-oxygenated water washing range hood, a side view and a bottom cross-sectional view of an automatic rotary spraying ball, and an enlarged view of a sealing waterproof mechanism in accordance with an embodiment of the present disclosure.
Figure 9:
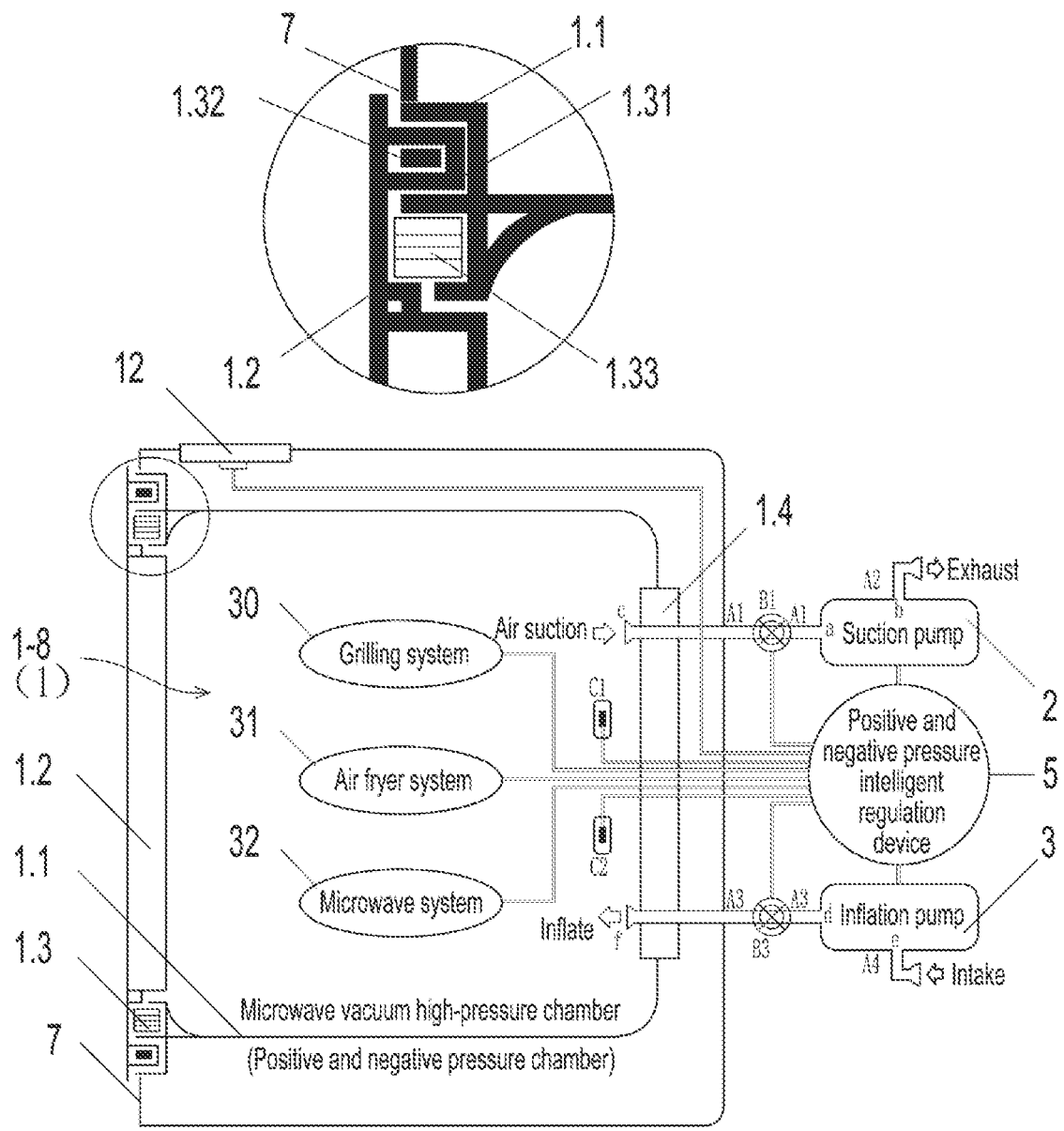
FIG. 9 is a schematic diagram of the technical principle of an intelligent positive and negative pressure oven/air fryer/microwave oven and an enlarged view of a mechanical airtight mechanism in accordance with an embodiment of the present disclosure.
Figure 10:
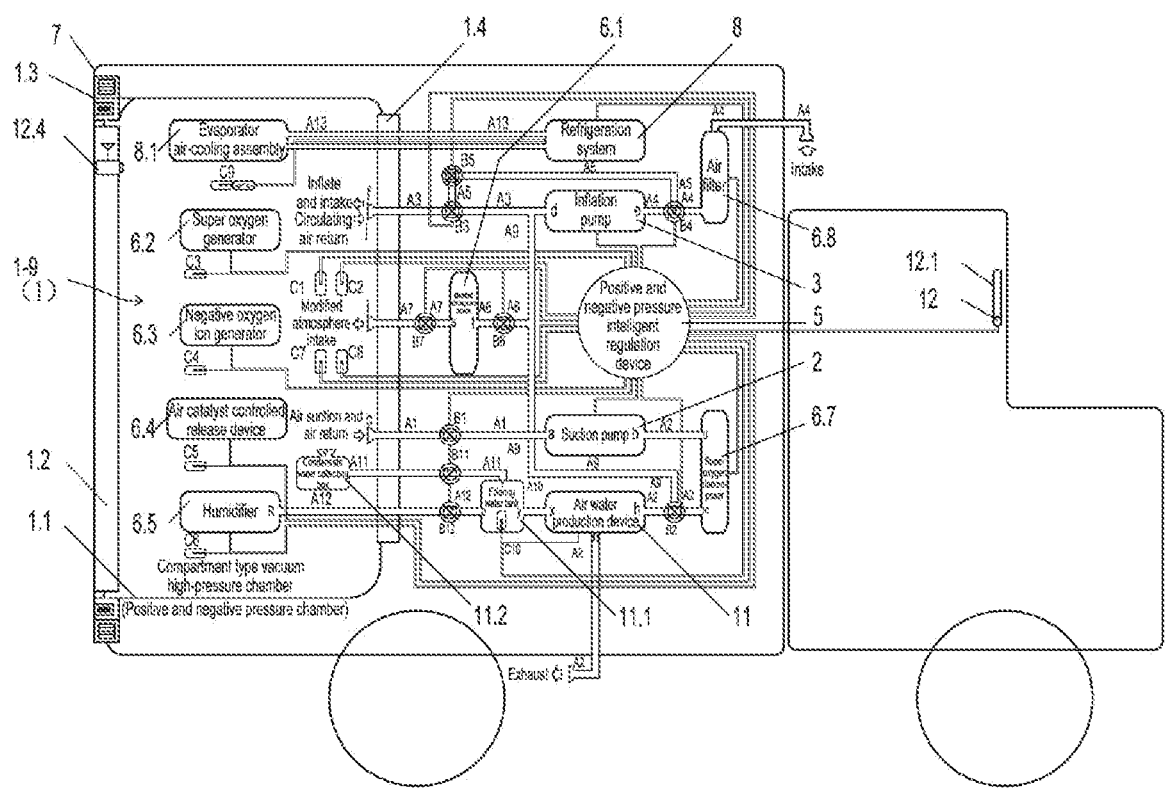
FIG. 10 is a schematic diagram of the technical principle of an intelligent positive and negative pressure fresh-keeping compartment in accordance with an embodiment of the present disclosure.
Figure 11:
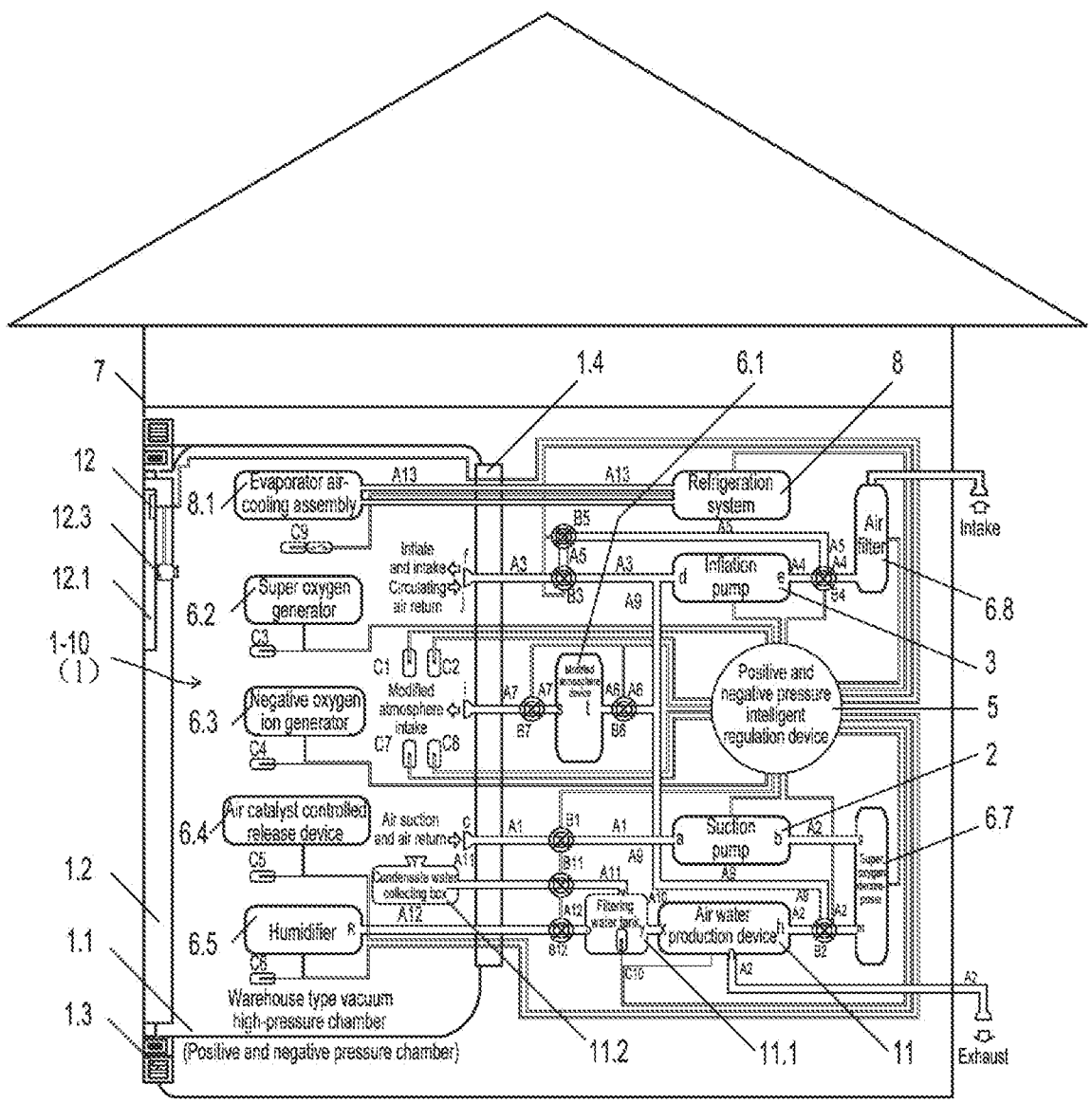
FIG. 11 is a schematic diagram of the technical principle of an intelligent positive and negative pressure fresh-keeping warehouse in accordance with an embodiment of the present disclosure.
Figure 12:
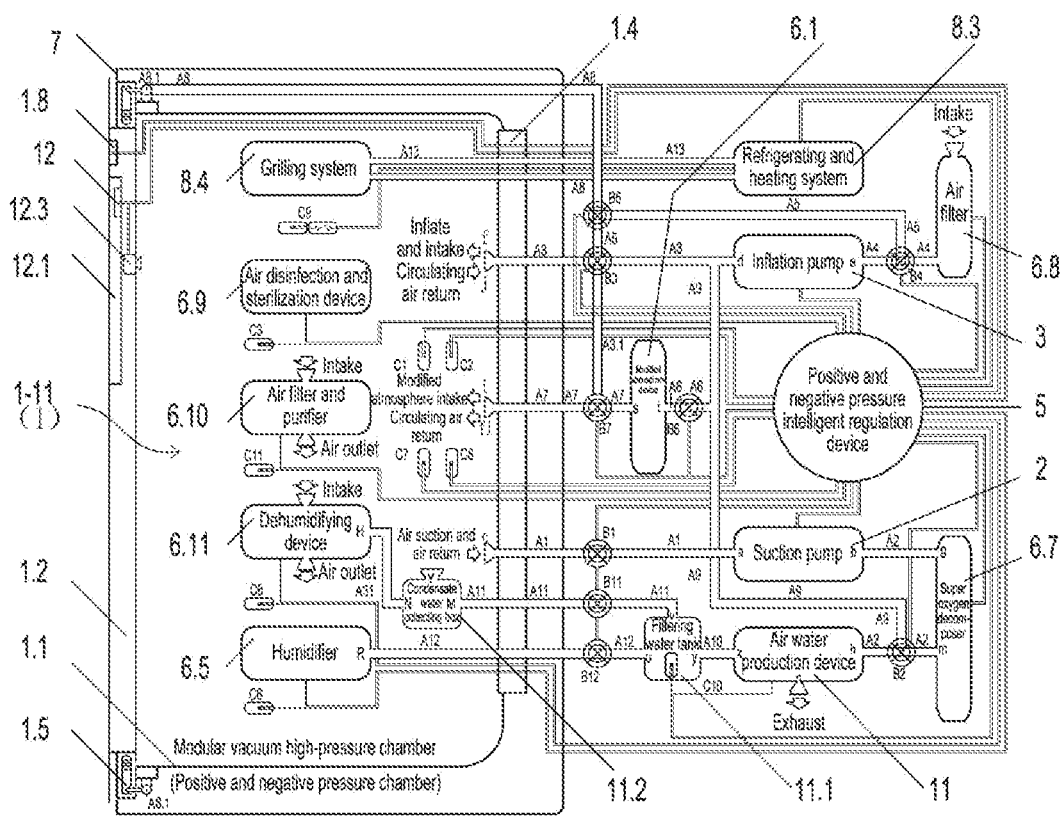
FIG. 12 is a schematic diagram of the technical principle of an intelligent positive and negative pressure modular cabinet in accordance with an embodiment of the present disclosure.

In the drawings: A1-A29—pipeline; B1-B23—solenoid valve; C1-C10—sensor (C1—pressure sensor, C2—negative pressure sensor, C3—super oxygen sensor, C4—negative oxygen ion sensor, C5—chlorine dioxide sensor, C6—humidity sensor C7—oxygen sensor, C8—a nitrogen sensor, C9—temperature sensor, C10—water level sensor, C11—air particulate matter sensor); 1—positive and negative pressure chamber (1.1—chamber body, 1.11—chamber airtight groove, 1.12—chamber body reinforcing part, 1.2—chamber door, 1.21—chamber door airtight groove, 1.3—mechanical airtight mechanism, 1.31—lock ring, 1.32—lock bolt, 1.33—airtight gasket, 1.34—border sealing gasket, 1.4—internal and external communicating sealer, 1.5—pneumatic airtight mechanism, 1.51—airtight sealing lock bolt, 1.52—sealing lock bolt telescopic airbag, 1.53—inflation socket, 1.54—inflation plug, 1.6—electric airtight mechanism, 1.61—electric sealing lock bolt, 1.62—electromagnet, 1.63—tension spring, 1.7—sealing waterproof mechanism, 1.71—lock ring, 1.72—lock bolt, 1.73—sealing gasket, 1.74—chamber door hinge, 1.8—pneumatic chamber door switch, 1.9—electric chamber door switch) (1-1—vacuum high-pressure refrigerating chamber, 1-2—vacuum high-pressure freezing chamber, 1-3—ultra-high-pressure deep-freezing chamber, 1-4—ultra-high-pressure thawing chamber, 1—5—vacuum high-pressure drum outer chamber, 1-6—vacuum super oxygen chamber, 1-7—sealing waterproof super oxygen chamber, 1-8—microwave vacuum high-pressure chamber, 1-9—compartment (container) type vacuum high-pressure chamber, 1-10—warehouse type vacuum high-pressure chamber, 1-11—modular vacuum high-pressure chamber 1-11), 2—suction pump (2.1—anti-shower air suction port 2.1), 3—inflation pump, 5—positive and negative pressure intelligent regulation device (5.1—super oxygen intelligent regulation device), positive and negative pressure airflow load generation processor (6.1—modified atmosphere device, 6.2—super oxygen generator, 6.3—negative oxygen ion generator, 6.4—air catalyst controlled release device, 6.5—humidifier, 6.6—super oxygen generation water mixer, 6.7—super oxygen decomposer, 6.8—air filter, 6.9—air disinfection and sterilization device, 6.10—air filter and purifier, 6.11—dehumidifying device); 7—refrigerator (machine) body, 8—refrigeration system (8.1—evaporator air-cooling assembly, 8.2—evaporator direct-cooling assembly, 8.3—refrigerating and heating system, 8.4—heat exchanger), 9—general refrigerator compartment, 10—general freezer compartment, 11—air water production device (11.1—filtering water tank, 11.2—condensate water collecting box), 12—touch screen and mobile phone monitoring system 12 (12.1—refrigerator door touch screen, 12.2—mobile phone APP, 12.3—high-definition anti-fog camera device, 12.4—wireless anti-fog camera device); 15—dehydrating and drying system (15.1—drum mechanism, 15.2—washing-dehydrating-drying control mechanism, 15.3—drum sealing bearing block, 15.4—big belt pulley, 15.5—motor assembly); 16—drainage pump; 17—water water intake pump; 18—detergent pull box; 19—dish washing-drying system; 20—fruit and vegetable cleaning system; 21—equipment fume tube chamber; 22—motor turbine assembly; 23—automatic rotary spraying ball; 24—oil collecting and drainage groove; 26—fume extraction control mechanism; 27—water heating device;

28—oil removing agent adder; 29—fume exhaust pipe; 30—grilling system; 31—air fryer system; 32—microwave system.

DETAILED DESCRIPTION OF THE EMBODIMENTS

The following is a detailed description of embodiments of the present disclosure, and technical solutions of the embodiments of the present disclosure are further described, but the embodiments of the present invention are not limited to these embodiments and descriptions.

In a first specific embodiment, an intelligent positive and negative pressure system is provided. The system comprises a positive and negative pressure chamber 1 (which is also called a vacuum high-pressure chamber), a suction pump 2, an inflation pump 3, a positive and negative pressure intelligent regulation device 5, and positive and negative pressure airflow load generation processors. The positive and negative pressure chamber 1 comprises a chamber body 1.1, a chamber door 1.2, an airtight mechanism 1.3, and an internal and external communicating sealer 1.4. The airtight mechanism 1.3 is arranged between the chamber body 1.1 and the chamber door 1.2; the internal and external communicating sealer 1.4 is fixedly arranged at the rear part of the positive and negative pressure chamber 1, and all pipelines and circuits getting in and out the chamber are connected to and pass through the internal and external communicating sealer 1.4 so as to keep the sealing property of the positive and negative pressure chamber 1. The positive and negative pressure chamber 1 is externally provided with the suction pump 2, the inflation pump 3, the positive and negative pressure intelligent regulation device 5, and a modified atmosphere device 6.1 which is one of the positive and negative pressure airflow load generation processors. An air suction pipeline A1 is installed at an air inlet a of the suction pump 2, a solenoid valve B1 is installed at the middle part of the air suction pipeline A1, and the other end of the air suction pipeline A1 extends into the positive and negative pressure chamber 1 to form an air suction and air return port c. An exhaust pipeline A2 is installed at an air outlet b of the suction pump 2, the other end of the exhaust pipeline A2 is open to the atmosphere. An inflation pipeline A3 is installed at an air outlet d of the inflation pump 3, a solenoid valve B3 is installed at the middle part of the inflation pipeline A3, the other end of the inflation pipeline A3 extends into the positive and negative pressure chamber 1 to form an inflatable air inlet f thereof. An air intake pipeline A4 is installed at an air inlet e of the inflation pump 3, a solenoid valve B4 is installed at the middle part of the air intake pipeline A4, and the other end of the air intake pipeline A4 is open to the atmosphere. A circulating pipeline A5 is further connected to the solenoid valve B4, a solenoid valve B5 is installed at the middle part of the circulating pipeline A5, and the other end of the circulating pipeline A5 is connected to the solenoid valve B3, and extends into the positive and negative pressure chamber 1 through the inflation pipeline A3 to form a circulating air return port j of the positive and negative chamber. A modified atmosphere air intake pipeline A6 is installed at an air inlet t of the modified atmosphere device 6.1, a solenoid valve B6 is installed at the middle part of the modified atmosphere air intake pipeline A6, the other end of the modified atmosphere air intake pipeline A6 is connected to the inflation pipeline A3 and then communicates with an air outlet d of the inflation pump 3. A modified atmosphere air outlet pipeline A7 is installed at an air outlet s of the modified atmosphere device 6.1, a solenoid valve B7 is installed at the middle part of the modified atmosphere air outlet pipeline A7, the other end of the modified atmosphere air outlet pipeline A7 extends into the positive and negative pressure chamber 1 to form a modified atmosphere air inlet i thereof, and when the modified atmosphere gas entering the positive and negative pressure chamber 1 needs to be circulated, the inflatable air inlet f is used as the circulating air return port j of the positive and negative pressure chamber 1. The positive and negative pressure chamber 1 is internally provided with the positive and negative pressure airflow load generation processors, comprising a super oxygen (ozone) generator 6.2, a negative ion generator 6.3, an air catalyst controlled release device 6.4, and a humidifier 6.5; the positive and negative pressure chamber 1 is internally provided with sensors, comprising a pressure sensor C1, a negative pressure sensor C2, a super oxygen sensor C3, a negative oxygen ion sensor C4, a chlorine dioxide sensor C5, a humidity sensor C6, an oxygen sensor C7, and a nitrogen sensor C8; the suction pump 2, the inflation pump 3, the modified atmosphere device 6.1, the super oxygen generator 6.2, the negative ion generator 6.3, the air catalyst controlled release device 6.4, the humidifier 6.5, the sensors C1 to C8 and the solenoid valves B1 to B7 are all connected to the positive and negative pressure intelligent regulation device 5.

In a second specific embodiment, an operation method for the intelligent positive and negative pressure system is provided. The technical principle and a basic operation method for the intelligent positive and negative pressure system are as follows: intelligently regulating air flow with positive and negative pressure, or carrying multiple effective loads such as super oxygen, an air catalyst, a negative ion, modified atmosphere gas and water for orderly getting in and out of or staying in a specific space (the positive and negative pressure chamber), and exerting the required effects on objects therein; the specific operation method for the intelligent positive and negative pressure system is that the positive and negative pressure intelligent regulation device 5, after calculation processing, sends specific on/off instructions to the suction pump 2, the inflation pump 3, the positive and negative pressure airflow load generation processors and solenoid valves in real time according to built-in procedures and prestored data and real-time feedback information of various sensors C1 to C8, such that the open, close and switching of various air suction pipelines, inflation pipelines and circulating pipelines are controlled and adjusted to intelligently regulate the level of positive and negative pressure in the positive and negative pressure chamber 1 and the flowing in, staying and flowing out of the airflow and loads thereof; the specific operation method is as follows: (1) an operation method for regulating the interior of the positive and negative pressure chamber 1 into negative pressure (vacuum) is as follows: sending an instruction by the positive and negative pressure intelligent regulation device 5 to enable the solenoid valve B1 to open the air suction pipelines A1 and A2 (air suction and air return port c of the positive and negative pressure chamber→air suction pipeline A1→the solenoid valve B1→A1→air inlet a of the suction pump→air outlet b of the suction pump→A2→exhaust to atmosphere) (when any pipeline is opened, other irrelevant solenoid valves are all closed, the following is the same and will not be described again), turning on the suction pump 2 to vacuumize the interior of the positive and negative pressure chamber 1 to a set negative pressure (vacuum); (2) an operation method for regulating the interior of the positive and negative pressure chamber 1 to a positive pressure (high pressure) is as follows: sending an instruction by the positive and negative pressure intelligent regulation device 5 to enable the solenoid valves B3 and B4 to open the inflation pipelines A3 and A4 (intake from atmosphere→A4→B4→A4→air inlet e of the inflation pump→air outlet d of the inflation pump→A3→B3→A3→inflatable air inlet of the positive and negative pressure chamber), and turning on the inflation pump 3 to inflate the interior of the positive and negative pressure chamber 1 to the set positive pressure (high pressure); (3) an operation method for regulating airflow and loads thereof to flow in, stay in or flow out of the positive and negative pressure chamber 1 is as follows: ① outflow, pumping the airflow and loads thereof out of the positive and negative pressure chamber 1 through the air suction pipelines by using the suction pump according to the above specific method (1); ② inflow, inflating the airflow and loads thereof into the positive and negative pressure chamber through the inflation pipelines by using the inflation pump according to the above specific method (2); ③ staying, when the positive and negative pressure airflow and loads thereof need to stay in the positive and negative pressure chamber, sending an instruction by the positive and negative pressure intelligent regulation device 5 to turn on the suction pump 2 and open the air suction pipelines, or turn on the inflation pump 3 and open the inflation pipelines, or turn on the positive and negative pressure airflow load generation processors in the positive and negative pressure chamber and close other irrelevant solenoid valves until the positive and negative pressure in the chamber or the number and staying time of airflow loads in the chamber reach the standards; ④ circulating: when the airflow or loads thereof such as modified atmosphere gas needs to circulate through the positive and negative pressure chamber 1 and the modified atmosphere device 6.1 to enable the gas concentration in the positive and negative pressure chamber to reach the concentration, sending an instruction by the positive and negative pressure intelligent regulation device 5 to enable the solenoid valves B6 and B7 to open modified atmosphere inflation pipelines A6 and A7 (air outlet d of the inflation pump→A3→A6→B6→A6→air inlet t of the modified atmosphere device→air outlet s→A7→B7→A7→modified atmosphere air inlet i of the positive and negative pressure chamber), and enabling the solenoid valves B3, B4 and B5 to open the modified atmosphere circulating pipelines A3, A5 and A4 (circulating air return port j of the positive and negative pressure chamber→A3→B3→A5→B5→A5→B4→A4→air inlet e of the inflation pump), and turning on the inflation pump 3 to enable the modified atmosphere gas to circulate until the concentration of the modified atmosphere gas, the atmospheric pressure and staying time in the positive and negative pressure chamber reach the stander; by using the methods, multiple technologies such as vacuum, high pressure, super oxygen, catalysts, modified atmosphere freshkeeping, negative ions, humidification and dehumidification, disinfection, air purification, air water production, and low-temperature storage are intelligently regulated and integrated by the intelligent positive and negative pressure system, and are combined and applied, or individually applied to, electrical equipment, transportation compartments and containers, storage warehouses, and the like; and due to the arrangement and use of the intelligent positive and negative pressure system, the electrical equipment, transportation compartments and containers, and storage warehouses are uniformly referred to as: intelligent positive and negative pressure electrical appliances; and the intelligent positive and negative pressure electrical appliances in the embodiment of the present disclosure comprise an intelligent positive and negative pressure refrigerator, an intelligent positive and negative pressure washing machine, an intelligent vacuum dishwasher/fruit and vegetable cleaning machine, an intelligent super-oxygenated water washing range hood, an intelligent positive and negative pressure oven/fryer/microwave oven, an intelligent positive and negative pressure fresh-keeping compartment, an intelligent positive and negative pressure fresh-keeping warehouse, and an intelligent a positive and negative pressure modular cabinet.

In a third specific embodiment, an intelligent positive and negative pressure refrigerator is provided. The refrigerator comprises a refrigerator body 7. The refrigerator body 7 is internally provided with an intelligent positive and negative pressure system, a refrigeration system 8, a general refrigerator compartment 9, a general freezer compartment 10, an air water production device 11, and a touch screen and mobile phone monitoring system 12. The intelligent positive and negative pressure system comprises a positive and negative pressure chamber 1, a suction pump 2, an inflation pump 3, a positive and negative pressure intelligent regulation device 5, and positive and negative pressure airflow load generation processors. The positive and negative pressure chamber 1 comprises a chamber body 1.1, a chamber door 1.2, an internal and external communicating sealer 1.4, a pneumatic airtight mechanism 1.5, an electric airtight mechanism 1.6, a pneumatic chamber door switch 1.8, and an electric chamber door switch 1.9. The chamber door 1.2 is a refrigerator door of the positive and negative pressure refrigerator. The positive and negative pressure chamber 1 is designed into a vacuum high pressure refrigerating chamber 1-1 and a vacuum high pressure freezing chamber 1-2 according to particular refrigerating and freezing requirements of the refrigerator. The pneumatic airtight mechanism 1.5 is arranged between the chamber door 1.2 and the chamber body 1.1 of the vacuum high pressure refrigerating chamber 1-1. The pneumatic airtight mechanism 1.5 comprises pneumatic sealing lock bolts 1.51 and sealing lock bolt telescopic airbags 1.52 which are integrally manufactured at the rear parts of the sealing lock bolts 1.51, the number of the sealing lock bolts 1.51 and the sealing lock bolt telescopic airbags 1.52 which are of an integrated structure is four, and the integrated structures are all in the shape of long strips and respectively installed in four chamber airtight grooves 1.11 arranged in four borders of the door frame of the chamber body 1.1, the outer layer of the section of the lock bolt is sealing rubber, and the inside of the lock bolt is a bend-resistant metal core. The sealing lock bolt foldable telescopic airbag 1.52 is a foldable rubber airbag which can be inflated to elongate; an inflation socket 1.53 is arranged at the rear part of each airbag, and an inflation plug 1.54 is plugged into the inflation socket 1.53; and four inflation plugs 1.54 are respectively installed at respective midpoints of four side pipelines connected to the four edges of a square annular airtight mechanism inflatable branch pipeline A8.1. The pipeline at the bottom side of the square annular airtight mechanism inflatable branch pipeline A8.1 is perpendicularly connected to an airtight mechanism inflation pipeline A8 and communicates with an air outlet d of the inflation pump 3 by a solenoid valve B8 and a pipeline A3 as well as a solenoid valve B3. When closed, the chamber door 1.2 makes contact with the pneumatic chamber door switch 1.8, and the inflation pump 3 is immediately started to inflate and elongate the sealing lock bolt foldable telescopic airbag 1.52 and push the sealing lock bolt 1.51 to extend outwards from the chamber airtight groove 1.11 and extend into the chamber door airtight groove 1.21 arranged at the opposite position, thereby locking and sealing the chamber door. When a user opens the chamber door, the sealing lock bolt foldable telescopic airbag 1.52 is deflated by the pneumatic chamber door switch 1.8, such that the sealing lock bolt 1.51 retracts to open the chamber door. The electric airtight mechanism 1.6 is arranged between a chamber door 1.2 and a chamber body 1.1 of the vacuum high pressure freezing chamber 1-2. The electric airtight mechanism 1.6 comprises electric sealing lock bolts 1.61, electromagnets 1.62, and tension springs 1.63; a total of four sealing lock bolts 1.61 is provided, the sealing lock bolts are all in the shape of long strips and movably installed in four chamber airtight grooves 1.11 arranged in the periphery of the door frame of the chamber body and hung onto the tension springs 1.63, respectively, and the other ends of the tension springs are fixedly hung at the bottom in the chamber airtight grooves 1.11; the outer layer of the section of the bolt body of each of the sealing lock bolts 1.61 is a sealing rubber layer, and the inside of the bolt body is a bend-resistant and magnetic-attractive metal core. The sealing rubber layer, facing the electromagnet 1.62, on one side of the sealing lock bolt is open to partially expose the inner metal core so as to be attracted by the electromagnet 1.62. The electromagnet 1.62 is also in the shape of long strip corresponding to the shape of the sealing lock bolt 1.61 and is fixedly installed in the groove bottom of the chamber door airtight groove 1.21 corresponding to the chamber airtight groove 1.11. When the sealing is required after the door is closed, the electromagnet 1.62 is powered by the electric chamber door switch 1.9 to generate magnetic force to attract the sealing lock bolt 1.61 installed in the opposite chamber airtight groove 1.11 into the chamber door airtight groove 1.21. During door opening, the electromagnet 1.62 is powered off by the electric chamber door switch 1.9, the magnetic force disappears, the sealing lock bolt 1.61 is pulled back into the chamber airtight groove 1.11 by the tension spring 1.63 so as to open the chamber door. The internal and external communicating sealer 1.4 is fixedly arranged at the rear part of the positive and negative pressure chamber 1, all pipelines and circuits getting in and out the chamber are connected to and pass through the internal and external communicating sealer 1.4 so as to keep the sealing property of the positive and negative pressure chamber 1. The positive and negative pressure chamber 1 is externally provided with the suction pump 2, the inflation pump 3, the positive and negative pressure intelligent regulation device 5, a modified atmosphere device 6.1, a super oxygen decomposer 6.7, an air filter 6.8, a refrigeration system 8, an air water production device 11, a filtering water tank 11.1, and the touch screen and mobile phone monitoring system 12. An air suction pipeline A1 is installed at an air inlet a of the suction pump 2, air suction branch pipelines A1.1 and A1.2 are respectively connected to the air suction pipeline A1, solenoid valves B1.1 and B1.2 are respectively installed at the respective middle parts of the air suction branch pipelines A1.1 and A1.2, and the other ends of the air suction branch pipelines A1.1 and A1.2 respectively extend into the vacuum high pressure refrigerating chamber 1-1 and the vacuum high pressure freezing chamber 1-2 to form air suction and air return ports c1 and c2 thereof. An exhaust pipeline A2 is installed at an air outlet b of the suction pump 2, the super oxygen decomposer 6.7 and a solenoid valve B2 are installed at the middle part of the exhaust pipeline A2, the other end of the exhaust pipeline A2 communicates with an air inlet h of the air water production device 11, passes through the air water production device 11 and then is open to the atmosphere through an air outlet n of the air water production device 11. An inflation pipeline A3 is installed at an air outlet d of the inflation pump 3, a solenoid valve B3 is installed at the middle part of the inflation pipeline A3, inflation branch pipelines A3.1, A3.2, A3.3 and A3.4 are respectively connected to the other end of the inflation pipeline A3, solenoid valves B3.1, B3.2, B3.3 and B3.4 are installed at the respective middle parts of the inflation branch pipelines A3.1, A3.2, A3.3 and A3.4, respectively, and the other ends of inflation branch pipelines A3.1, A3.2, A3.3 and A3.4 respectively extend into the vacuum high pressure refrigerating chamber 1-1 and the vacuum high pressure freezing chamber 1-2. An inflatable air inlet f1 of the vacuum high pressure refrigerating chamber 1-1 is formed in the port of the other end of the A3.1, an inflatable air inlet f2 of the vacuum high pressure freezing chamber 1-2 is formed in the port of the other end of the A3.2, the other end of the A3.3 is connected to an air inlet G of an ultra-high pressure thawing chamber 1-3, and the other end of the A3.4 is connected to an air inlet Q of an ultra-high pressure deep-freezing chamber 1-4. An air intake pipeline A4 is installed at an air inlet e of the inflation pump 3, the air filter 6.8 and a solenoid valve B4 are installed at the middle part of the air intake pipeline A4, and the other end of the air intake pipeline A4 is open to atmosphere. A circulating pipeline A5 is further connected to the solenoid valve B4, circulating branch pipelines A5.1 and A5.2 are connected to the circulating pipeline A5, solenoid valves B5.1 and B5.2 are installed at the respective middle parts of the circulating branch pipelines A5.1 and A5.2, and the other ends of the circulating branch pipelines A5.1 and A5.2 respectively extend into the vacuum high pressure refrigerating chamber 1-1 and the vacuum high pressure freezing chamber 1-2 to form circulating air return ports j1 and j2 thereof. An air water production inflation pipeline A9 is further connected to the circulating pipeline A5, and the air water production inflation pipeline A9 is connected to the solenoid valve B2 to communicate with an air inlet h of the air water production device 11 through the exhaust pipeline A2. The air water production inflation pipeline A9 is connected to the circulating pipeline A5 and communicates with the solenoid valve B3, and then communicates with the air outlet d of the inflation pump 3 through the inflation pipeline A3. A modified atmosphere air intake pipeline A6 is installed at an air inlet t of the modified atmosphere device 6.1, a solenoid valve B6 is installed the middle part of the modified atmosphere air intake pipeline A6, and the other end of the modified atmosphere air intake pipeline is connected to the inflation pipeline A3 and then communicates with the air outlet d of the inflation pump 3 by the solenoid valve B3. Modified atmosphere air outlet pipelines A7.1 and A7.2 are respectively installed at air outlets s1 and s2 of the modified atmosphere device 6.1, solenoid valves B7.1 and B7.2 are respectively installed at the middle parts of the modified atmosphere air outlet pipelines A7.1 and A7.2, the other ends of the modified atmosphere air outlet pipelines A7.1 and A7.2 respectively extend into the vacuum high pressure refrigerating chamber 1-1 and the vacuum high pressure freezing chamber 1-2 to form respective modified atmosphere air inlets i1 and i2 thereof. The inflation pipeline A3 is further connected to an airtight mechanism inflation pipeline A8, a solenoid valve B8 is installed at the middle part of the airtight mechanism inflation pipeline A8, and the other end of the airtight mechanism inflation pipeline A8 is perpendicularly connected to the pipeline at the bottom side of the square annular airtight mechanism inflation branch pipeline A8.1. Four side pipelines of the square annular airtight mechanism inflation branch pipeline A8.1 communicate with one another, inflation plugs 1.54 are installed at respective middle parts of the four side pipelines, and the four inflation plugs 1.54 are all plugged into the inflation sockets 1.53. An air water production pipeline A10 is installed at a water outlet x of the air water production device 11, and the air water production pipeline A10 communicates with a water inlet y of the filtering water tank 11.1. Condensate water generated in the vacuum high pressure refrigerating chamber 1-1 flows into a water inlet Y of a condensate water collecting box installed at the bottom in the vacuum high pressure refrigerating chamber, a condensate water pipeline A11 is installed at a water outlet M of the condensate water collecting box 11.2, after the condensate water pipeline A11 extends out of the vacuum high pressure refrigerating chamber 1-1, a solenoid valve B11 is installed at the middle part of the condensate water pipeline A11, the other end of condensate water pipeline A11 communicates with a water inlet v of the filtering water tank 11.1. A humidification water pipeline A12 is installed at a water outlet o of the filtering water tank 11.1, a solenoid valve B12 is installed at the middle part of the humidification water pipeline A12, and the other end of the humidification water pipeline A12 extends into the vacuum high pressure refrigerating chamber 1-1 and communicates with a water inlet R of the humidifier 6.5. A refrigerating circulating pipeline A13 is installed on the refrigeration system 8, and respectively extends into the vacuum high pressure refrigerating chamber 1-1, the vacuum high pressure freezing chamber 1-2, the general refrigerator compartment 9 and the general freezer compartment 10 to communicate with an evaporator air-cooling assembly 8.1 and an evaporator direct-cooling assembly 8.2 respectively installed therein; the touch screen and mobile phone monitoring system 12 comprises a refrigerator door touch screen 12.1, a mobile phone APP 12.2, and a high-definition anti-fog camera device 12.3; the high-definition anti-fog camera device 12.3 is installed at the position needing to be monitored inside and outside the refrigerator body 7. The positive and negative pressure chamber 1 is internally provided with positive and negative pressure airflow load generation processors and sensors, comprising: a super oxygen generator 6.2, a negative ion generator 6.3, an air catalyst controlled release device 6.4, a humidifier 6.5, a condensate water collecting box 11.2, a pressure sensor C1, a negative pressure sensor C2, a super oxygen sensor C3, a negative oxygen ion sensor C4, a chlorine dioxide sensor C5, a humidity sensor C6, an oxygen sensor C7, a nitrogen sensor C8 and a temperature sensor C9 which are arranged in the vacuum high pressure refrigerating chamber 1-1; and an air catalyst controlled release device 6.4, a pressure sensor C1, a negative pressure sensor C2, a chlorine dioxide sensor C5, an oxygen sensor C7, a nitrogen sensor C8 and a temperature sensor C9 which are arranged in the vacuum high pressure freezing chamber 1-2. All airflow load generation processors, sensors, solenoid valves and devices installed inside and outside the positive and negative pressure chamber 1 comprise the suction pump 2, the inflation pump 3, the modified atmosphere device 6.1, the super oxygen generator 6.2, the negative ion generator 6.3, the air catalyst controlled release device 6.4, the humidifier 6.5, the super oxygen decomposer 6.7, the refrigeration system 8, an air water production device 11, the filtering water tank 11,1 the ultra-high-pressure unfreezing chamber 1-3, the ultra-high-pressure deep-freezing chamber 1-4, the touch screen and mobile phone monitoring system 12, the refrigerator door touch screen 12.1 the high-definition anti-fog camera device 12.3 the pressure sensor C1, the negative pressure sensor C2, the super oxygen sensor C3, the negative oxygen ion sensor C4, the chlorine dioxide sensor C5, the humidity sensor C6, the oxygen sensor C7, an nitrogen sensor C8, the temperature sensing controller C9, the water level sensor controller C10, and the solenoid valves B1 to B12 which are all connected to the positive and negative pressure intelligent regulation device 5.

In a fourth specific embodiment, an operation method for the intelligent positive and negative pressure refrigerator is provided. The method comprises: (1) vacuum abatement heat-removal cleaning procedure: closing the vacuum high pressure refrigerating chamber door 1.2 of the positive and negative pressure refrigerator to touch the chamber door switch 1.8, sending an instruction by the positive and negative pressure intelligent regulation device 5 to enable the solenoid valves B3 and B8 to open the airtight mechanism inflation pipelines A8, A8 and A8.1 (air outlet d of inflation pump→A3→B3→A3→A8→B8→A8→A8.1→inflation plug 1.54→inflation socket 1.53→sealing lock bolt telescopic airbag 1.52), and turning on the inflation pump 3 to inflate the pneumatic airtight mechanism 1.5 so as to lock the chamber door 1.2; and meanwhile, enabling the solenoid valves B1.1 and B2 to open the air suction pipelines A1, A1.1 and A2 (air suction and air return port c1 of the vacuum high pressure refrigerating chamber 1-1→A1.1→B1.1→A1.1→A1→air inlet a of suction pump→air outlet b→A2→air inlet g of super oxygen decomposer→air outlet m→A2→B2→A2→air inlet h of air water production device→air outlet n→A2→exhaust to atmosphere), and turning on the suction pump 2 to pump the vacuum high pressure refrigerating chamber 1-1 to a moderate vacuum (−0.01 KPa to −0.1 MPa) (taking the local instant atmospheric pressure as the zero standard, which is the same in the text, and improving the vacuum degree according to the specific demands and refrigerator configuration), pumping away the self-contained heat of fruits, vegetables, meat and fish, part of bacteria and microorganisms and polluted air in the chamber, vacuumizing to make volatile metabolites ethylene acetaldehyde ethanol and other harmful gases in the fruit and vegetable tissues to escape and be pumped away, while inhibiting the reproduction of residual bacteria with the negative pressure to reduce the potential risks of disease aging of fruits and vegetables; (2) depressurized and humidified storage procedure: according to the pressure standard of the preset procedure and the real-time feedback of the negative pressure sensor C2, turning the suction pump 2 on or off by the positive and negative pressure intelligent regulation device 5 to a maintain an appropriate negative-pressure, low-oxygen and low-temperature environment within the vacuum high pressure refrigerating chamber 1-1, thus reducing respiration intensity of fruits and vegetables, inhibiting the biosynthesis of ethylene, delaying decomposition of chlorophyll, inhibiting the synthesis of carotenoids and lycopene, and slowing down the processes such as hydrolysis of starch, increase of sugar and consumption of acid to delay mature senescence of the fruits and vegetables, and meanwhile, turning on the humidifier 6.5 to increase humidity in the chamber and prevent the water contained in the fruits and vegetables from escaping, thus maintaining the fresh state of the fruits and vegetables for a longer time; (3) super-oxygen pressurized sterilization and degradation procedure: according to the procedure setting and feedback of the sensors C3, C4 and C6, sending, by the positive and negative pressure intelligent regulation device 5, an instruction at a proper time to turn on the super oxygen generator 6.2, the negative oxygen ion generator 6.3 and the humidifier 6.5, thus enabling the super oxygen, humidity and negative oxygen ions in the vacuum high pressure refrigerating chamber 1-1 to reach the required standards; meanwhile, enabling the solenoid valves B3, B3.1 and B4 to open the inflation pipelines A3, A3.1 and A4 (intake from atmosphere→A4→B4→A4→air filter→A4→air inlet e of inflation pump→air outlet d→A3→B3→A3→A3.1→B3.1→A3.1→inflatable air inlet f1 of vacuum high pressure refrigerating chamber 1-1), and turning on the inflation pump 3 to properly pressurize the vacuum high pressure refrigerating chamber 1-1 to 0.01 KPa to 10 MPa (taking the local instant atmospheric pressure as the zero standard, and improving the pressure value according to the specific demands and refrigerator configuration), wherein the super oxygen at the appropriate positive pressure is able to perform sterilization, disinfection and mildew resistance on the fruits, vegetables, meat and fish in the vacuum high pressure refrigerating chamber 1-1 and degrade pesticide residues and ethylene and other gases exhaled by the metabolism of the fruits and vegetables, thus affecting enzyme activity in the fruits and vegetables, preventing the fruits and vegetables from browning and softening, and delaying the aging of the fruits and vegetables; and the appropriate high pressure further prevents the water contained in the fruits, vegetables, meat and fish from escaping, moreover, the moisture at the positive pressure is easier to permeate into the fruits, vegetables, meat and fish to supplement the water loss thereof caused by refrigeration and negative pressure, while the negative oxygen ions make the water cluster of moisture smaller so as to be absorbed by the fruits, vegetables, meat and fish easier and have the functions of inhibiting biological tissue metabolism, reducing respiration intensity, slowing down enzyme activity, and sterilizing and purifying to a certain extent; the super oxygen at the positive pressure is able to permeate into the deeper interior of the fruits, vegetables, meat and fish to play a better role in sterilization and disinfection (the super oxygen is automatically decomposed and reduced into oxygen in air and water for about 30 minutes, but is very stable in ice and has a very long half-life, so the vacuum high pressure freezing chamber 1-2 is not equipped with a super oxygen generator and does not use super oxygen); (4) modified atmosphere pressurized storage procedure: opening the air suction pipeline and turning on the suction pump 2 and the super oxygen decomposer 6.7 at a proper time by the positive and negative pressure intelligent regulation device 5 according to the procedure setting or the feedback of the sensors, pumping the decomposed, sterilized, disinfected and degraded polluted air out of the chamber, and then enabling the solenoid valves B3, B6 and B7.1 to open the modified atmosphere inflation pipelines A3, A6 and A7.1 (air outlet d of inflation pump→A3→B3→A3→A6→B6→A6→air inlet t of modified atmosphere device→air outlet s1→A7.1→B7.1→A7.1→modified atmosphere air inlet i1 of vacuum high pressure refrigerating chamber 1-1), and turning on the inflation pump 3 to drive the airflow to pass through a hollow fiber membrane of the modified atmosphere device 6.1 to separate the oxygen out, and enabling high-nitrogen low-oxygen gas to enter the vacuum high pressure refrigerating chamber 1-1; meanwhile, enabling the solenoid valves B5.1, B3 and B4 to open the modified atmosphere circulating pipelines (circulating air return port j1 of vacuum high pressure refrigerating chamber 1-1→A5.1→B5.1→A5.1→A5→B3→A5→B4→A4→air filter→A4→air inlet e of inflation pump→air outlet d of inflation pump); turning on the humidifier 6.5 until the modified atmosphere gas concentration, air humidify and positive atmospheric pressure in the chamber all reach the modified atmosphere pressurized storage standards; forming a nitrogen-rich and oxygen-poor environment with an appropriate proportion in the vacuum high-pressure chamber and maintaining the appropriate positive pressure and appropriate humidity to effectively control the respiration rate of the stored fruits and vegetables, thus preventing anaerobic respiration and carbon dioxide poisoning, slowing down the aging process, preventing the quality decrease and flavor loss of the stored fruits and vegetables, and maintaining the moisture and supplementing the water of the fruits and vegetables with the positive pressure so as to maintain the freshness of the fruits and vegetables to the maximum extent; (5) leftover food pressurized preservation procedure: placing the leftovers into the vacuum high pressure refrigerating chamber 1-1, turning on the suction pump 2 and the air suction pipelines by the regulation device 5 until the odor already released by the leftovers and the polluted air inside the chamber are pumped out of the chamber; turning on the inflation pump 3 and the inflation pipelines for properly pressurized preservation, which not only prevents the odor and water from excessively scattering and losing, but also inhibits the food spoilage; meanwhile, according to feedback information of the humidity sensor, turning on the humidifier 6.5 at a proper time to supplement the water in the air, or turning on the super oxygen generator 6.2 at a proper time to kill the bacteria in the air to prevent food spoilage; (6) low-temperature assisted fresh-keeping procedure: after the refrigerator is turned on, turning on the refrigeration system 8 instantly by the positive and negative pressure intelligent regulation device 5, communicating the refrigeration system 8 with the evaporator air-cooling assembly 8.1 and the evaporator direct cooling assembly 8.2 by a refrigerating pipeline A13, and providing corresponding low temperature for various chambers according to the feedback and control of the temperature sensing controller C9, thus assisting the positive and negative pressure system to keep the freshness of the stored objects; (7) high-pressure rapid freezing and thawing and high-pressure unfreezing storage procedure: providing an ultra-high-pressure deep-freezing chamber 1-3 in the freeze area of the positive and negative pressure refrigerator, and providing an ultra-high-pressure unfreezing chamber 1-4 in the refrigeration area special for high-quality freezing fresh-keeping, thawing fresh-keeping and high-pressure unfreezing storage of the meat, fish and seafoods; and pressurizing the ultra-high-pressure unfreezing chamber 1-4 by the inflation pump 3, wherein a certain ultra-high pressure may affect the freezing point, crystallization process and the size and shape of ice crystals of water in the tissues and cells of the meat and fish, and in the range of 0 MPa to 209.9 MPa, the freezing point of water decreases with the increase of the pressure, and the water can only be frozen at the lowest freezing point of −21.99° C. when the pressure is 209.9 MPa; by using the principle, the maximum formation zone of ice crystals in the normal temperature freezing can be avoided, and the problem that the tissues and cells of the fish and meat are damaged due to the long staying time at the maximum ice crystal zone during the traditional freezing and thawing at normal pressure is solved to a certain extent, so the quality, flavor and freshness of the stored high-water food such as meat, fish and seafood can be perfectly maintained; although the ultra-high-pressure chamber in the present disclosure cannot be arranged in the refrigerator at a proper low cost in accordance with the prior art and the existing materials, the providing of the ultra-high-pressure chamber in the refrigerator can be gradually achieved rapidly with the development of science and technology; (8) open-to-exhaust protection function: if the refrigerator door is opened during super-oxygen sterilization and disinfection or modified atmosphere storage, providing feedback immediately by the chamber door switch, and stopping the super oxygen or modified atmosphere procedure immediately through the operation of the positive and negative pressure intelligent regulation device 5; and meanwhile, opening the air suction pipelines and turning on the suction pump 2 to rapidly pump the super oxygen or high-nitrogen low-oxygen gas to the super oxygen decomposer 6.7 at the rear part of the refrigerator to be exhausted after being decomposed, wherein, as the air flows from the human side to the vacuum high pressure refrigerating chamber for supplementing air suction negative pressure, the user is not exposed to and is protected from the super oxygen and high-nitrogen low-oxygen gas; (9) air water production procedure: enabling moist waste gas extracted from the vacuum high-pressure chamber by the suction pump 2 to enter the super oxygen decomposer 6.7, and enabling the moist waste gas to enter the air water production device 11 after the super oxygen is decomposed, condensing water vapor and filtering the condensed water vapor into purified water conforming to drinking water standard, thus providing uninterrupted source of water for the humidifier 6.5; when the inflation pump 3 is idle, turning on the inflation pump 3 by the intelligent regulation device 5, and enabling the solenoid valves B3 and B2 to open the air water production inflation pipelines (air outlet d of inflation pump→A3→B3→A5→A9→B2→A2→air inlet h of air water production device), driving the indoor air to enter the air water production device 11 for water production; (10) remote and short-range control monitoring function: controlling and monitoring, by the touch screen and mobile phone monitoring system 12, the refrigerator and other positive and negative pressure electrical appliances and a positive and negative pressure modular cabinet in real time by the WIFI and mobile phone APP at remote and short-range, thus making the refrigerator and other all positive and negative pressure electrical appliances and modular cabinets to intelligently achieve various functions at high efficiency and low consumption according to the set procedures and instant instructions; shooting, by the high-definition anti-fog camera device 12.3, the statuses of objects in the refrigerator in real time; displaying and reminding, by a refrigerator door touch screen 12.1 or a mobile phone APP 12.2, commodity information such as production date, price, expiration date and manufacturers and the information of purchase shopping malls and online stores, automatically recording, analyzing and handling the big data such as the time, quantity, frequency and preference of storing the objects in, and taking the objects out, the refrigerator, and performing intelligent analysis; timely reminding on the mobile phone APP 12.2 or directly pushing the suggested goods to the mobile phone APP 12.2 or the refrigerator door touch screen 12.1 for easy selection of purchase by the user, wherein, in addition to real-time monitoring and recording, the high-definition anti-fog camera device 12.3 is especially required to automatically and continuously shoot several panoramic photos of the objects in the refrigerator with the closing movement of the refrigerator door 1.2 by starting from the position remote away from the refrigerator box in the process of closing the refrigerator door, or automatically record small videos at the same time for the users to view in the mobile phone APP, or view the panoramic photos or videos of the objects in the refrigerator with good light and wide field of vision before and during the last closing of the door in the refrigerator door touch screen at any time without opening the refrigerator door, releasing the vacuum and lowering the temperature during short range; and (11) positive and negative pressure module combined intelligent smart home mode: designing and manufacturing the intelligent positive and negative pressure refrigerator according to the module functions, wherein the intelligent positive and negative pressure refrigerator not only can be independently produced and used as a separated invention, or but also can be organically combined with other positive and negative pressure electrical appliances and the modular cabinets under the control of the touch screen and mobile phone APP monitoring system 12 to form a fully functional intelligent positive and negative pressure module combined home; the fully functional intelligent positive and negative pressure module combined home not only can share the positive and negative pressure system, the refrigeration system and the air water production device, but also has basically uniform, neat and harmonious appearance, shape and color which are in line with the popular trend; in conclusion, in accordance with the specific operation method for the intelligent positive and negative pressure refrigerator, multiple technologies such as vacuum, high pressure, super oxygen, modified atmosphere freshkeeping, low-temperature storage, negative oxygen ions, air catalysts, humidification and air water production can be intelligently regulated and integrated, and can be alternately or circularly used in different combinations of single, double or multiple items; moreover, different types of vacuum high-pressure chambers can be arranged in one refrigerator, the fruits, vegetables, meat and fish stored in the refrigerator can be kept at a moisture and fresh quality flavor for a long time according to individualized policy and classified regulation, and meanwhile, the refrigerator is more energy efficient, low-consumption and suitable for use.

In a fifth specific embodiment, an intelligent positive and negative pressure washing machine is provided. The intelligent positive and negative pressure washing machine comprises a machine body 7. The machine body 7 is internally provided with an intelligent positive and negative pressure system, a washing-dehydrating-drying system 15, and a touch screen and mobile phone monitoring system 12. The intelligent positive and negative pressure system comprises a positive and negative pressure chamber 1, a suction pump 2, an inflation pump 3, a positive and negative pressure intelligent regulation device 5, and positive and negative pressure airflow load generation processors. The positive and negative pressure chamber 1 is designed as a vacuum high pressure drum outer chamber 1-5 according to particular requirements for washing and drying. The vacuum high pressure drum outer chamber 1-5 comprises a chamber body 1.1, a chamber door 1.2, a mechanical airtight mechanism 1.3, and an internal and external communicating sealer 1.4. The chamber door 1.2 is a machine door of the positive and negative pressure washing machine; the mechanical airtight mechanism 1.3 is arranged between the chamber door 1.2 and the chamber body 1.1 of the vacuum high pressure drum outer chamber 1-5. The mechanical airtight mechanism 1.3 comprises a lock ring 1.31, a lock bolt 1.32, an airtight gasket 1.33, and a door rim sealing gasket 1.34; the lock ring 1.31 is in movable fit with the lock bolt 1.32, the lock bolt 1.32 extends into the lock ring 1.31 to lock the chamber door during the closing of the chamber door. When the positive and negative atmospheric pressure is formed inside the vacuum high pressure drum outer chamber 1-5, the airtight gasket 1.33 is used for keeping sealing. The internal and external communicating sealer 1.4 is fixedly arranged at the rear part of the vacuum high pressure drum outer chamber 1-5, and all pipes and circuits getting in and out the chamber are connected to and pass through the internal and external communicating sealer 1.4 so as to keep the sealing property of the vacuum high pressure drum outer chamber 1-5. The vacuum high pressure drum outer chamber 1-5 is internally provided with a drum mechanism 15.1, an anti-shower air suction port 2.1, a drum sealing bearing block 15.3, a pressure sensor C1 and a negative pressure sensor C2. The vacuum high pressure drum outer chamber 1-5 is externally provided with the suction pump 2, the inflation pump 3, the positive and negative pressure intelligent regulation device 5, a washing-dehydrating-drying control mechanism 15.2, a drum big belt pulley 15.4, a motor assembly 15.5, a drainage pump 16, a water intake pump 17, a super oxygen generation water mixer 6.6, a super oxygen decomposer 6.7, a touch screen and mobile phone APP monitoring system 12, and a detergent pull box 18. An air suction pipeline A1 is installed at an air inlet a of the suction pump 2, a solenoid valve B1 is installed at the middle part of the air suction pipeline A1, and the other end of the air suction pipeline A1 extends into the vacuum high pressure drum outer chamber 1-5 and then is connected with the anti-shower air suction port 2 to form an air suction and air return port c, and an air outlet b of the suction pump 2 is open to the atmosphere. An inflation pipeline A3 is installed at an air outlet d of the inflation pump 3, a solenoid valve B3 is installed at the middle part of the inflation pipeline A3, the other end of the inflation pipeline A3 extends into the vacuum high pressure drum outer chamber 1-5 and extends below the drum mechanism 15.1 to form an inflatable air inlet f, and an air inlet e of the inflation pump 3 is open to the atmosphere. A water inlet pipeline A14 is installed at a water inlet r of the water intake pump 17, a solenoid valve B14 is installed at the middle part of the water inlet pipeline A14, and the other end of the water inlet pipeline A14 communicates with a tap water source. A washing machine water inlet pipeline A15 is installed at a water outlet u of the water intake pump 17, a solenoid valve B15 is installed at the middle part of the water inlet pipeline A15, and the other end of the water inlet pipeline A15 communicates with a water inlet k of the super oxygen generation water mixer 6.6. A washing machine water inlet pipeline A16 is installed at a water outlet q of the super oxygen generation water mixer 6.6, a solenoid valve B16 is installed at the middle part of the water inlet pipeline A16, and the other end of the water inlet pipeline A16 communicates with a water inlet z of the detergent pull box 18. A washing machine water inlet pipeline A17 is installed at a water outlet 1 of the detergent pull box 18, a solenoid valve B17 is installed at the middle part of the water inlet pipeline A17, and the other end of the water inlet pipeline A17 extends into the vacuum high pressure drum outer chamber 1-5 to form a water inlet T thereof. A water inlet pipeline A18 is installed on the solenoid valve B14, and the solenoid valve B14 communicates with the solenoid valve B16 so as to directly feed water when super-oxygenated water is not needed and the tap water pressure reaches the standard. A water inlet pipeline A19 is further installed on the solenoid valve B15, and the solenoid valve B15 is connected to the water inlet pipeline A18 to communicate with the solenoid valve B16, such that the water is directly fed by the water intake pump 17 when the super-oxygenated water is not needed; a drainage pipeline A20 is installed at a water inlet w of the drainage pump 16, a solenoid valve B20 is installed at the middle part of the drainage pipeline A20, and the other end of the drainage pipeline A20 extends into the vacuum high pressure drum outer chamber 1-5 to form a drainage port L thereof. A drainage pipeline A21 is installed at a water outlet p of the drainage pump 16, a solenoid valve B21 is installed at the middle part of the drainage pipeline A21, and the other end of the drainage pipeline A21 communicates with a water inlet g of the super oxygen decomposer 6.7. A drainage pipeline A22 is installed at a water outlet m of the super oxygen decomposer 6.7, a solenoid valve B22 is installed at the middle part of the drainage pipeline A22, and the other end of the drainage pipeline A22 communicates with a sewer. A drainage pipeline A23 is further installed on the solenoid valve B20, and the solenoid valve B20 communicates with the solenoid valve B22, such that the water is directly drained when the super oxygen does not need to be decomposed and free drainage can be achieved. A drainage pipeline A24 is further installed on the solenoid valve B21, and the solenoid valve B21 is connected to the drainage pipeline A23 and then communicates with the solenoid valve B22, such that the water is directly drained by the drainage pump 16 when super oxygen does not need to be decomposed. The big belt pulley 15.4 is driven by the motor assembly 15.5, and the big belt pulley 15.4 drives the drum mechanism 15.1 connected thereto to operate; the suction pump 2, the inflation pump 3, the drainage pump 16, the water intake pump 17, the super oxygen generation water mixer 6.6, the super oxygen decomposer 6.7, the washing-dehydrating-drying control mechanism 15.2, the touch screen and mobile phone APP monitoring system 12, the pressure sensor C1, the negative pressure sensor C2 and the solenoid valves B1 to B22 are all connected to the positive and negative pressure intelligent regulation device 5.

In a sixth specific embodiment, an operation method for the intelligent positive and negative pressure washing machine is provided. The method comprises the following steps: (1) water inlet procedure: placing clothing into the drum 15.1, closing the machine door, i.e., the vacuum high-pressure chamber door 1.2 to seal and lock the vacuum high pressure drum outer chamber 1-5 after the washing machine is turned on; sending an instruction by the positive and negative pressure intelligent regulation device 5 to enable the solenoid valves B14, B15, B16 and B17 to open the corresponding water inlet pipelines (①) direct tap water inlet line is: A14→B14→A18→B16→A16→water inlet z of detergent pull box→water outlet 1→A17→B17→A17→water inlet T of drum outer chamber; ② when super-oxygenated water is required for washing, a water inlet line for water intake pump is: A14→B14→A14→water inlet r of water intake pump→water outlet u→A15→B15→A15→water inlet k of super oxygen generation water mixer→water outlet q→A16→B16→A16→detergent pull box z→water outlet 1→A17→B17→A17→water inlet T of drum outer chamber; and ③ when super-oxygenated water is not required for washing, water inlet line for water intake pump is: A14→B14→A14→water inlet r of water intake pump→water outlet u→A15→B15→A19→A18→B16→A16→water inlet z of detergent pull box→water outlet 1→A17→B17→A17→water inlet T of drum outer chamber), and turning on the water intake pump 17, directly feeding the tap water accordingly, or by the super oxygen generation water mixer 6.6, rapidly mixing the tap water with the super oxygen generated by the super oxygen generation water mixer 6.6 into super-oxygenated water with an appropriate concentration, and feeding the super-oxygenated water into the vacuum high pressure drum outer chamber 1-5 to accelerate the decomposition of organic fouling on the clothing, thus facilitating the rapid cleaning; after the water intake is started, enabling, by the positive and negative pressure intelligent regulation device 5, the solenoid valve B1 to open the air suction pipeline A1 (air inlet a of suction pump→A1→B1→A1→air suction and air return port c of drum outer chamber 1-5), and turning on the suction pump 2 to make the vacuum high pressure drum outer chamber 1-5 in a moderate negative pressure, thus accelerating the water intake and shortening the time for water intake; (2) vacuum washing procedure: after the water intake is finished, turning on, by the positive and negative pressure intelligent regulation device 5, the motor assembly 15.5 to drive the drum mechanism 15.1 to rotate for washing, and meanwhile, enabling the solenoid valve B1 to open the air suction pipeline A1 (air inlet a of suction pump→A1→B1→A1→air suction and air return port c of drum outer chamber 1-5), and turning on the suction pump 2 to pump the vacuum high pressure drum outer chamber 1-5 to a moderate vacuum, wherein both the clothing fibers and stains expand in the moderate vacuum and the air therein escapes, such that the adhesive force of the stains is weaken or the stains fall off, the cleaning efficiency is improved, and the washing time is shortened, and during the laundry process, the super-oxygenated water directly kills bacteria and viral microorganisms on clothing, the organic matters in the dust and fouling on the clothing are decomposed and then dissolved into the water, the dirt removability of the detergent is enhanced, the degree of cleaning is improved, the cleaning process is accelerated, and the function of sterilization and deodorization is achieved at the same time; (3) high-pressure washing procedure: after washing at vacuum for a proper time, closing the solenoid valve B1 and turning off the suction pump 2 by the positive and negative pressure intelligent regulation device 5, enabling the solenoid valve B3 to open the inflation pipeline A3 (air outlet d of inflation pump 3→A3→B3→A3→inflatable air inlet f of drum outer chamber 1-5), and turning on the inflation pump 3 to feed the high-pressure airflow into the vacuum high pressure drum outer chamber 1-5 through the inflation pipeline A3, and forming a strong bubble torrent at the lower part of the drum mechanism 15.1 to participate into washing, wherein the high pressure formed inside the vacuum high pressure drum outer chamber 1-5 is beneficial for the detergent to permeate into the clothing for cleaning; circulating the air suction and inflation repeatedly for the alternation of fiber expansion and torrent kneading, thus improving the degree of cleaning and the washing efficiency greatly, and accelerating the washing and rinsing processes; (4) drainage-dehydrating procedure: sending an instruction by the positive and negative pressure intelligent regulation device 5 when the drainage is required, enabling the solenoid valves B20, B21 and B22 to open the corresponding drainage pipelines (①when both the drainage pump and the decomposition of super oxygen are not required, the direct drainage line is: drainage port L of drum outer chamber→A20→B20→A23→B22→A22→sewer; ② when both the drainage pump for drainage and the decomposition of super oxygen are required, the drainage line is: drainage port L of drum outer chamber→A20→B20→A20→water inlet w of drainage pump-water outlet p→A21→B21→A21→water inlet g of super oxygen decomposer→water outlet m→A22→B22→A22→sewer; and ③ when the drainage pump is required for drainage and the decomposition of super oxygen is not required, the drainage line is: drainage port L of drum outer chamber→A20→B20→A20→water inlet w of drainage pump→water outlet p→A21→B21→A24→A23→B22→A22→sewer), turning on the drainage pump 16 for drainage, during drainage, turning on the inflation pump 3 to inflate and pressurize the vacuum high pressure drum outer chamber 1-5, thus accelerating the drainage speed; after the drainage is finished, sending an instruction by the positive and negative pressure intelligent regulation device 5 to start dehydration; during dehydration, inflating and pressurizing to force the water to rapidly separate from the clothing; turning on the suction pump 2 alternately to pump negative pressure to make the clothing fibers in the vacuum high pressure drum outer chamber 1-5 expand, wherein the water in the clothing escapes to the negative pressure space and is pumped out of the chamber, such that the clothing hardened on the inner wall of the drum during dehydrating and high pressure is loosened to prevent wrinkles, and by circulating the air suction and inflation repeatedly, squeezing out water and pumping the water out the chamber are carried out alternately, the efficiency of dehydrating the clothing is greatly improved, and time for drainage and dehydration is shortened; (5) vacuum high pressure drying procedure: when the drying procedure is started, turning on the inflation pump 3 according to the instruction sent by the positive and negative pressure intelligent regulation device 5, and opening the inflation pipeline to inflate and pressurize the vacuum high pressure drum outer chamber 1-5, thus facilitating hot air to enter the clothing fibers to gasify the water, and then turning on the suction pump 2 and opening the air suction pipeline for air suction according to the instruction, pumping out the water and making the clothing fibers expand with the negative pressure to facilitate the water emission and quick drying, such that, by circulating the air suction and inflation repeatedly, heating gasification and water pump-out are alternately carried out, the drying progress is greatly accelerated, the fluffy clothing improves the drying quality, and the drying time is effectively shortened; (6) vacuum self-cleaning sterile placement procedure: closing the machine door 1.2 after the laundry is finished, controlling, by the positive and negative pressure intelligent regulation device 5, the washing-dehydrating-drying control mechanism to start drying hot air to blow-dry the inside of the washing machine, especially the drum mechanism 15.1, and then turning on the suction pump 2 and open the air suction pipeline for air suction, pumping out the residual super oxygen in the vacuum high pressure drum outer chamber 1-5, and enabling the drum mechanism 15.1 and the equipment in the chamber to be in a moderate vacuum, such that the drum mechanism and the equipment in the chamber are sterile, dust-free and pollution-free for keeping clean, and are oxidation-free, rust-free and undamaged for vacancy, and the service life of the washing machine is prolonged; in conclusion, the positive and negative pressure washing machine greatly accelerates the multiple processes of washing, dehydrating and drying, shortens the operation duration of the multiple procedures, and improves the degree of cleaning of laundry and drying quality, moreover, the super oxygen also provides a thorough sterilization, disinfection and odor removal for the washed clothing; and meanwhile, the super oxygen concentration and the operation duration are intelligently controlled at the moderate region for sterilization, degradation and washing assistance, not reach, or as little as possible to reach, a critical point of possible oxidation fading of dark clothing; (7) positive and negative pressure module combined intelligent smart home mode: designing and manufacturing the intelligent positive and negative pressure washing machine according to the module functions, wherein the intelligent positive and negative pressure washing machine not only can be independently produced and used as a separated invention, but also can be organically combined with other positive and negative pressure electrical appliances and the modular cabinets under the control of the touch screen and mobile phone APP monitoring system 12 to form a fully functional intelligent positive and negative pressure module combined home, which not only can share the positive and negative pressure system, the refrigeration system and the air water production device, but also has basically uniform, neat and harmonious appearance, shape and color which are in line with the popular trend; in conclusion, in accordance with the intelligent positive and negative pressure system, the washing, dehydrating and drying of clothing are faster, more efficient and low-consumption, and the washed clothing is less in consumption, cleaner, fluffier, and more sanitary.

In a seventh specific embodiment, an intelligent vacuum dishwasher/fruit and vegetable cleaning machine is provided. The intelligent vacuum dishwasher/fruit and vegetable cleaning machine comprises a machine body 7. The machine body 7 is internally provided with an intelligent positive and negative pressure system, a dish washing-drying system 19, a fruit and vegetable cleaning system 20, and a touch screen and mobile phone APP monitoring system 12. The intelligent positive and negative pressure system comprises a positive and negative pressure chamber 1, a suction pump 2, a positive and negative pressure intelligent regulation device 5, and positive and negative pressure airflow load generation processors. The positive and negative pressure chamber 1 is designed as a vacuum super oxygen chamber 1-6 according to particular requirements for intelligent dish washing and drying and fruit and vegetable cleaning. The vacuum super oxygen chamber 1-6 comprises a chamber body 1.1, a chamber door 1.2, a mechanical airtight mechanism 1.3, and an internal and external communicating sealer 1.4. The chamber door 1.2 is a machine door of the vacuum dishwasher/fruit and vegetable cleaning machine. The mechanical airtight mechanism 1.3 is arranged between the chamber door 1.2 and the chamber body 1.1 of the vacuum super oxygen chamber 1-6. The mechanical airtight mechanism 1.3 comprises a lock ring 1.31, a lock bolt 1.32, and an airtight gasket 1.33; the lock ring 1.31 is in movable fit with the lock bolt 1.32, the lock bolt 1.32 extends into the lock ring 1.31 to lock the chamber door during the closing of the chamber door. When the positive and negative atmospheric pressure is formed inside the vacuum super oxygen chamber 1-6, the airtight gasket 1.33 is used for keeping sealing. The internal and external communicating sealer 1.4 is fixedly arranged at the rear part of the vacuum super oxygen chamber 1-6, and all pipes and circuits getting in and out the chamber are connected to and pass through the internal and external communicating sealer 1.4 so as to keep the sealing property of the vacuum super oxygen chamber 1-6. The vacuum super oxygen chamber 1-6 is internally provided with a dish washing-drying system 19, a fruit and vegetable cleaning system 20, an anti-shower air suction port 2.1, a negative pressure sensor C2, a super oxygen sensor C3, and a temperature sensor C9. The vacuum super oxygen chamber 1-6 is externally provided with the suction pump 2, the positive and negative pressure intelligent regulation device 5, a drainage pump 16, a water intake pump 17, a super oxygen generation water mixer 6.6, a super oxygen decomposer 6.7, and the touch screen and mobile phone APP monitoring system 12. An air suction pipeline A1 is installed at an air inlet a of the suction pump 2, a solenoid valve B1 is installed at the middle part of the air suction pipeline A1, the other end of the air suction pipeline A1 extends into the vacuum super oxygen chamber 1-6 and then is connected with the anti-shower air suction port 2.1 so as to form an air suction and air return port c, and an air outlet b of the suction pump 2 is open to the atmosphere. A water inlet pipeline A14 is installed at a water inlet r of the water intake pump 17, a solenoid valve B14 is installed at the middle part of the water inlet pipeline A14, and the other end of the water inlet pipeline A14 communicates with a tap water source. A water inlet pipeline A15 is installed at a water outlet u of the water intake pump 17, a solenoid valve B15 is installed at the middle part of the water inlet pipeline A15, and the other end of the water inlet pipeline A15 communicates with a water inlet k of the super oxygen generation water mixer 6.6. A water inlet pipeline A16 is installed at a water outlet q of the super oxygen generation water mixer 6.6, a solenoid valve B16 is installed at the middle part of the water inlet pipeline A16, and the other end of the water inlet pipeline A16 extends into the vacuum super oxygen chamber 1-6 to be connected to the solenoid valve B25. The solenoid valve B25 is respectively connected to a fruit and vegetable cleaning water inlet pipeline A25 and a dish washing-drying water inlet pipeline A27, and the water inlet pipeline A25 is connected to a water inlet E of the fruit and vegetable cleaning system 20. A water inlet pipeline A27 is connected to a water inlet G of the dish washing-drying system 19; a water inlet pipeline A19 is further installed at the solenoid valve B15, and the solenoid valve B15 is connected to the solenoid valve B16, such that the water is directly fed by the water intake pump 17 when super-oxygenated water is not required. A drainage pipeline A20 is installed at a water inlet w of the drainage pump 16, a solenoid valve B20 is installed at the middle part of the drainage pipeline A20, and the other end of the drainage pipeline A20 extends into the vacuum super oxygen chamber 1-6 and is respectively connected to a fruit and vegetable cleaning drainage pipeline A26 and a dish washing-drying drainage pipeline A28, and the drainage pipeline A26 is connected to a water outlet F of the fruit and vegetable cleaning system 20. The drainage pipeline A28 is connected to a drainage port H of the dish washing-drying system 19. A drainage pipeline A21 is installed at a water outlet p of the drainage pump 16, a solenoid valve B21 is installed at the middle part of the drainage pipeline A21, and the other end of the drainage pipeline A21 communicates with a water inlet g of the super oxygen decomposer 6.7. A drainage pipeline A22 is installed at a water outlet m of the super oxygen decomposer 6.7, a solenoid valve B22 is installed at the middle part of the drainage pipeline A22, and the other end of the drainage pipeline A22 communicates with a sewer. A drainage pipeline A24 is further installed at the solenoid valve B21, and the solenoid valve B21 is connected to A23 and then communicates with the solenoid valve B22, such that the water is directly drained by the drainage pump when the super oxygen does not need to be decomposed. The suction pump 2, the drainage pump 16, the water intake pump 17, the super oxygen generation water mixer 6.6, the super oxygen decomposer 6.7, the dish washing-drying system 19, the fruit and vegetable cleaning system 20, the touch screen and mobile phone APP monitoring system 12, the negative pressure sensor C2, the super oxygen sensor C3, the temperature sensor C9 and the solenoid valves B1 to B25 are all connected to the positive and negative pressure intelligent regulation device 5.

In an eighth specific embodiment, an operation method for the intelligent vacuum dishwasher/fruit and vegetable cleaning machine is provided. The method comprises the following steps: (1) dishwashing water inlet and cleaning procedure: sending an instruction by the positive and negative pressure intelligent regulation device 5 after the machine door is closed, enabling the solenoid valves B14, B15, B16 and B25 to open corresponding water inlet pipelines (①), when the super-oxygenated water is required for dishwashing, a water inlet line for the water intake pump is: A14→B14→A14→water inlet r of water intake pump→water outlet u→A15→B15→A15→water inlet k of super oxygen generation water mixer→water outlet q→A16→B16→A16→B25→A27→water inlet G of dish washing-drying system; ② when the super-oxygenated water is not required for dishwashing, the water inlet line for the water intake pump is: A14→B14→A14→water inlet r of water intake pump→water outlet u→A15→B15→A19→B16→A16→B25→A27→water inlet G of dish washing-drying system), turning on the water intake pump 17, rapidly mixing, by the super oxygen generation water mixer 6.6, the tap water with the super oxygen generated by the super oxygen generation water mixer 6.6 into super-oxygenated water with an appropriate concentration, and feeding the super-oxygenated water into the vacuum super oxygen chamber 1-6 to accelerate the decomposition of organic fouling on the tableware, thus facilitating the rapid cleaning; after the water inlet is finished, turning on the dish washing-drying system 19 by the positive and negative pressure intelligent regulation device 5 to spray water for dishwashing, and enabling the solenoid valve B1 to open the air suction pipeline A1 (air inlet a of suction pump→A1→B1→A1→air suction and air return port c of vacuum super oxygen chamber), and turning on the suction pump 2 for vacuumizing, wherein, during the vacuumizing, the dirt stained on the tableware expands in the negative vacuum pressure to make air escape from the dirt, thus the adhesive force of the dirt is weakened, or the dirt fall off from the tableware, the cleaning efficiency is improved, and the washing process is shortened, moreover, the super-oxygenated water directly kills the bacteria and viral microorganism on the tableware, the organic matters in the dirt on the tableware are decomposed and then dissolved into the water, the dirt removability of the detergent is enhanced, the degree of cleaning is improved, the cleaning process is accelerated, and the function of sterilization and deodorization is achieved at the same time; (2) dishwashing drainage and drying disinfection procedure: when the drainage is required at a proper time of cleaning, sending an instruction by the positive and negative pressure intelligent regulation device 5, enabling the solenoid valves B20, B21 and B22 to open the corresponding drainage pipelines (①) when both the drainage pump and the decomposition of super oxygen are not required, the direct drainage line is: water outlet H of dish washing-drying system→A28→A20→B20→A23→B22→A22→sewer; ② when both the drainage pump for drainage and the decomposition of super oxygen are required, the drainage line is: water outlet H of dish washing drying system→A28→A20→B20→A20→water inlet w of drainage pump→water outlet p→A21→B21→A21→water inlet g of super oxygen decomposer→water outlet m→A22→B22→A22→sewer; and ③ when the drainage pump is required for drainage and the super oxygen does not need to be decomposed, the drainage line is: water outlet H of dish washing and drying system→A28→A20→B20→A23→B22→A22→sewer), draining water directly or turning on the drainage pump 16, or turning on the super oxygen decomposer 6.7 to decompose waste water and then drain the decomposed waste water into the sewer; meanwhile, spraying the tableware with the clear water for cleaning completely; during the drying procedure, turning on, by the positive and negative pressure regulation device 5, the suction pump 2 again to rapidly pump out the water vapor so as to accelerate the drying progress, wherein the vacuum and super oxygen greatly accelerate the full dishwashing process, and the super oxygen also provide thorough sterilization, disinfection and odor removal for the washed tableware; (3) fruit and vegetable cleaning water inlet and cleaning procedure: sending an instruction by the positive and negative pressure intelligent regulation device 5 after the machine door is closed, enabling the solenoid valves B14, B15, B16 and B25 to open corresponding water inlet pipelines (①) when the super-oxygenated water is required for fruit and vegetable cleaning, a water inlet line for the water intake pump is: A14→B14→A14→water inlet r of water intake pump→water outlet u→A15→B15→A15→water inlet k of super oxygen generation water mixer→water outlet q→A16→B16→A16→B25→A25→water inlet E of fruit and vegetable cleaning system; ② when the super-oxygenated water is not required for fruit and vegetable cleaning, a water inlet line for the water intake pump is: A14→B14→A14→water inlet r of water intake pump→water outlet u→A15→B15→A19→B16→A16→B25→A25→water inlet E of fruit and vegetable cleaning system), and turning on the water intake pump 17, rapidly mixing, by the super oxygen generation water mixer 6.6, the tap water with the super oxygen generated by the super oxygen generation water mixer 6.6 into super-oxygenated water with an appropriate concentration, and feeding the super-oxygenated water into the vacuum super oxygen chamber 1-6 to accelerate the decomposition of organic fouling on the tableware, thus facilitating the rapid cleaning; after the water inlet is finished, turning on the fruit and vegetable cleaning system by the positive and negative pressure intelligent regulation device 5 to clean the fruit and vegetables by spraying, and enabling the solenoid valves B1 to open the air suction pipeline A1 (air inlet a of suction pump→A1→B1→A1→air suction and air return port c of vacuum super oxygen chamber), and meanwhile, turning on the suction pump 2 to start vacuumizing to the moderate negative pressure, wherein the dirt stained on the fruits and vegetables is able to expand in the negative pressure to make the air escape from the dirt, thus the adhesive force of the dirt is weakened, or the dirt fall off from the fruits and vegetables, the cleaning efficiency is improved, the washing process is shortened, moreover, the super-oxygenated water directly kills the bacteria and viral microorganism on the skin of the fruits and vegetables, the organic matters in dirt on skin of the fruits and vegetables are decomposed and then dissolved into the water, the degree of cleaning is improved, and the cleaning process is accelerated; and meanwhile, the negative pressure promotes the escape of pesticide and heavy metal residues in the tissues of the fruits and vegetables and the harmful gases such as the volatile metabolites ethylene acetaldehyde ethanol, thus a favorable environment is created for the super-oxygenated water to rapidly clean and deeply degrade the pesticide residues and decompose the harmful gases such as ethylene; and after cleaning with the super-oxygenated water for a proper time, sending an instruction by the positive and negative pressure intelligent regulation device 5 to clean the fruit and vegetables with the spraying of clear water; (4) drainage procedure after fruit and vegetable cleaning: when the drainage is required after cleaning for a proper time, sending an instruction by the positive and negative pressure intelligent regulation device 5, enabling the solenoid valves B20, B21 and B22 to open corresponding drainage pipelines (①) when both the drainage pump and the decomposition of super oxygen are not required, a direct drainage line is: water outlet F of fruit and vegetable cleaning system→A26→A20→B20→A23→B22→A22→sewer; ② when both the drainage pump for drainage and the decomposition of super oxygen are required, a drainage line is: water outlet F of fruit and vegetable cleaning system→A26→A20→B20→A20→water inlet w of drainage pump→water outlet p→A21→B21→A21→water outlet g of super er oxygen decomposer→water outlet m→A22→B22→A22→sewer; (3) when the drainage pump is required for drainage and the super oxygen does not need to be decomposed, the drainage line is: water outlet F of fruit and vegetable cleaning system→A26→A20→B20→A23→B22→A22→sewer), directly draining water or turning on the drainage pump 16 or turning on the super oxygen decomposer 6.7 again to decompose waste water, and then draining the decomposed waste water into the sewer; (5) vacuum self-cleaning sterile placement sterile: closing the machine door 1.2 after use, starting drying hot air by the positive and negative pressure intelligent regulation device 5 to blow-dry the inside of the vacuum super oxygen chamber 1-6, especially the dish washing-drying system 19 and the fruit and vegetable cleaning system 20, and then turning on the suction pump 2 and open the air suction pipeline for air suction, pumping out the residual super oxygen in the vacuum super oxygen chamber 1-6, and enabling the dish washing-drying system 19, the fruit and vegetable cleaning system 20 and the equipment in the chamber to be in a moderate vacuum, such that the dish washing-drying system 19 and the fruit and vegetable cleaning system 20 and the equipment in the chamber are sterile, dust-free, pollution-free, and kept clean for health, and are oxidation-free, rust-free and undamaged for vacancy, and the service life of the washing machine is prolonged; (6) positive and negative pressure module combined intelligent smart home mode: designing and manufacturing the intelligent positive and negative pressure dishwasher/fruit and vegetable cleaning machine according to the module functions, wherein the intelligent positive and negative pressure dishwasher/fruit and vegetable cleaning machine not only can be independently produced and used as a separated invention, but also can be organically combined with other positive and negative pressure electrical appliances and the modular cabinets under the control of the touch screen and mobile phone APP monitoring system 12 to form a fully functional intelligent positive and negative pressure module combined home, which not only can share the water intake pump 17, the drainage pump 16, the super oxygen generation water mixer 6.6 and the super oxygen decomposer 6.7, but also has basically uniform, neat and harmonious appearance, shape and color which are in line with the popular trend, such that the dishwasher/fruit and vegetable cleaning machine is more efficient, low-consumption, and suitable for use.

In a ninth specific embodiment, an intelligent super-oxygenated water washing range hood is provided. The intelligent super-oxygenated water washing range hood comprises a machine body 7. The lower half part of the machine body 7 is a sealed waterproof super oxygen chamber 1-7, and the upper half part of the machine body 7 is an equipment fume tube chamber 21. The sealed waterproof super oxygen chamber 1-7 comprises a triangular chamber body 1.1, and a sealed waterproof chamber door 1.2. The sealed waterproof chamber door 1.2 is a machine door of the super-oxygenated water washing range hood, and a sealing waterproof mechanism 1.7 is arranged between the chamber door 1.2 and the chamber body 1.1. The sealing waterproof mechanism 1.7 comprises a lock ring 1.71, a lock bolt 1.72, an airtight gasket 1.73, and a chamber door hinge 1.74; the lock ring 1.71 is in movable fit with the lock bolt 1.72, the lock bolt 1.72 extends into the lock ring 1.71 to lock the chamber door 1.2 during the closing of the chamber door. When the positive and negative pressure is formed inside the sealed waterproof super oxygen chamber 1-7, the airtight gasket 1.73 is used for keeping sealing. The sealed waterproof super oxygen chamber 1-7 is internally provided with a motor-turbine assembly 22, an automatic rotary spraying ball 23, and an oil collecting and drainage groove 24; the front of the sealed waterproof super oxygen chamber 1-7 is further provided with a touch screen and mobile phone APP monitoring system 12. The equipment fume tube chamber 21 is internally provided with a super oxygen intelligent cleaning system, and a fume extraction control mechanism 26. The intelligent super oxygen cleaning system comprises a super oxygen intelligent regulation device 5.1, a water intake pump 17, a drainage pump 16, a super oxygen generation water mixer 6.6, a super oxygen decomposer 6.7, a water heating device 27, and degreaser adder 28. A water inlet pipeline A14 is installed at a water inlet r of the water intake pump 17, the water inlet r communicates with a tap water source, a water inlet pipeline A15 is installed at a water outlet u of the water intake pump 17, a water heating device 27 and a solenoid valve B15 are installed at the middle part of the water inlet pipeline A15, and the other end of the water inlet pipeline A15 is divided into three paths by the solenoid valve B15 to respectively communicate with a water inlet k of the super oxygen generation water mixer 6.6, a water inlet z of the degreaser adder 28 and a solenoid valve B16. A water inlet pipeline A16 is installed at a water outlet q of the super oxygen generation water mixer 6.6, the solenoid valve B16 is installed at the middle part of the water inlet pipeline A16, and the other end of the water inlet pipeline A16 extends into the sealed waterproof super oxygen chamber 1-7 to be connected to a spraying pipeline A30. At least one automatic rotary spraying ball 23 is installed on the spraying pipeline A30, and an included angle between the axis of the spraying ball and the axis of a circle of spraying holes in the middle is 45 degrees, and the spraying ball 23 rotates automatically when water flow is sprayed. A water inlet pipeline A17 is installed at a water outlet 1 of the degreaser adder 28, a solenoid valve B17 is installed at the middle part of the water inlet pipeline A17, and the other end of the water inlet pipeline A17 communicates with the water inlet pipeline A15 and then communicates with the solenoid valve B16. A water inlet pipeline A20 is installed at a water inlet w of the drainage pump 16, a solenoid valve B20 is installed at the middle part of a drainage pipeline A20, and the other end of the drainage pipeline A20 extends into the oil collecting and drainage groove 24 at the bottom of vacuum super oxygen chamber 1-7 to form a drainage port L. A drainage pipeline A21 is installed at a water outlet p of the drainage pump 16, a solenoid valve B21 is installed at the middle part of the drainage pipeline A21, and the other end of the drainage pipeline A21 communicates with the super oxygen decomposer 6.7. A drainage pipeline A22 is installed at a water outlet m of the super oxygen decomposer 6.7, a solenoid valve B22 is installed at the middle part of the drainage pipeline A22, and the other end of the drainage pipeline A22 communicates with a sewer. A drainage pipeline A24 is further installed on the solenoid valve B21, and the solenoid valve B21 is connected to the solenoid valve B22, such that the water is directly drained by the drainage pump 16 when the super oxygen does not need to be decomposed. The water intake pump 17, the drainage pump 16, the super oxygen generation water mixer 6.6, the super oxygen decomposer 6.7, the water heating device 27, the degreaser adder 28, the fume extraction control mechanism 26, the touch screen and mobile phone APP monitoring system 12 and the solenoid valves B1 to B22 are all connected to the super oxygen intelligent regulation device 5.1.

In a tenth specific embodiment, an operation method for the intelligent super-oxygenated water washing range hood is provided. The method comprises the following steps: (1) fume extraction procedure: when the range hood is started, opening the sealed waterproof chamber door 1.2 for air inlet and fume extraction, and closing the sealed chamber door 1.2 after the range hood stops operating; (2) self-cleaning procedure: sending an instruction by the super oxygen intelligent regulation device 5.1, enabling the solenoid valves B15, B16 and B17 to open corresponding water inlet pipelines (①), when the super-oxygenated water is required for cleaning, a water inlet line is: A14→water inlet r of water intake pump→water outlet u→A15→water heating device→A15→B15→A15→water inlet k of super oxygen generation water mixer→water outlet q→A16→B16→A16→A30→automatic rotary spraying ball 23; ② when the degreaser is required for cleaning, the water inlet line is: A14→water inlet r of water intake pump→water outlet u→A15→water heating device→A15→B15→A15→water inlet z of degreaser adder→water outlet 1→A17→B17→A17→A15→B16→A16→A30→automatic rotary spraying ball 23; ③ when both super-oxygenated water and degreaser are not required for cleaning, the water inlet line is: A14→water inlet r of water intake pump→water outlet u→A15→water heating device→A15→B15→A15→B16→A16→A30→automatic rotary spraying ball 23), and turning on the water intake pump 17, rapidly mixing, by the water heating device 27 and the super oxygen generation water mixer 6.6, the tap water with the super oxygen generated by the super oxygen generation water mixer 6.6 into super-oxygenated water with an appropriate concentration, and feeding the super-oxygenated water into the sealed waterproof super oxygen chamber 1-7, and comprehensively spraying and cleaning various parts, including the motor turbine assembly 22, in a machine case by using the automatic rotary spraying ball 23; firstly spraying the supe-oxygenated hot water at the proper temperature to efficiently decompose and remove the oil fouling, and then spraying with the mixture of the degreaser and the hot water, and finally spraying with clean hot water until the oil fouling is completely cleaned; enabling the sewage obtained after cleaning to flow downwards to be collected into the oil collecting and drainage groove 24 at the lowest part of the machine case; when the drainage is needed, sending an instruction by the super oxygen intelligent regulation device 5.1, enabling the solenoid valves B20, B21 and B22 to open corresponding drainage pipelines (①) when the super oxygen needs to be decomposed, the drainage line is: drainage port L of oil collecting and drainage groove→A20→B20→A20→water inlet w of drainage pump→water outlet p→A21→B21→A21→water inlet g of super oxygen decomposer→water outlet m→A22→B22→A22→sewer; ② when the super oxygen does not to be decomposed, the drainage line is: drainage port L of oil collecting and drainage groove→A20→B20→A20→water inlet W of drainage pump→water outlet p→A21→B21→A24→B22→A22→sewer), and turning on the drainage pump 16 to drain the water to the sewer; (3) drying placement procedure: after cleaning, turning on the range hood according to an instruction sent by the super oxygen intelligent regulation device 5.1 to completely blow-dry the inside of the machine case, and then turning off the range hood to prevent corrosion; (4) turn-on protection function: when a user turns on the range hood, enabling the air to immediately flow into the vacuum super oxygen chamber from the human side and to be exhaust from an exhaust pipe 29, such that the vacuum super oxygen chamber is not exposed to any super oxygen; and (5) module combined intelligent smart home mode: designing and manufacturing the intelligent super-oxygenated water washing range hood according to the module functions, wherein the intelligent super-oxygenated water washing range hood not only can be independently produced and used as a separated invention, but also can be organically combined with other positive and negative pressure electrical appliances and the modular cabinet under the control of the touch screen and mobile phone APP monitoring system 12 to form a fully functional intelligent positive and negative pressure module combined home; the fully functional intelligent positive and negative pressure module combined home not only can share the water intake pump 17, the drainage pump 16, the super oxygen generation water mixer 6.6 and the super oxygen decomposer 6.7 with the dishwasher/fruit and vegetable cleaning machine, but also has basically uniform, neat and harmonious appearance, shape and color which are in line with the popular trend, such that the intelligent range hood is more efficient, low-consumption, and suitable for use.

In an eleventh specific embodiment, an intelligent positive and negative pressure oven/air fryer/microwave oven is provided. The intelligent positive and negative pressure oven/air fryer/microwave oven comprises a machine body 7. The machine body 7 is internally provided with an intelligent positive and negative pressure system, a grilling system 30, an air fryer system 31, a microwave system 32, and a touch screen and mobile phone APP monitoring system 12. The intelligent positive and negative pressure system comprises a positive and negative pressure chamber 1, a suction pump 2, an inflation pump 3, and a positive and negative pressure intelligent regulation device 5. The positive and negative pressure chamber 1 is designed as a microwave vacuum high-pressure chamber 1-8 according to particular requirements of the oven/air fryer and microwave oven. The microwave vacuum high-pressure chamber 1-8 comprises a chamber body 1.1, a chamber door 1.2, a mechanical airtight mechanism 1.3, and an internal and external communicating sealer 1.4. The chamber door 1.2 is a machine door of the positive and negative pressure oven/air fryer/microwave oven; the mechanical airtight mechanism 1.3 is arranged between the chamber door 1.2 and the chamber body 1.1 of the microwave vacuum high-pressure chamber 1-8. The mechanical airtight mechanism 1.3 comprises a lock ring 1.31, a lock bolt 1.32, and an airtight gasket 1.33; the lock ring 1.31 is in movable fit with the lock bolt 1.32, the lock bolt 1.32 extends into the lock ring 1.31 to lock the chamber door during the closing of the chamber door. When the positive and negative pressure is formed inside the microwave vacuum high-pressure chamber 1-8, the airtight gasket 1.33 is used for keeping sealing. The internal and external communicating sealer 1.4 is fixedly arranged at the rear part of the microwave vacuum high-pressure chamber 1-8, and all pipes and circuits getting in and out the chamber are connected to and pass through the internal and external communicating sealer 1.4 so as to keep the sealing property of the microwave vacuum high-pressure chamber 1-8. The microwave vacuum high-pressure chamber 1-8 is internally provided with the grilling system 30, the air fry system 31, the microwave system 32, a pressure sensor C1, and a negative pressure sensor C2. The microwave vacuum high-pressure chamber 1-8 is externally provided with the suction pump 2, the inflation pump 3, the positive and negative pressure intelligent regulation device 5, and the touch screen and mobile phone APP monitoring system 12. An air suction pipeline A1 is installed at an air inlet a of the suction pump 2, a solenoid valve B1 is installed at the middle part of the air suction pipeline A1, the other end of the air suction pipeline A1 extends into the microwave vacuum high-pressure chamber 1-8 to form an air suction and air return port c thereof. An air outlet pipeline A2 is installed at an air outlet b of the suction pump 2, and is open to the atmosphere. An inflation pipeline A3 is installed at an air outlet d of the inflation pump 3, a solenoid valve B3 is installed at the middle part of the inflation pipeline A3, and the other end of the inflation pipeline A3 extends into the microwave vacuum high-pressure chamber 1-8 to form an inflatable air inlet f. An air intake pipeline A4 is installed at an air inlet e of the inflation pump 3 and is open to the atmosphere. The suction pump 2, the inflation pump 3, the pressure sensor C1, the negative pressure sensor C2, the grilling system 3, the air fryer system 31, the microwave system 21 and the touch screen and mobile phone APP monitoring system 12 are all connected to the positive and negative pressure intelligent regulation device 5.

In a twelfth specific embodiment, an operation method for the intelligent positive and negative pressure oven/fryer/microwave oven is provided. The method comprises the following steps: (1) vacuum cooking procedure: opening the solenoid valve B1 and turning on the suction pump 2 by the positive and negative pressure intelligent regulation device 5, pumping the microwave vacuum high-pressure chamber 1-8 to a moderate vacuum by the air suction pipeline A1, and cooking the food in the vacuum to make the food have different flavors due to the expansion of the food materials, for example, turning on the air fryer system to back French fries, cakes and like more fluffy and palatable in appropriate vacuum; (2) high-pressure cooking procedure: opening the solenoid valve B3 and turning on the inflation pump 3 by the positive and negative pressure intelligent regulation device 5, enabling high-pressure airflow to enter the microwave vacuum high-pressure chamber 1-8 through the inflation pipeline A3, wherein the food cooked in high pressure is more tasty and has a distinct flavor as the seasonings are easy to permeate into the food materials, and the energy is saved as the food is easy to be cooked; (3) vacuum placement procedure: pumping the microwave vacuum high-pressure chamber 1-8 to the moderate vacuum when not in use, such that the oven/microwave system and circuit parts are in a vacuum state, are sterile, dust-free and pollution-free, and kept clean for health, and are oxidation-free, rust-free and non-loss for storage, and the service life of the electrical appliance is prolonged; (4) positive and negative pressure module combined intelligent smart home mode: designing and manufacturing the positive and negative pressure intelligent oven/air fryer/microwave oven according to the module functions, wherein the positive and negative pressure intelligent oven/air fryer/microwave oven not only can be independently produced and used as a separated invention, but also can be organically combined with other positive and negative pressure electrical appliances and the modular cabinets under the control of the touch screen and mobile phone APP monitoring system 12 to form a fully functional intelligent positive and negative pressure module combined home, and the fully functional intelligent positive and negative pressure module combined home not only can share the intelligent positive and negative pressure system, but also has basically uniform, neat and harmonious appearance, shape and color which are in line with the popular trend, such that the intelligent oven/air fryer/microwave oven is more efficient, low-consumption, and suitable for use.

In a thirteenth specific embodiment, an intelligent positive and negative pressure fresh-keeping compartment (container) is provided. The intelligent positive and negative pressure fresh-keeping compartment (container) comprises a compartment (container) body 7. The compartment (container) body 7 is internally provided with an intelligent positive and negative pressure system, a refrigeration system 8, and a touch screen and mobile phone monitoring system 12. The intelligent positive and negative pressure system comprises a positive and negative pressure chamber 1, a suction pump 2, an inflation pump 3, a positive and negative pressure intelligent regulation device 5, and positive and negative pressure airflow load generation processors. The positive and negative pressure chamber 1 is designed as a compartment (container) type vacuum high-pressure chamber 1-9 according to particular requirements of the positive and negative pressure fresh-keeping compartment (container). The compartment (container) type vacuum high-pressure chamber 1-9 comprises a chamber body 1.1, a chamber door 1.2, a mechanical airtight mechanism 1.3, and an internal and external communicating sealer 1.4. The chamber door 1.2 is a compartment door of the positive and negative pressure fresh-keeping compartment. The mechanical airtight mechanism 1.3 is arranged between the chamber door 1.2 and the chamber body 1.1 of the compartment (container) type vacuum high-pressure chamber 1-9. The mechanical airtight mechanism 1.3 comprises a lock ring 1.31, a lock bolt 1.32, and an airtight gasket 1.33; the lock ring 1.31 is in movable fit with the lock bolt 1.32, the lock bolt 1.32 extends into the lock ring 1.31 to lock the chamber door during the closing of the chamber door. When the positive and negative pressure is formed inside the compartment (container) type vacuum high-pressure chamber 1-9, the airtight gasket 1.33 is used for keeping sealing. The internal and external communicating sealer 1.4 is fixedly arranged at the rear part of the compartment (container) type vacuum high-pressure chamber 1-9, and all pipes and circuits getting in and out the chamber are connected to and pass through the internal and external communicating sealer 1.4 so as to keep the sealing property of the compartment (container) type vacuum high-pressure chamber 1-9. The compartment (container) type vacuum high-pressure chamber 1-9 is externally provided with the suction pump 2, the inflation pump 3, the positive and negative pressure intelligent regulation device 5, a modified atmosphere device 6.1, a super oxygen decomposer 6.7, an air filter 6.8, the refrigeration system 8, an air water production device 11, a filtering water tank 11.1, and the touch screen and mobile phone monitoring system 12. An air suction pipeline A1 is installed at an air inlet a of the suction pump 2, a solenoid valve B1 is installed at the middle part of the air suction pipeline A1, and the other end of the air suction pipeline extends into the compartment (container) type vacuum high-pressure chamber 1-9 to form an air suction and air return port c thereof. An exhaust pipeline A2 is installed at an air outlet b of the suction pump 2, the super oxygen decomposer 6.7 and a solenoid valve B2 are installed at the middle part of the exhaust pipeline A2, the other end of the exhaust pipeline A2 communicates with an air inlet h of the air water production device 11, and passes through the air water production device 11 and then is open to the atmosphere through an air outlet n of the air water production device 11. An inflation pipeline A3 is installed at an air outlet d of the inflation pump 3, a solenoid valve B3 is installed at the middle part of the inflation pipeline A3, and the other end of the inflation pipeline A3 extends into the compartment (container) type vacuum high-pressure chamber 1-9 to form an inflatable air inlet f thereof. An air intake pipeline A4 is installed at an air inlet e of the inflation pump 3, a solenoid valve B4 and the air filter 6.8 are installed at the middle part of the air intake pipeline A4, and the other end of the air intake pipeline A4 is open to atmosphere. A circulating pipeline A5 is further connected to the solenoid valve B4, a solenoid valve B5 is installed at the middle part of the circulating pipeline A5, and the other end of the circulating pipeline A5 communicates with the solenoid valve B3, and extends into the compartment (container) type vacuum high-pressure chamber 1-9 through the inflation pipeline A3 to form a circulating air return port j of the compartment (container) type vacuum high-pressure chamber 1-9. An air water production inflation pipeline A9 is further connected to the inflation pipeline A3, the air water production inflation pipeline A9 is connected to the solenoid valve B2 and then communicates with an air inlet h of the air water production device 11 through the exhaust pipeline A2. A modified atmosphere air intake pipeline A6 is installed at an air inlet t of the modified atmosphere device 6.1, a solenoid valve B6 is installed at the middle part of the modified atmosphere air intake pipeline A6, the other end of the modified atmosphere air intake pipeline A6 is connected to the inflation pipeline A3, and then communicates with the air outlet d of the inflation pump 3. A modified atmosphere air outlet pipeline A7 is installed at an air outlet s of the modified atmosphere device 6.1, a solenoid valve B7 is installed at the middle part of the modified atmosphere air outlet pipeline A7, and the other end of the modified atmosphere air outlet pipeline A7 extends into the compartment (container) type vacuum high-pressure chamber 1-9 to form a modified atmosphere air inlet i. An air water production pipeline A10 is installed at a water outlet x of the air water production device 11, and the air water production pipeline A10 communicates with a water inlet y of the filtering water tank 11.1; and condensate water generated in the compartment (container) type vacuum high-pressure chamber 1-9 flows into a water inlet Y of a condensate water collecting box 11.2 at the bottom in the chamber. A condensate water pipeline A11 is installed at a water outlet M of the condensate water collecting box 11.2, the condensate water pipeline A11 is provided with a solenoid valve B11 at the rear middle part after extending out the compartment (container) type vacuum high-pressure chamber 1-9, and the other end of the condensate water pipeline A11 communicates with a water inlet v of the filtering water tank 11.1. A humidifying water pipeline A12 is installed at a water outlet o of the filtering water tank 11.1, a solenoid valve B12 is installed at the middle part of the humidifying water pipeline A12, the other end of the humidifying water pipeline A12 extends into the compartment (container) type vacuum high-pressure chamber 1-9 to communicate with a water inlet R of the humidifier 6.5. A refrigeration circulating pipeline A13 is installed on the refrigeration system 8, the refrigeration circulating pipeline A13 extends into the compartment (container) type vacuum high-pressure chamber 1-9 to communicate with an evaporator air-cooling assembly 8.1. The touch screen and mobile phone monitoring system 12 comprises a touch screen 12.1, a mobile phone APP 12.2, and a wireless anti-fog camera device 12.4. The wireless anti-fog camera device 12.4 is installed at the position inside/outside the compartment (container) body 7 needing to be monitored. The compartment (container) type vacuum high-pressure chamber 1-9 is internally provided with positive and negative pressure airflow load generation processors and sensors, comprising: the humidifier 6.5, a super oxygen generator 6.2, a negative ion generator 6.3, an air catalyst controlled release device 6.4, a condensate water collecting box 11.2, a pressure sensor C1, a negative pressure sensor C2, a super oxygen sensor C3, a negative oxygen ion sensor C4, a chlorine dioxide sensor C5, a humidity sensor C6, an oxygen sensor C7, a nitrogen sensor C8, and a temperature sensor C9. All airflow load generation processors, sensors, solenoid valves and equipment devices arranged inside and outside the compartment (container) type vacuum high-pressure chamber 1-9 comprise the suction pump 2, the inflation pump 3, the modified atmosphere device 6.1, the super oxygen generator 6.2, the negative ion generator 6.3, the air catalyst controlled release device 6.4, the humidifier 6.5, the super oxygen decomposer 6.7, the refrigeration system 8, the air water production device 11, the filtering water tank 11.1, the touch screen and mobile phone monitoring system 12, the touch screen 12.1, the wireless anti-fog camera device 12.4, the pressure sensor C1, the negative pressure sensor C2, the super oxygen sensor C3, the negative oxygen ion sensor C4, the chlorine dioxide sensor C5, the humidity sensor C6, an oxygen sensor C7, the nitrogen sensor C8, the temperature sensor C9, a water level sensor C10 and the solenoid valves B1 to B12 are all connected to the positive and negative pressure intelligent regulation device 5.

In a fourteenth specific embodiment, an operation method for the intelligent positive and negative pressure freshkeeping compartment (container) is provided. The method comprises the following steps: (1) vacuum abatement heat-removal cleaning procedure: closing the chamber door 1.2 after fresh goods needing to be transported in fresh are loaded into the compartment (container) type vacuum high-pressure chamber 1-9; touching the chamber door switch 1.8 or manually turning on the chamber door switch by a driver, sending an instruction by the positive and negative pressure intelligent regulation device 5, and enabling the solenoid valves B1 and B2 to open the air suction pipelines A1 and A2 (air suction and air return port c of compartment type vacuum high-pressure chamber→A1→B1→A1→air inlet a of suction pump 5→air outlet b→A2→air inlet g of super oxygen decomposer→air outlet m→A2→B2→A2→air inlet h of air water production device→air outlet n→A2→exhaust to atmosphere), and turning on the suction pump 2 to pump the compartment (container) type vacuum high-pressure chamber 1-9 to a moderate vacuum (−0.01 KPa to −0.1 MPa), pumping away the self-contained heat of fruits, vegetables, meat and fish, part of bacteria and microorganisms and polluted air in the chamber, vacuumizing to make volatile metabolites ethylene acetaldehyde ethanol and other harmful gases in the fruit and vegetable tissues to escape and be pumped away, while inhibiting the reproduction of residual bacteria with the negative pressure to reduce the potential risks of disease aging of fruits and vegetables; (2) depressurized and humidified storage procedure: according to the pressure standard of the preset procedure and the real-time feedback of the negative pressure sensor C2, turning the suction pump 2 on or off by the positive and negative pressure intelligent regulation device 5 to a maintain an appropriate negative-pressure, low-oxygen and low-temperature environment within the compartment (container) type vacuum high-pressure chamber 1-9, thus reducing respiration intensity of fruits and vegetables, inhibiting the biosynthesis of ethylene, delaying decomposition of chlorophyll, inhibiting the synthesis of carotenoids and lycopene, and slowing down the processes such as hydrolysis of starch, increase of sugar and consumption of acid to delay mature senescence of the fruits and vegetables, and meanwhile, turning on the humidifier 6.5 to increase humidity in the chamber and prevent the water contained in the fruits and vegetables from escaping, thus maintaining the fresh state of the fruits and vegetables for a longer time; (3) super-oxygen pressurized sterilization and degradation procedure: according to the procedure setting and feedback of the sensors C3, C4 and C6, sending, by the positive and negative pressure intelligent regulation device 5, an instruction at a proper time to turn on the super oxygen generator 6.2, the negative oxygen ion generator 6.3 and the humidifier 6.5, thus enabling the super oxygen, humidity and negative oxygen ions in the compartment (container) type vacuum high-pressure chamber 1-9 to reach the required standards; meanwhile, enabling the solenoid valves B3 and B4 to open the inflation pipelines A3 and A4 (intake from atmosphere→A4→air filter→A4→B4→A4→air inlet e of inflation pump→air outlet d→A3→B3→A3→inflatable air inlet f1 of vacuum high-pressure chamber), and turning on the inflation pump 3 to properly pressurize the compartment (container) type vacuum high-pressure chamber 1-9 to 0.01 KPa to 10 MPa, wherein the super oxygen at the appropriate positive pressure is able to perform sterilization, disinfection and mildew resistance on the fruits, vegetables, meat and fish in the compartment (container) type vacuum high-pressure chamber 1-9 and degrade pesticide residues and ethylene and other gases exhaled by the metabolism of the fruits and vegetables, thus affecting enzyme activity in the fruits and vegetables, preventing the fruits and vegetables from browning and softening, and delaying the aging of the fruits and vegetables; and the appropriate high pressure further prevents the water contained in the fruits, vegetables, meat and fish from escaping, moreover, the moisture at the positive pressure is easier to permeate into the fruits, vegetables, meat and fish to supplement the water loss thereof caused by refrigeration and negative pressure, while the negative oxygen ions make the water cluster of moisture smaller so as to be absorbed by the fruits, vegetables, meat and fish easier and have the functions of inhibiting biological tissue metabolism, reducing respiration intensity, slowing down enzyme activity, and sterilizing and purifying to a certain extent; the super oxygen at the positive pressure is able to permeate into the deeper interior of the fruits, vegetables, meat and fish to play a better role in sterilization and disinfection; (4) modified atmosphere pressurized storage procedure: opening the air suction pipeline and turning on the suction pump 2 and the super oxygen decomposer 6.7 at a proper time by the positive and negative pressure intelligent regulation device 5 according to the procedure setting or the feedback of the sensors, pumping the decomposed, sterilized, disinfected and degraded polluted air out of the chamber, and then enabling the solenoid valves B3, B6, B7 and B2 to open the modified atmosphere inflation pipelines A3, A9, A6 and A7 (air outlet d of inflation pump→A3→A9→A6→B6→A6→air inlet t of modified atmosphere device→air outlet s→A7→B7→A7→modified atmosphere air inlet i of vacuum high-pressure chamber), and turning on the inflation pump 3 to drive the airflow to pass through a hollow fiber membrane of the modified atmosphere device 6.1 to separate the oxygen out, and enabling high-nitrogen low-oxygen gas to enter the vacuum high-pressure chamber 1-9; meanwhile, enabling the solenoid valves B3, B5 and B4 to open the modified atmosphere circulating pipelines (circulating air return port j of vacuum high-pressure chamber 1-9→A3→B3→A5→B5→A5→B4→A4→air inlet e of inflation pump→air outlet d of inflation pump); turning on the humidifier 6.5 until the modified atmosphere gas concentration, air humidify and positive atmospheric pressure in the chamber all reach the modified atmosphere pressurized storage standards; forming a nitrogen-rich and oxygen-poor environment with an appropriate proportion in the compartment (container) type vacuum high-pressure chamber 1-9 and keeping at the appropriate positive pressure and appropriate humidity to effectively control the respiration rate of the stored fruits and vegetables, thus preventing anaerobic respiration and carbon dioxide poisoning, slowing down the aging process, preventing the quality decrease and flavor loss of the stored fruits and vegetables, and maintaining the moisture and supplementing the water of the fruits and vegetables with the positive pressure so as to maintain the freshness of the fruits and vegetables to the maximum extent; (5) open-to-exhaust protection function: if the compartment door is opened during super-oxygen sterilization and disinfection or modified atmosphere storage, providing feedback immediately by the chamber door switch, and stopping the super oxygen or modified atmosphere procedure immediately through the operation of the positive and negative pressure intelligent regulation device 5; and meanwhile, opening the air suction pipelines and turning on the suction pump 2 to rapidly pump the super oxygen or high-nitrogen low-oxygen gas to the super oxygen decomposer 6.7 to be exhausted after being decomposed, wherein, as the air flows from the human side to the compartment (container) type vacuum high-pressure chamber 1-9 for supplementing air suction negative pressure, the user is not exposed to and is protected from the super oxygen and high-nitrogen low-oxygen gas; (6) air water production procedure: enabling moist waste gas extracted from the compartment (container) type vacuum high-pressure chamber 1-9 by the suction pump 2 to enter the super oxygen decomposer 6.7, and enabling the moist waste gas to enter the air water production device 11 after the super oxygen is decomposed, condensing water vapor and filtering the condensed water vapor into purified water conforming to drinking water standard, thus providing uninterrupted source of water for the humidifier 6.5; when the inflation pump 3 is idle, turning on the inflation pump 3 by the intelligent regulation device 5, and enabling the solenoid valves B3 and B2 to open the air water production inflation pipelines (air outlet d of inflation pump→A3→A9→B2→A2→air inlet h of air water production device→air outlet n→A2-exhaust to atmosphere), driving the air outside the compartment to enter the air water production device 11 for water production; (7) low-temperature assisted fresh-keeping procedure: after the fresh-keeping compartment (container) is turned on, turning on the refrigeration system 8 instantly by the positive and negative pressure intelligent regulation device 5, communicating the refrigeration system 8 with an evaporator air-cooling assembly 8.1 by the refrigeration pipeline A13, thus providing corresponding low temperature for the compartment (container) type vacuum high-pressure chamber 1-9 according to the feedback and control of the temperature sensing controller C9, and assisting the positive and negative pressure system to preserve the freshness of the stored objects; and (8) remote and short-range control monitoring function: controlling and monitoring, by the touch screen and mobile phone monitoring system 12, the real-time state of the positive and negative pressure fresh-keeping compartment (container) in real time through the touch screen 12.1 and mobile phone APP 12.2, thus making the fresh-keeping compartment (container) intelligently achieve various functions at high efficiency and low consumption according to the set procedures and instant instructions; displaying and reminding, by the touch screen 12.1 or the mobile phone APP 12.2, information such as temperature, humidity and gas concentration in the compartment, loading time and the expiration date of the stored objects, thus facilitating the user to remotely monitor and control the compartment in the driving cab or out of the compartment conveniently; and automatically controlling above procedures by the positive and negative pressure system, and setting the above procedures as shortcut key modes on the touch screen and mobile phone monitoring system 12 for remote and short-range control.

In a fifteenth specific embodiment, an intelligent positive and negative pressure fresh-keeping warehouse is provided. The intelligent positive and negative pressure fresh-keeping warehouse comprises a warehouse body 7. The warehouse body 7 is internally provided with an intelligent positive and negative pressure system, a refrigeration system 8, and a touch screen and mobile phone monitoring system 12. The intelligent positive and negative pressure system comprises a positive and negative pressure chamber 1, a suction pump 2, an inflation pump 3, a positive and negative pressure intelligent regulation device 5, and positive and negative pressure airflow load generation processors. The positive and negative pressure chamber 1 is designed as a warehouse type vacuum high-pressure chamber 1-10 according to particular requirements of the positive and negative pressure fresh-keeping warehouse. The warehouse type vacuum high-pressure chamber 1-10 comprises a chamber body 1.1, a chamber door 1.2, a mechanical airtight mechanism 1.3, and an internal and external communicating sealer 1.4. The chamber door 1.2 is a warehouse door of the positive and negative pressure fresh-keeping warehouse. The mechanical airtight mechanism 1.3 is arranged between the chamber door 1.2 and the chamber body 1.1 of the warehouse type vacuum high-pressure chamber 1-10. The mechanical airtight mechanism 1.3 comprises a lock ring 1.31, a lock bolt 1.32, and an airtight gasket 1.33; the lock ring 1.31 is in movable fit with the lock bolt 1.32, the lock bolt 1.32 extends into the lock ring 1.31 to lock the chamber door during the closing of the chamber door. When the positive and negative pressure is formed inside the warehouse type vacuum high-pressure chamber 1-10, the airtight gasket 1.33 is used for keeping sealing. The internal and external communicating sealer 1.4 is fixedly arranged at the rear part of the warehouse type vacuum high-pressure chamber 1-10, and all pipes and circuits getting in and out the chamber are connected to and pass through the internal and external communicating sealer 1.4 so as to keep the sealing property of the compartment warehouse type vacuum high-pressure chamber 1-10. The warehouse type vacuum high-pressure chamber 1-10 is externally provided with the suction pump 2, the inflation pump 3, the positive and negative pressure intelligent regulation device 5, a modified atmosphere device 6.1, a super oxygen decomposer 6.7, an air filter 6.8, a refrigeration system 8, an air water production device 11, a filtering water tank 11.1, and the touch screen and mobile phone monitoring system 12. An air suction pipeline A1 is installed at an air inlet a of the suction pump 2, a solenoid valve B1 is installed at the middle part of the air suction pipeline A1, and the other end of the air suction pipeline extends into the warehouse type vacuum high-pressure chamber 1-10 to form an air suction and air return port c thereof. An exhaust pipeline A2 is installed at an air outlet b of the suction pump 2, the super oxygen decomposer 6.7 and a solenoid valve B2 are installed at the middle part of the exhaust pipeline A2, the other end of the exhaust pipeline A2 communicates with an air inlet h of the air water production device 11, and passes through the air water production device 11 and then is open to atmosphere from an air outlet n of the air water production device 11. An inflation pipeline A3 is installed at an air outlet d of the inflation pump 3, a solenoid valve B3 is installed at the middle part of the inflation pipeline A3, and the other end of the inflation pipeline A3 extends into the warehouse type vacuum high-pressure chamber 1-10 to form an inflatable air inlet f thereof. An air intake pipeline A4 is installed at an air inlet e of the inflation pump 3, a solenoid valve B4 and the air filter 6.8 are installed at the middle part of the air intake pipeline A4, and the other end of the air intake pipeline A4 is open to the atmosphere. A circulating pipeline A5 is further connected to the solenoid valve B4, a solenoid valve B5 is installed at the middle part of the circulating pipeline A5, and the other end of the circulating pipeline A5 communicates with the solenoid valve B3, and extends into the warehouse type vacuum high-pressure chamber 1-10 through the inflation pipeline A3 to form a circulating air return port j thereof. An air water production inflation pipeline A9 is further connected to the inflation pipeline A3, the air water production inflation pipeline A9 is connected to the solenoid valve B2 and then communicates with an air inlet h of the air water production device 11 through the exhaust pipeline A2. A modified atmosphere air intake pipeline A6 is installed at an air inlet t of the modified atmosphere device 6.1, a solenoid valve B6 is installed at the middle part of the modified atmosphere air intake pipeline A6, the other end of the modified atmosphere air intake pipeline A6 is connected to the inflation pipeline A3, and then communicates with the air outlet d of the inflation pump 3. A modified atmosphere air outlet pipeline A7 is installed at an air outlet s of the modified atmosphere device 6.1, a solenoid valve B7 is installed at the middle part of the modified atmosphere air outlet pipeline A7, and the other end of the modified atmosphere air outlet pipeline A7 extends into the warehouse type vacuum high-pressure chamber 1-10 to form a modified atmosphere air outlet I thereof. An air water production pipeline A10 is installed at a water outlet x of the air water production device 11, and the air water production pipeline A10 communicates with a water inlet y of the filtering water tank 11.1; and condensate water generated in the warehouse type vacuum high-pressure chamber 1-10 flows into a water inlet Y of a condensate water collecting box 11.2 at the bottom in the chamber. A condensate water pipeline A11 is installed at a water outlet M of the condensate water collecting box 11.2, the condensate water pipeline A11 is provided with a solenoid valve B11 at the rear middle part after extending out the warehouse type vacuum high-pressure chamber 1-10, and the other end of the condensate water pipeline A11 communicates with a water inlet v of the filtering water tank 11.1. A humidifying water pipeline A12 is installed at a water outlet o of the filtering water tank 11.1, a solenoid valve B12 is installed at the middle part of the humidifying water pipeline A12, the other end of the humidifying water pipeline A12 extends into the warehouse type vacuum high-pressure chamber 1-10 to communicate with a water inlet R of the humidifier 6.5. A refrigeration circulating pipeline A13 is installed on the refrigeration system 8, the refrigeration circulating pipeline A13 extends into the warehouse type vacuum high-pressure chamber 1-10 to communicate with an evaporator air-cooling assembly 8.1. The touch screen and mobile phone monitoring system 12 comprises a touch screen 12.1, a mobile phone APP 12.2, and an anti-fog camera device 12.3. The anti-fog camera device 12.3 is installed at the position inside/outside the warehouse body 7 needing to be monitored. The warehouse type vacuum high-pressure chamber 1-10 is internally provided with positive and negative pressure airflow load generation processors and sensors, comprising: the humidifier 6.5, a super oxygen generator 6.2, a negative ion generator 6.3, an air catalyst controlled release device 6.4, the condensate water collecting box 11.2, a pressure sensor C1, a negative pressure sensor C2, a super oxygen sensor C3, a negative oxygen ion sensor C4, a chlorine dioxide sensor C5, a humidity sensor C6, an oxygen sensor C7, a nitrogen sensor C8, and a temperature sensor C9. All airflow load generation processors, sensors, solenoid valves and equipment devices arranged inside and outside the warehouse type vacuum high-pressure chamber 1-10 comprise the suction pump 2, the inflation pump 3, the modified atmosphere device 6.1, the super oxygen generator 6.2, the negative ion generator 6.3, the air catalyst controlled release device 6.4, the humidifier 6.5, the super oxygen decomposer 6.7, the refrigeration system 8, the air water production device 11, the filtering water tank 11.1, the touch screen and mobile phone monitoring system 12, the touch screen 12.1, the anti-fog camera device 12.3, the pressure sensor C1, the negative pressure sensor C2, the super oxygen sensor C3, the negative oxygen ion sensor C4, the chlorine dioxide sensor C5, the humidity sensor C6, the oxygen sensor C7, the nitrogen sensor C8, the temperature sensor C9, a water level sensor C10 and the solenoid valves B1 to B12 are all connected to the positive and negative pressure intelligent regulation device 5.

In a sixteenth specific embodiment, an operation method for the intelligent positive and negative pressure fresh-keeping warehouse is provided. The method comprises the following steps: closing the chamber door 1.2 after fresh goods needing to be transported in fresh are loaded into the warehouse type vacuum high-pressure chamber 1-10; touching the chamber door switch 1.8 or manually turning on the chamber door switch by a warehouse keeper, sending an instruction by the positive and negative pressure intelligent regulation device 5, and enabling the solenoid valves B1 and B2 to open the air suction pipelines A1 and A2 (air suction and air return port c of vacuum high-pressure chamber→A1→B1→A1→air inlet a of suction pump 2→air outlet b→A2→air inlet g of super oxygen decomposer→air outlet m→A2→B2→A2→air inlet h of air water production device→air outlet n→A2→exhaust to atmosphere), and turning on the suction pump 2 to pump the warehouse type vacuum high-pressure chamber 1-10 to a moderate vacuum (−0.01 KPa to −0.1 MPa), pumping away the self-contained heat of fruits, vegetables, meat and fish, part of bacteria and microorganisms and polluted air in the chamber, vacuumizing to make volatile metabolites ethylene acetaldehyde ethanol and other harmful gases in the fruit and vegetable tissues to escape and be pumped away, while inhibiting the reproduction of residual bacteria with the negative pressure to reduce the potential risks of disease aging of fruits and vegetables; (2) depressurized and humidified storage procedure: according to the pressure standard of the preset procedure and the real-time feedback of the negative pressure sensor C2, turning the suction pump 2 on or off by the positive and negative pressure intelligent regulation device 5 to a maintain an appropriate negative-pressure, low-oxygen and low-temperature environment within the warehouse type vacuum high-pressure chamber 1-10, thus reducing respiration intensity of fruits and vegetables, inhibiting the biosynthesis of ethylene, delaying decomposition of chlorophyll, inhibiting the synthesis of carotenoids and lycopene, and slowing down the processes such as hydrolysis of starch, increase of sugar and consumption of acid to delay mature senescence of the fruits and vegetables, and meanwhile, turning on the humidifier 6.5 to increase humidity in the chamber and prevent the water contained in the fruits and vegetables from escaping, thus maintaining the fresh state of the fruits and vegetables for a longer time; (3) super-oxygen pressurized sterilization and degradation procedure: according to the procedure setting and feedback of the sensors C3, C4 and C6, sending, by the positive and negative pressure intelligent regulation device 5, an instruction at a proper time to turn on the super oxygen generator 6.2, the negative oxygen ion generator 6.3 and the humidifier 6.5, thus enabling the super oxygen, humidity and negative oxygen ions in the warehouse type vacuum high-pressure chamber 1-10 to reach the required standards; meanwhile, enabling the solenoid valves B3 and B4 to open the inflation pipelines A3 and A4 (intake from atmosphere→A4→air filter→A4→B4→A4→air inlet e of inflation pump→air outlet d→A3→B3→A3→inflatable air inlet f1 of vacuum high-pressure chamber), and turning on the inflation pump 3 to properly pressurize the vacuum high-pressure chamber 1-10 to 0.01 KPa to 10 MPa, wherein the super oxygen at the appropriate positive pressure is able to perform sterilization, disinfection and mildew resistance on the fruits, vegetables, meat and fish in the warehouse type vacuum high-pressure chamber 1-9 and degrade pesticide residues and ethylene and other gases exhaled by the metabolism of the fruits and vegetables, thus affecting enzyme activity in the fruits and vegetables, preventing the fruits and vegetables from browning and softening, and delaying the aging of the fruits and vegetables; and the appropriate high pressure further prevents the water contained in the fruits, vegetables, meat and fish from escaping, moreover, the moisture at the positive pressure is easier to permeate into the fruits, vegetables, meat and fish to supplement the water loss thereof caused by refrigeration and negative pressure, while the negative oxygen ions make the water cluster of moisture smaller so as to be absorbed by the fruits, vegetables, meat and fish easier and have the functions of inhibiting biological tissue metabolism, reducing respiration intensity, slowing down enzyme activity, and sterilizing and purifying to a certain extent; the super oxygen at the positive pressure is able to permeate into the deeper interior of the fruits, vegetables, meat and fish to play a better role in sterilization and disinfection; (4) modified atmosphere pressurized storage procedure: opening the air suction pipeline and turning on the suction pump 2 and the super oxygen decomposer 6.7 at a proper time by the positive and negative pressure intelligent regulation device 5 according to the procedure setting or the feedback of the sensors, pumping the decomposed, sterilized, disinfected and degraded polluted air out of the chamber, and then enabling the solenoid valves B3, B6, B7 and B2 to open the modified atmosphere inflation pipelines A3, A9, A6 and A7 (air outlet d of inflation pump→A3→A9→A6→B6→A6→air inlet t of modified atmosphere device→air outlet s→A7→B7→A7→modified atmosphere air inlet i of vacuum high-pressure chamber), and turning on the inflation pump 3 to drive the airflow to pass through a hollow fiber membrane of the modified atmosphere device 6.1 to separate the oxygen out, and enabling high-nitrogen low-oxygen gas to enter the vacuum high-pressure chamber 1-10; meanwhile, enabling the solenoid valves B3, B5 and B4 to open the modified atmosphere circulating pipelines (circulating air return port j of vacuum high-pressure chamber→A3→B3→A5→B5→A5→B4→A4→air inlet e of inflation pump→air outlet d of inflation pump); turning on the humidifier 6.5 until the modified atmosphere gas concentration, air humidify and positive atmospheric pressure in the chamber all reach the modified atmosphere pressurized storage standards; forming a nitrogen-rich and oxygen-poor environment with an appropriate proportion in the warehouse type vacuum high-pressure chamber 1-10 and keeping at the appropriate positive pressure and appropriate humidity to effectively control the respiration rate of the stored fruits and vegetables, thus preventing anaerobic respiration and carbon dioxide poisoning, slowing down the aging process, preventing the quality decrease and flavor loss of the stored fruits and vegetables, and maintaining the moisture and supplementing the water of the fruits and vegetables with the positive pressure so as to maintain the freshness of the fruits and vegetables to the maximum extent; (5) open-to-exhaust protection function: if the warehouse door is opened during super-oxygen sterilization and disinfection or modified atmosphere storage, providing feedback immediately by the chamber door switch, and stopping the super oxygen or modified atmosphere procedure immediately through the operation of the positive and negative pressure intelligent regulation device 5; and meanwhile, opening the air suction pipelines and turning on the suction pump 2 to rapidly pump the super oxygen or high-nitrogen low-oxygen gas to the super oxygen decomposer 6.7 to be exhausted after being decomposed, wherein, as the air flows from the human side to the warehouse type vacuum high-pressure chamber 1-10 for supplementing air suction negative pressure, the user is not exposed to and is protected from the super oxygen and high-nitrogen low-oxygen gas; (6) air water production procedure: enabling moist waste gas extracted from the warehouse type vacuum high-pressure chamber 1-10 by the suction pump 2 to enter the super oxygen decomposer 6.7, and enabling the moist waste gas to enter the air water production device 11 after the super oxygen is decomposed, condensing water vapor and filtering the condensed water vapor into purified water conforming to drinking water standard, thus providing uninterrupted source of water for the humidifier 6.5; when the inflation pump 3 is idle, turning on the inflation pump 3 by the intelligent regulation device 5, and enabling the solenoid valves B3 and B2 to open the air water production inflation pipelines (air outlet d of inflation pump→A3→A9→B2→A2→air inlet h of air water production device→air outlet n→A2-exhaust to atmosphere), driving the air outside the warehouse to enter the air water production device 11 for water production; (7) low-temperature assisted fresh-keeping procedure: after the fresh-keeping warehouse is turned on, turning on the refrigeration system 8 instantly by the positive and negative pressure intelligent regulation device 5, communicating the refrigeration system 8 with an evaporator air-cooling assembly 8.1 by the refrigeration pipeline A13, thus providing corresponding low temperature for the warehouse type vacuum high-pressure chamber 1-10 according to the feedback and control of the temperature sensing controller C9, and assisting the positive and negative pressure system to preserve the freshness of the stored objects; and (8) remote and short-range control monitoring function: controlling and monitoring, by the touch screen and mobile phone monitoring system 12, the real-time state of the positive and negative pressure fresh-keeping warehouse in real time through the touch screen and mobile phone monitoring system 12.2, thus making the fresh-keeping warehouse intelligently achieve various functions at high efficiency and low consumption according to the set procedures and instant instructions; displaying and reminding, by the touch screen 12.1 or the mobile phone APP 12.2, information such as temperature, humidity and gas concentration in the warehouse, loading time and the expiration date of the stored objects, thus facilitating the user to monitor and control the warehouse remotely and in short range; and automatically controlling above procedures by the positive and negative pressure system, and setting the above procedures as shortcut key modes on the touch screen and mobile phone monitoring system 12 for remote and short-range control.

In a seventeenth specific embodiment, an intelligent positive and negative pressure modular cabinet is provided. The intelligent positive and negative pressure modular cabinet comprises a cabinet body 7. The cabinet body 7 is internally provided with an intelligent positive and negative pressure system, a refrigerating and heating system 8.3, and a touch screen and mobile phone monitoring system 12. The intelligent positive and negative pressure comprises a positive and negative pressure chamber 1, a suction pump 2, an inflation pump 3, a positive and negative pressure intelligent regulation device 5, and positive and negative pressure airflow load generation processors. The positive and negative pressure chamber 1 is designed as a modular vacuum high-pressure chamber 1-11 according to particular requirements of the intelligent positive and negative pressure modular cabinet. The modular vacuum high-pressure chamber 1-11 comprises a chamber body 1.1, a chamber door 1.2, a pneumatic airtight mechanism 1.5, an internal and external communicating sealer 1.4, and a pneumatic chamber door switch 1.8. The chamber door 1.2 is a cabinet door of the positive and negative pressure modular cabinet. The pneumatic airtight mechanism 1.5 is arranged between the chamber door 1.2 and the chamber body 1.1 of the modular vacuum high-pressure chamber 1-11. The pneumatic airtight mechanism 1.5 comprises pneumatic sealing lock bolts 1.51 and sealing lock bolt telescopic airbags 1.52 which are integrally manufactured at the rear parts of the sealing lock bolts 1.51, the number of the sealing lock bolts 1.51 and the sealing lock bolt telescopic airbags 1.52 which are of an integrated structure is four, and the integrated structures are all in the shape of long strips and respectively installed in four chamber airtight grooves 1.11 arranged in four borders of the door frame of the chamber body 1.1, the outer layer of the section of the lock bolt is sealing rubber, and the inside of the lock bolt is a bend-resistant metal core. The sealing lock bolt foldable telescopic airbag 1.52 is a foldable rubber airbag which can be inflated to elongate; an inflation socket 1.53 is arranged at the rear part of each airbag, and an inflation plug 1.54 is plugged into the inflation socket 1.53. Tour inflation plugs 1.54 are respectively installed at respective midpoints of four side pipelines connected to the four edges of a square annular airtight mechanism inflatable branch pipeline A8.1. The pipeline at the top side of the square annular airtight mechanism inflatable branch pipeline A8.1 is perpendicularly connected to an inflation pipeline A8 and communicates with an air outlet d of the inflation pump 3 by a solenoid valve B5 and the pipeline A3 as well as a solenoid valve B3. When closed, the chamber door 1.2 makes contact with the pneumatic chamber door switch 1.8, and the inflation pump 3 is immediately started to inflate and elongate the sealing lock bolt foldable telescopic airbag 1.52 and push the sealing lock bolt 1.51 to extend outwards from the chamber airtight groove 1.11 and extend into the chamber door airtight groove 1.21 arranged at the opposite position, thereby locking and sealing the chamber door. When a user opens the chamber door, the sealing lock bolt foldable telescopic airbag 1.52 is deflated by the pneumatic chamber door switch 1.8, such that the sealing lock bolt 1.51 retracts to open the chamber door. The internal and external communicating sealer 1.4 is fixedly arranged at the rear part of the modular vacuum high-pressure chamber 1-11, all pipelines and circuits getting in and out the chamber are connected to and pass through the internal and external communicating sealer 1.4 so as to keep the sealing property of the modular vacuum high-pressure chamber 1-11. The modular vacuum high-pressure chamber 1-11 is externally provided with the suction pump 2, the inflation pump 3, the positive and negative pressure intelligent regulation device 5, a modified atmosphere device 6.1, a super oxygen decomposer 6.7, an air filter 6.8, the refrigerating and heating system 8.3, an air water production device 11, a filtering water tank 11.1, the pneumatic chamber door switch 1.8, and the touch screen and mobile phone monitoring system 12. An air suction pipeline A1 is installed at an air inlet a of the suction pump 2, a solenoid valve B1 is installed at the middle part of the air suction pipeline A1, and the other end of the air suction pipeline A1 extends into the modular vacuum high-pressure chamber 1-11 to form an air suction and air return port c thereof. An exhaust pipeline A2 is installed at an air outlet b of the suction pump 2, the super oxygen decomposer 6.7 and a solenoid valve B2 are installed at the middle part of the exhaust pipeline A2, the other end of the exhaust pipeline A2 communicates with an air inlet h of the air water production device 11, and passes through the air water production device 11 and then is open to the atmosphere through the air outlet n of the air water production device 11. An inflation pipeline A3 is installed at an air outlet d of the inflation pump 3, a solenoid valve B3 is installed at the middle part of the inflation pipeline A3, and the other end of the inflation pipeline A3 extends into the modular vacuum high-pressure chamber 1-11 to form an inflatable air inlet f. An air intake pipeline A4 is installed at an air inlet e of the inflation pump 3, a solenoid valve B4 and the air filter 6.8 are installed at the middle part of the air intake pipeline A4, and the other end of the air intake pipeline A4 is open to the atmosphere. A circulating pipeline A5 is further connected to the solenoid valve B4, a solenoid valve B5 is installed at the middle part of the circulating pipeline A5, and the other end of the circulating pipeline A5 communicates with the solenoid valve B3, and extends into the modular vacuum high-pressure chamber 1-11 through the inflation pipeline A3 to form a circulating air return port j thereof. An airtight mechanism inflation pipeline A8 is further connected to the solenoid valve B5, and the airtight mechanism inflation pipeline A8 communicates with the air outlet d of the inflation pump 3 after passing through the solenoid valve B5 and the inflation pipeline A3, and the other end of the inflation pipeline A8 is connected to the pipeline at the top side of the square annular inflation pipeline A8.1. The pipelines at four sides of the square annular inflation pipeline A8.1 communicate with one another, the inflation plugs 1.54 are connected to the middle points of the pipelines at four sides, and the inflation plugs 1.54 are plugged into the corresponding inflation sockets 1.53. An air water production inflation pipeline A9 is further connected to the inflation pipeline A3, the air water production inflation pipeline A9 is connected to the solenoid valve B2 and communicates with an air inlet h of the air water production device 11 through the exhaust pipeline A2. A modified atmosphere air intake pipeline A6 is installed at an air inlet t of the modified atmosphere device 6.1, a solenoid valve B6 is installed at the middle part of the modified atmosphere air intake pipeline A6, and the other end of the modified atmosphere air intake pipeline A6 is connected to the inflation pipeline A3 and then communicates with the air outlet d of the inflation pump 3. A modified atmosphere air outlet pipeline A7 is installed at an air outlet s of the modified atmosphere device 6.1, a solenoid valve B7 is installed at the middle part of the modified atmosphere air outlet pipeline A7, and the other end of the modified atmosphere air outlet pipeline A7 extends into the modular vacuum high-pressure chamber 1-11 to form a modified atmosphere air outlet i thereof. An air water production pipeline A10 is installed at a water outlet x of the air water production device 11, and the air water production pipeline A10 communicates with a water inlet y of the filtering water tank 11.1; AND condensate water generated in the modular vacuum high-pressure chamber 1-11 flows into a water inlet Y of a condensate water collecting box 11.2 at the bottom in the chamber. A dehumidification condensate water pipeline A31 is installed at another water inlet N of the condensate water collecting box 11.2, and the other end of the dehumidification condensate water pipeline A31 is connected to a condensate water drainage port H of the dehumidifying device. A condensate water pipeline A11 is installed at a water outlet M of the condensate water collecting box 11.2, the condensate water pipeline A11 is provided with a solenoid valve B11 at the rear middle part after extending out the modular vacuum high-pressure chamber 1-11, and the other end of the condensate water pipeline A11 communicates with a water inlet v of the filtering water tank 11.1. A humidifying water pipeline A12 is installed at a water outlet o of the filtering water tank 11.1, a solenoid valve B12 is installed at the middle part of the humidifying water pipeline A12, the other end of the humidifying water pipeline A12 extends into the modular vacuum high-pressure chamber 1-11 to communicate with a water inlet R of a humidifier 8.5. A refrigeration circulating pipeline A13 is installed at the refrigerating and heating system 8.3, the refrigeration circulating pipeline A13 extends into the modular vacuum high-pressure chamber 1-11 to communicate with an a heat exchanger 8.4. The touch screen and mobile phone monitoring system 12 comprises a cabinet door touch screen 12.1, a mobile phone APP 12.2, and a high-definition anti-fog camera device 12.3. The high-definition anti-fog camera device 12.3 is installed at the position inside/outside the cabinet body 7 needing to be monitored. The modular vacuum high-pressure chamber 1-11 is internally provided with positive and negative pressure airflow load generation processors and sensors, comprising: the humidifier 6.5, an air disinfection and sterilization device 6.9, an air filter and purifier 6.10, a dehumidifying device 6.11, the condensate water collecting box 11.2, a pressure sensor C1, a negative pressure sensor C2, a super oxygen sensor C3, a negative oxygen ion sensor C4, a chlorine dioxide sensor C5, a humidity sensor C6, an oxygen sensor C7, a nitrogen sensor C8, a temperature sensing controller C9, a water level sensing controller C10, and an air particulate matter sensor C11. All airflow load generation processors, sensors, solenoid valves and equipment devices arranged inside and outside the modular vacuum high-pressure chamber 1-11 comprise the suction pump 2, the inflation pump 3, the modified atmosphere device 6.1, the humidifier 6.5, the super oxygen decomposer 6.7, the refrigerating and heating system 8.3, the heat exchanger 8.4, the air water production device 11, the filtering water tank 11.1, the touch screen and mobile phone monitoring system 12, the cabinet door touch screen 12.1, the high-definition anti-fog camera device 12.3, the pressure sensor C1, the negative pressure sensor C2, the super oxygen sensor C3, the negative oxygen ion sensor C4, the chlorine dioxide sensor C5, the humidity sensor C6, the oxygen sensor C7, the nitrogen sensor C8, the temperature sensing controller C9, the water level sensing controller C10, the air particulate matter sensor C11 and the solenoid valves B1 to B12 are all connected to the positive and negative pressure intelligent regulation device 5.

In an eighteenth specific embodiment, an operation method for the intelligent positive and negative pressure modular cabinet is provided. As the intelligent positive and negative pressure modular cabinet has a vacuum, high-pressure, constant-temperature, constant-humidity, constant-pressure, sterile and dust-free environment, various objects and equipment, such as tableware, kitchenware and electrical appliances, can be placed and installed therein, the operation method comprises: (1) vacuum abatement cleaning procedure: after placing the tableware, kitchenware, small electrical appliances and small objects into the modular vacuum high-pressure chamber 1-11, touching the chamber door switch 1.8 while closing the chamber door 1.2, and then sending an instruction by the positive and negative pressure intelligent regulation device 5: enabling the solenoid valves B1 and B2 to open the air suction pipelines A1 and A2 (air suction and air return port c of vacuum high-pressure chamber→A1→B1→A1→air inlet a of suction pump 2→air outlet b→A2→air inlet g of super oxygen decomposer→air outlet m→A2→B2→A2→air inlet h of air water production device→air outlet n→A2→exhaust to atmosphere), and turning on the suction pump 2 to vacuumize the modular vacuum high-pressure chamber 1-11 to a moderate vacuum (−0.01 KPa to −0.1 MPa), pumping out part of bacteria and microorganisms and polluted air in the chamber to clean the air and space; (2) disinfection and sterilization procedure: sending an instruction by the positive and negative pressure intelligent regulation device 5 to turn on the air disinfection and sterilization device 6.9, wherein the air disinfection and sterilization device 6.9 comprises a super oxygen generator, an ultraviolet disinfection lamp, and the like, which can be selected according to different disinfection requirements to disinfect and sterilize the environment and objects in the chamber; (3) sterile and undamaged storage procedure under particular conditions: providing vacuum, high-pressure, constant-temperature, constant-humidity, constant-pressure, sterile, dust-free and other particular storage environments by different types and configurations of modular cabinets, thus satisfying various different storage demands, for example, the tableware, kitchenware, small electrical appliances and small objects can be stored in vacuum after being disinfected by super oxygen, paintings, documents, antiques and high-end clothing may be stored in vacuum, low oxygen and dust prevention, or stored by using a particular modified atmosphere gas, or stored at constant temperature, constant humidity and constant pressure; (4) multi-purpose display refrigeration of water and wine bar: refrigerating and storing the packaged food, beverages, alcoholic beverages, fruits and dried fruits, candy and cakes and other food and objects with transparent cabinet doors in a display manner; (5) remote and short-range control monitoring function: controlling and monitoring, by the touch screen and mobile phone monitoring system 12, the positive and negative pressure modular cabinet in real time by the WIFI and mobile phone APP at remote and short-range, thus making the modular cabinet to intelligently achieve various functions at high efficiency and low consumption according to the set procedures and instant instructions; shooting, by the high-definition anti-fog camera device 12.3, the statuses of objects in the modular cabinet in real time; displaying and reminding, by a cabinet door touch screen 12.1 or a mobile phone APP 12.2, commodity information such as production date, price, expiration date and manufacturers and the information of purchase shopping malls and online stores, automatically recording, analyzing and handling the big data such as the time, quantity, frequency and preference of storing the objects in, and taking the objects out, the modular cabinet, and performing intelligent analysis; timely reminding on the mobile phone APP 12.2 or directly pushing the suggested goods to the mobile phone APP 12.2 or the cabinet door touch screen 12.1 for easy selection of purchase by the user, wherein, in addition to real-time monitoring and recording, the high-definition anti-fog camera device 12.3 is especially required to automatically and continuously shoot several panoramic photos of the objects in the modular cabinet with the closing movement of the cabinet door 1.2 by starting from the position remote away from the modular cabinet in the process of closing the cabinet door, or automatically record small videos at the same time for the users to view in the mobile phone APP, or view the panoramic photos or videos of the objects in the modular cabinet with good light and wide field of vision before and during the last closing of the door in the cabinet door touch screen at any time without opening the cabinet door, releasing the vacuum and lowering the temperature during short range; (6) positive and negative pressure module combined intelligent smart home mode: designing and manufacturing the intelligent positive and negative pressure modular cabinet according to the module functions, wherein the intelligent positive and negative pressure modular cabinet can be independently produced and used as a separated invention, or can be organically combined with other positive and negative pressure electrical appliances and the modular cabinets under the control of the touch screen and mobile phone APP monitoring system 12 to form a fully functional intelligent positive and negative pressure module combined home; and the modular cabinet not only has high energy efficiency and low consumption, but also can share the intelligent positive and negative pressure system, the refrigeration system and the air water production device of other positive and negative pressure electrical appliances and modular cabinets, and the fully functional intelligent positive and negative pressure module combined home is basically uniform, neat and harmonious in appearance, shape and color which are in line with the popular trend.

What is claimed is:

1. A positive and negative pressure system, comprising a positive and negative pressure chamber, a suction pump, an inflation pump, a controller, and positive and negative pressure airflow load generation processors;

wherein, the positive and negative pressure chamber comprises a chamber body, a chamber door, an mechanical airtight mechanism, and an internal and external communicating sealer; the mechanical airtight mechanism is arranged between the chamber body and the chamber door; the internal and external communicating sealer is fixedly arranged at a rear part of the positive and negative pressure chamber, and all pipelines and circuits getting in and out the chamber are connected to and pass through the internal and external communicating sealer so as to keep a sealing property of the positive and negative pressure chamber;

the positive and negative pressure chamber is externally provided with the suction pump, the inflation pump, and the controller;

an air suction pipeline is installed at an air inlet of the suction pump, a first solenoid valve is installed at a middle part of the air suction pipeline, and an end of the air suction pipeline that is not connected to the air inlet of the suction pump extends into the positive and negative pressure chamber to form an air suction and air return port;

an exhaust pipeline is installed at an air outlet of the suction pump, an end of the exhaust pipeline that is not connected to the air outlet of the suction pump is open to the atmosphere;

an inflation pipeline is installed at an air outlet of the inflation pump, a second solenoid valve is installed at a middle part of the inflation pipeline, an end of the inflation pipeline that is not connected to the air outlet of the inflation pump, extends into the positive and negative pressure chamber to form an inflatable air inlet thereof; an air intake pipeline is installed at an air inlet of the inflation pump, a third solenoid valve is installed at a middle part of the air intake pipeline, and an end of the air intake pipeline that is not connected to the air inlet of the inflation pump is open to the atmosphere; a circulating pipeline is connected to the third solenoid valve, a fourth solenoid valve is installed at a middle part of the circulating pipeline, and an end of the circulating pipeline that is not connected to the third solenoid valve is connected to the second solenoid valve, and extends into the positive and negative pressure chamber through the inflation pipeline to form a circulating air return port of the positive and negative chamber;

an end of a modified atmosphere air intake pipeline is in communication with a part of the inflation pipeline that is positioned between the second solenoid valve and the air outlet of the inflation pump, a fifth solenoid valve is installed at a middle part of the modified atmosphere air intake pipeline, an other end of the modified atmosphere air intake pipeline is in communication with an end of a modified atmosphere air outlet pipeline, a sixth solenoid valve is installed at a middle part of the modified atmosphere air outlet pipeline, an other end of the modified atmosphere air outlet pipeline extends into the positive and negative pressure chamber to form a modified atmosphere air inlet thereof;

the positive and negative pressure chamber is internally provided with the positive and negative pressure airflow load generation processors, comprising a super oxygen generator, a negative ion generator, an air catalyst controlled release device, and a humidifier;

the positive and negative pressure chamber is internally provided with sensors, comprising a pressure sensor, a negative pressure sensor, a super oxygen sensor, a negative oxygen ion sensor, a chlorine dioxide sensor, a humidity sensor, an oxygen sensor, and a nitrogen sensor;

the suction pump, the inflation pump, the super oxygen generator, the negative ion generator, the air catalyst controlled release device, the humidifier, the sensors and the first to sixth solenoid valves are all connected to the controller, the controller is configured to control the suction pump, the inflation pump, the positive and negative pressure airflow load generation processors and the first to sixth solenoid valves in real time to operate in following manners according to built-in procedures and pre-stored data and real-time feedback information of various sensors:

I, the first solenoid valve is opened to open the air suction pipeline and the exhaust pipeline, and the suction pump is turned on, so as to vacuumize an interior of the positive and negative pressure chamber to a set negative pressure;

II, the second solenoid valve and the third solenoid valve are opened to open the inflation pipeline and the air intake pipeline, and the inflation pump is turned on, so as to inflate the interior of the positive and negative pressure chamber to a set positive pressure;

III, the positive and negative pressure airflow load generation processors are turned on until a number and staying time of airflow loads in the chamber reach set values; and IV, the fifth solenoid valve and the sixth solenoid valve are opened to open the modified atmosphere air intake pipeline and the modified atmosphere air outlet pipeline, the second solenoid valve, the third solenoid valve and the fourth solenoid valve are opened to open the inflation pipeline, the circulating pipeline and the air intake pipeline, and the inflation pump is turned on to enable gases inside the positive and negative pressure chamber to circulate, wherein, in each of manners I-IV, each of the solenoid valves that are not mentioned is in a closed state.

2. The positive and negative pressure system according to claim 1, wherein, the positive and negative pressure system is arranged inside a compartment body of a fresh-keeping compartment, wherein the compartment body is internally provided with the positive and negative pressure system, a refrigeration system, and a touch screen and mobile phone monitoring system; the positive and negative pressure chamber is designed as a compartment type vacuum high-pressure chamber according to particular requirements of the positive and negative pressure fresh-keeping compartment, the chamber door is a compartment door of the positive and negative pressure fresh-keeping compartment;

the mechanical airtight mechanism is arranged between the chamber door and the chamber body of the compartment type vacuum high-pressure chamber;

the mechanical airtight mechanism comprises a lock ring, a lock bolt, and an airtight gasket; the lock ring is in movable fit with the lock bolt, the lock bolt extends into the lock ring to lock the chamber door during the closing of the chamber door; when the positive and negative pressure is formed inside the compartment type vacuum high-pressure chamber, the airtight gasket is used for keeping sealing; the internal and external communicating sealer is fixedly arranged at the rear part of the compartment type vacuum high-pressure chamber, and all pipes and circuits getting in and out the chamber are connected to and pass through the internal and external communicating sealer so as to keep the sealing property of the compartment type vacuum high-pressure chamber; the compartment type vacuum high-pressure chamber is externally provided with the suction pump, the inflation pump, the controller, a super oxygen decomposer, an air filter, the refrigeration system, an air water production device, a filtering water tank, and the touch screen and mobile phone monitoring system;

the super oxygen decomposer and a seventh solenoid valve are installed at a middle part of the exhaust pipeline, an end of the exhaust pipeline that is not connected to the air outlet of the suction pump communicates with an air inlet of the air water production device, and passes through the air water production device and then is open to the atmosphere through an air outlet of the air water production device; an air filter is installed at a middle part of the air intake pipeline; an end of an air water production inflation pipeline is connected to a part of the modified atmosphere air intake pipeline that is positioned between the inflation pipeline and the fifth solenoid valve, an other end of the air water production inflation pipeline is connected to the seventh solenoid valve and then communicates with an air inlet of the air water production device through the exhaust pipeline;

an air water production pipeline communicates with a water inlet of the filtering water tank; condensate water generated in the compartment type vacuum high-pressure chamber flows into a water inlet of a condensate water collecting box at the bottom in the chamber, a condensate water pipeline is installed at a water outlet of the condensate water collecting box, the condensate water pipeline is provided with an eighth solenoid valve at a rear middle part after extending out the compartment type vacuum high-pressure chamber, and an end of the condensate water pipeline that is not connected to the water outlet of the condensate water collecting box communicates with a water inlet of the filtering water tank; a humidifying water pipeline is installed at a water outlet of the filtering water tank, a ninth solenoid valve is installed at a middle part of the humidifying water pipeline, an end of the humidifying water pipeline extends into the compartment type vacuum high-pressure chamber to that is not connected to the water outlet of the filtering water tank communicate with a water inlet of the humidifier; a refrigeration circulating pipeline is installed on the refrigeration system, the refrigeration circulating pipeline extends into the compartment type vacuum high-pressure chamber to communicate with an evaporator air-cooling assembly;

the touch screen and mobile phone monitoring system comprises a touch screen, a mobile phone APP, and a first camera; the first camera is installed at the position inside/outside the compartment body needing to be monitored;

the compartment type vacuum high-pressure chamber is internally provided with positive and negative pressure airflow load generation processors and sensors, further comprising: a temperature sensor;

all airflow load generation processors, sensors, solenoid valves and equipment devices arranged inside and outside the compartment type vacuum high-pressure chamber comprise the suction pump, the inflation pump, the super oxygen generator, the negative ion generator, the air catalyst controlled release device, the humidifier, the super oxygen decomposer, the refrigeration system, the air water production device, the filtering water tank, the touch screen and mobile phone monitoring system, the touch screen, the first camera, the pressure sensor, the negative pressure sensor, the super oxygen sensor, the negative oxygen ion sensor, the chlorine dioxide sensor, the humidity sensor, an oxygen sensor, the nitrogen sensor, the temperature sensor, a water level sensor and the first to ninth solenoid valves are all connected to the controller.

3. The positive and negative pressure system according to claim 1, wherein, the positive and negative pressure system is arranged inside a warehouse body of a positive and negative pressure fresh-keeping warehouse, wherein the warehouse body is internally provided with a refrigeration system, and a touch screen and mobile phone monitoring system; the positive and negative pressure chamber is designed as a warehouse type vacuum high-pressure chamber according to particular requirements of the positive and negative pressure fresh-keeping warehouse; the chamber door is a warehouse door of the positive and negative pressure fresh-keeping warehouse;

the mechanical airtight mechanism is arranged between the chamber door and the chamber body of the warehouse type vacuum high-pressure chamber; the mechanical airtight mechanism comprises a lock ring, a lock bolt, and an airtight gasket; the lock ring is in movable fit with the lock bolt, the lock bolt extends into the lock ring to lock the chamber door during the closing of the chamber door; when the positive and negative pressure is formed inside the warehouse type vacuum high-pressure chamber, the airtight gasket is used for keeping sealing; the internal and external communicating sealer is fixedly arranged at the rear part of the warehouse type vacuum high-pressure chamber, and all pipes and circuits getting in and out the chamber are connected to and pass through the internal and external communicating sealer so as to keep the sealing property of the compartment warehouse type vacuum high-pressure chamber;

the warehouse type vacuum high-pressure chamber is externally provided with the suction pump, the inflation pump, the controller, a super oxygen decomposer, an air filter, a refrigeration system, an air water production device, a filtering water tank, and the touch screen and mobile phone monitoring system; the super oxygen decomposer and a seventh solenoid valve are installed at the middle part of the exhaust pipeline, an end of the exhaust pipeline that is not connected to the air outlet of the suction pump communicates with an air inlet of the air water production device, and passes through the air water production device and then is open to atmosphere from an air outlet of the air water production device; the air filter is installed at the middle part of the air intake pipeline; an end of an air water production inflation pipeline is connected to a part of the modified atmosphere air intake pipeline that is positioned between the inflation pipeline and the fifth solenoid valve, an other end of the air water production inflation pipeline is connected to the seventh solenoid valve and then communicates with an air inlet of the air water production device through the exhaust pipeline;

an air water production pipeline is installed at a water outlet of the air water production device, and the air water production pipeline communicates with a water inlet of the filtering water tank; condensate water generated in the warehouse type vacuum high-pressure chamber flows into a water inlet of a condensate water collecting box at the bottom in the chamber, a condensate water pipeline is installed at a water outlet of the condensate water collecting box, the condensate water pipeline is provided with an eighth solenoid valve at the rear middle part after extending out the warehouse type vacuum high-pressure chamber, and an end of the condensate water pipeline that is not connected to the water outlet of the condensate water collecting box communicates with a water inlet of the filtering water tank; a humidifying water pipeline is installed at a water outlet of the filtering water tank, a ninth solenoid valve is installed at the middle part of the humidifying water pipeline, an end of the humidifying water pipeline that is not connected to the water outlet of the filtering water tank extends into the warehouse type vacuum high-pressure chamber to communicate with a water inlet of the humidifier; a refrigeration circulating pipeline is installed on the refrigeration system, the refrigeration circulating pipeline extends into the warehouse type vacuum high-pressure chamber to communicate with an evaporator air-cooling assembly;

the touch screen and mobile phone monitoring system comprises a touch screen, a mobile phone APP, and a second camera; the second camera is installed at the position inside/outside the warehouse body needing to be monitored; the warehouse type vacuum high-pressure chamber is internally provided with positive and negative pressure airflow load generation processors and sensors, comprising: the humidifier, a super oxygen generator, a negative ion generator, an air catalyst controlled release device, the condensate water collecting box, a pressure sensor, a negative pressure sensor, a super oxygen sensor, a negative oxygen ion sensor, a chlorine dioxide sensor, a humidity sensor, an oxygen sensor, a nitrogen sensor, and a temperature sensor;

all airflow load generation processors, sensors, solenoid valves and equipment devices arranged inside and outside the warehouse type vacuum high-pressure chamber comprise the suction pump, the inflation pump, the super oxygen generator, the negative ion generator, the air catalyst controlled release device, the humidifier, the super oxygen decomposer, the refrigeration system, the air water production device, the filtering water tank, the touch screen and mobile phone monitoring system, the touch screen, the second camera, the pressure sensor, the negative pressure sensor, the super oxygen sensor, the negative oxygen ion sensor, the chlorine dioxide sensor, the humidity sensor, the oxygen sensor, the nitrogen sensor, the temperature sensor, a water level sensor and the first to ninth solenoid valves to are all connected to the controller.

4. An operation method for the positive and negative pressure system according to claim 1, the operation method is performed by the controller in one of following manners:
  I, opening the first solenoid valve to open the air suction pipelines and the exhaust pipeline, turning on the suction pump, so as to vacuumize the interior of the positive and negative pressure chamber to the set negative pressure;
  II, opening the second solenoid valves and the third solenoid valve to open the inflation pipeline and the air intake pipeline, and turning on the inflation pump, so as to inflate the interior of the positive and negative pressure chamber to the set positive pressure;
  III, turning on the positive and negative pressure airflow load generation processors in the positive and negative pressure chamber until the number and staying time of airflow loads in the chamber reach the standards; and
  IV, opening the fifth solenoid valves and the sixth solenoid valve to open the modified atmosphere air intake pipeline and the modified atmosphere air outlet pipeline, opening the second solenoid valve, the third solenoid valve and the fourth solenoid valve to open the inflation pipeline, the circulating pipeline and the air intake pipeline, and turning on the inflation pump to enable the gases inside the positive and negative pressure chamber to circulate,
  wherein, in each of manners I-IV, each of the solenoid valves that are not mentioned is in a closed state.

5. A positive and negative pressure electrical appliance, wherein the positive and negative pressure electrical appliance is a positive and negative pressure refrigerator, a positive and negative pressure washing machine, a positive and negative pressure dishwasher/fruit and vegetable cleaning machine, a positive and negative pressure rang hood, a positive and negative pressure oven/air fryer/microwave oven, a positive and negative pressure fresh-keeping compartment, a positive and negative pressure fresh-keeping warehouse, or a positive and negative pressure modular cabinet, characterized in that the positive and negative pressure electrical appliance comprises the positive and negative pressure system according to claim 1.

* * * * *